United States Patent [19]
Yamamoto et al.

[11] Patent Number: 5,914,878
[45] Date of Patent: Jun. 22, 1999

[54] RAW MATERIALS ORDERING SYSTEM

[75] Inventors: Tsukasa Yamamoto, Tokyo; Masaya Ogawa, Kanagawa; Eichi Yoshida, Chiba; Masataka Hotta, Kanagawa; Toru Morita, Hyogo; Akiko Omori, Osaka, all of Japan

[73] Assignee: Kanebo, Ltd., Osaka, Japan

[*] Notice: This patent is subject to a terminal disclaimer.

[21] Appl. No.: 08/898,696

[22] Filed: Jul. 22, 1997

Related U.S. Application Data

[62] Division of application No. 08/650,054, May 16, 1996, which is a continuation of application No. 08/422,976, Apr. 17, 1995, abandoned, which is a continuation of application No. 07/692,425, Apr. 29, 1991, abandoned.

[30] Foreign Application Priority Data

| Apr. 28, 1990 | [JP] | Japan | 2-112274 |
| Sep. 26, 1990 | [JP] | Japan | 225845 |
| Nov. 27, 1990 | [JP] | Japan | 2-326996 |

[51] Int. Cl.⁶ .................................................. G06F 17/60
[52] U.S. Cl. ........................... 364/468.13; 364/468.14; 705/7; 705/8; 705/10; 705/20; 705/28; 705/29
[58] Field of Search ................ 364/468.13, 468.14; 705/7, 8, 10, 20, 28, 29

[56] References Cited

U.S. PATENT DOCUMENTS 5,204,821 4/1993 Inui et al. .

FOREIGN PATENT DOCUMENTS

| 62-10759 | 1/1987 | Japan . |
| 3-156504 | 6/1991 | Japan . |
| 4-25359 | 1/1992 | Japan . |

OTHER PUBLICATIONS

"Information Processing Technology For FA Production Control Total System", Kazuyasu Okada, Information Processing Society of Japan, vol. 25, No. 4, 1984, pp. 371–377, Japanese Language Article and English Language Translation.

Primary Examiner—Gail O. Hayes
Assistant Examiner—William N. Hughet
Attorney, Agent, or Firm—Graham & James LLP

[57] ABSTRACT

This invention relates to a production system for retail goods which is intended for timely collection of accurate sales information from retail outlets and flexible production of goods in accordance with the same information, and comprises a retail sales information collecting means, a production quantity setting means for determining a production quantity according to the information so collected, a directing means for directing the preparation and production of raw materials according to the determined production quantity, and a production means for producing the determined production quantity according to a direction to produce. Also provided is a raw materials ordering system, which determines production quantities of raw materials in accordance with production plans for ensuring flexible production of the products without the disadvantage of carrying excessive inventories and for economical and efficient control and supply of raw materials. As such, the system comprises an order quantity determining means for setting or modifying daily required quantities of raw materials in response to setting or modification of daily production plans and determining order quantities according to raw material attributes, inventories, order backlogs, in-process order quantities and the required quantities of raw materials and a data input processing means for modifying the raw material inventory quantities upon receipt of raw material acceptance information. Furthermore, another type of the raw material ordering system disclosed in this application can be employed for those raw materials that require processing after placement of an order.

26 Claims, 49 Drawing Sheets

FIG.3

| Product classification | Foundation cosmetic | Make up cosmetic | Shampoo & rinse | Perfume & cologne | Cosmetic sundry | Men's cosmetic |
|---|---|---|---|---|---|---|
| | 1 | 2 | 3 | 4 | 5 | 6 |

| Price classification | Low | Medium low | Medium | Medium high | High |
|---|---|---|---|---|---|
| | 1 | 2 | 3 | 4 | 5 |

| Consumer age classification | Low | Intermediate between low and average | Average | Intermediate between average and high | High |
|---|---|---|---|---|---|
| | 1 | 2 | 3 | 4 | 5 |

| Merchandising classification | Display sale | Rather display sale | Equivocal | Rather counseling sale | Counseling sale |
|---|---|---|---|---|---|
| | 1 | 2 | 3 | 4 | 5 |

Consumer age characteristic

Merchandising characteristic

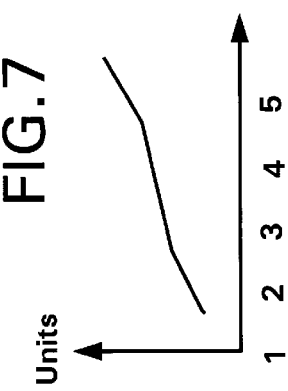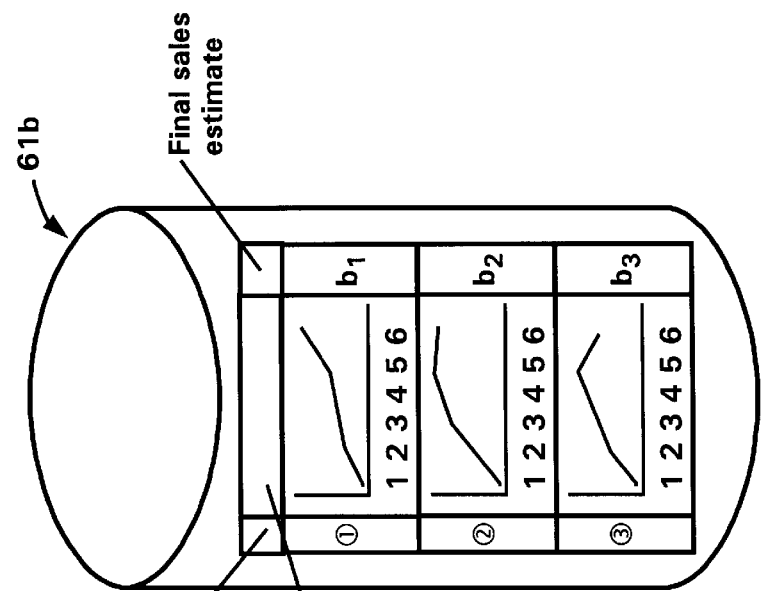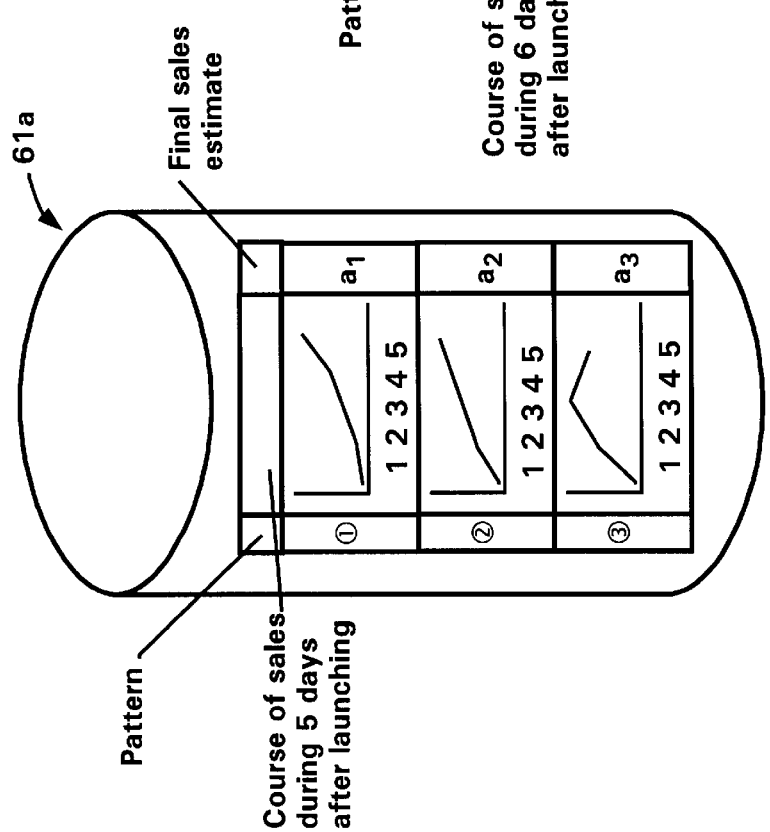

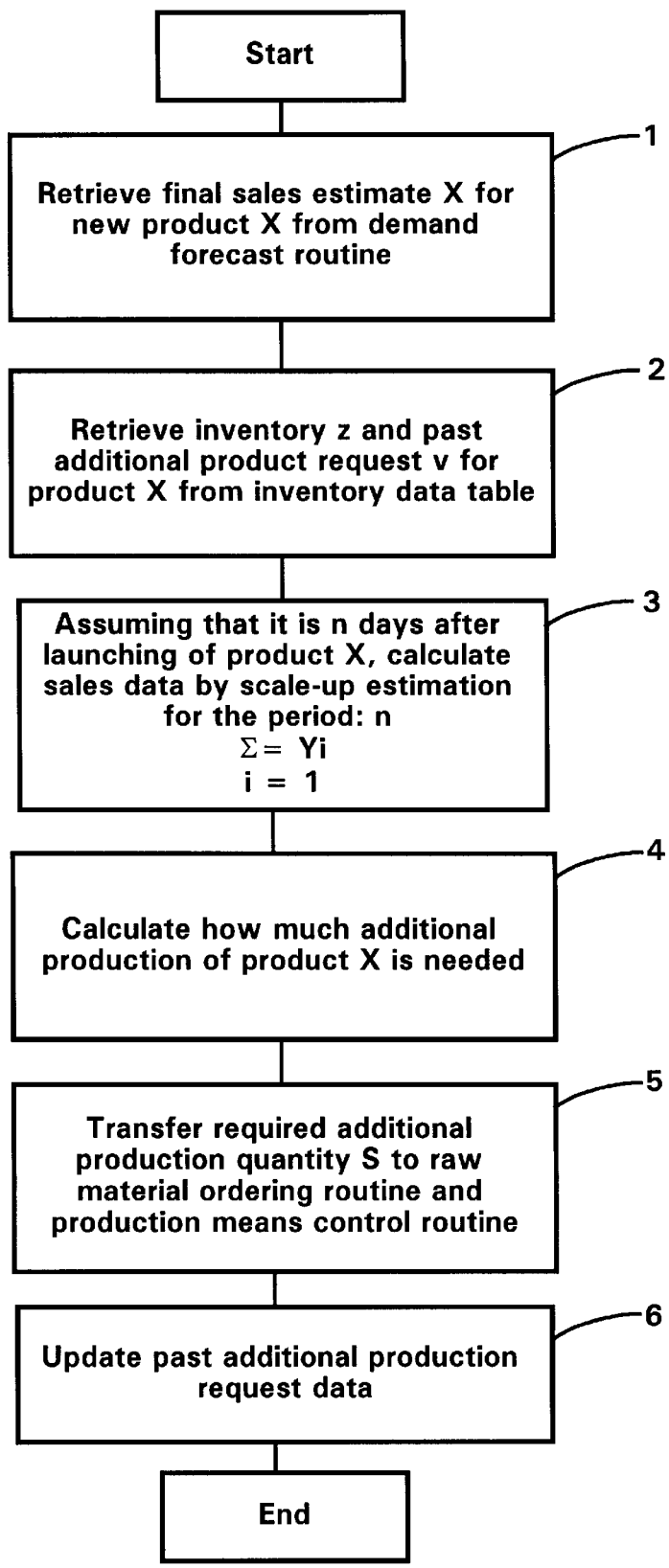

FIG. 10A

Product-classified raw material constitution data table (81a)

| Raw material / Product | α | β | ... |
|---|---|---|---|
| A | | | |
| B | | | |
| ... | | | |
| X | $P^1$ | $P^2$ | ... |

FIG. 10B

Raw material-classified required quantity data table (81b)

| Day / Raw material | 1 | 2 | ... | j | ... | n |
|---|---|---|---|---|---|---|
| α | $a_1$ | $a_2$ | ... | $a_j$ | ... | $a_n$ |
| β | $b_1$ | $b_2$ | ... | $b_j$ | ... | $b_n$ |
| ... | ... | ... | | ... | | ... |

FIG. 10C

Raw material-classified inventory data table (81c)

| Raw material | Inventory |
|---|---|
| α | $Z_α$ |
| β | $Z_β$ |
| ... | ... |

FIG. 10D

Raw material-classified acceptance schedule data table (81d)

| Day / Raw material | 1 | 2 | ... | n |
|---|---|---|---|---|
| α | $a_1^*$ | $a_2^*$ | ... | $a_n^*$ |
| β | $b_1^*$ | $b_2^*$ | ... | $b_n^*$ |
| ... | ... | ... | | ... |

Drive output level data table

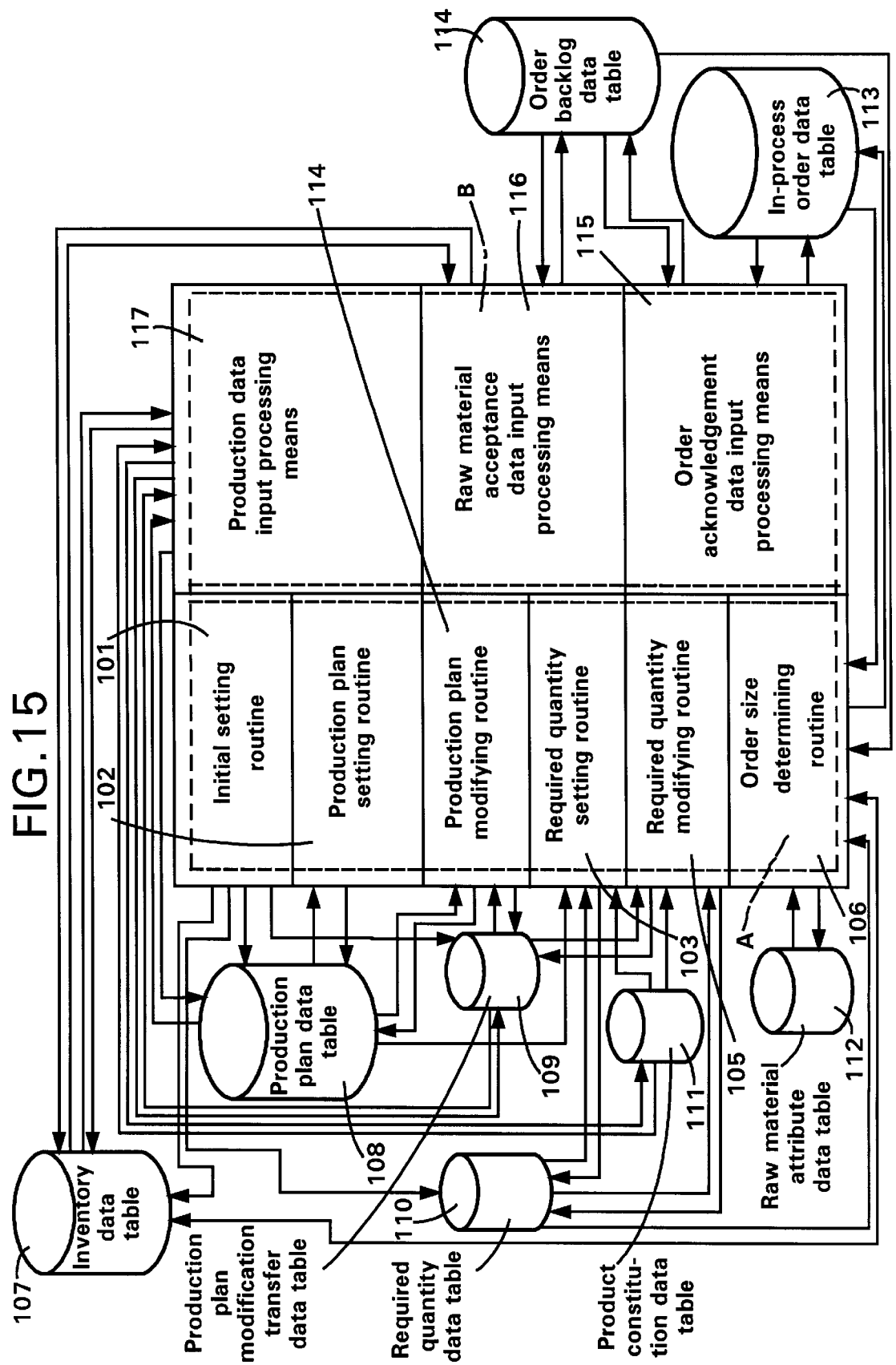

FIG. 17

Production plan data table (108)

| | 1 | 2 | --- | r |
|---|---|---|---|---|
| $P_1$ | $X_{11}$ | $X_{12}$ | --- | $X_{1r}$ |
| $P_2$ | $X_{21}$ | $X_{22}$ | --- | $X_{2r}$ |
| --- | --- | --- | | --- |
| $P_m$ | $X_{m1}$ | $X_{m2}$ | --- | $X_{mr}$ |

Day / Product

FIG. 16

Inventory data table (107)

| Raw material | Inventory |
|---|---|
| $R_1$ | $Z_1$ |
| $R_2$ | $Z_2$ |
| ... | ... |
| $R_n$ | $Z_n$ |

Required quantity data table

Production plan modification transfer data table

In-process inventory data table

Parts inventory data table

Product sales data table

Parts attribute data table

Parts demand quantity data table

Assured sales quantity data table

| Product | Assured sales quantity |
|---------|------------------------|
| A | 10 |
| B | 25 |
| C | 5 |

Assured sales quantity data table

| Product | Part code | |
|---------|-----------|---|
| A | q1 | 2 |
| A | q2 | 3 |
| A | q3 | 1 |
| B | q1 | 1 |
| B | q4 | 3 |
| C | q5 | 1 |
| C | q6 | 2 |

Product constitution data table

| Mother part code | Daughter part code | Number of constituent units |
|---|---|---|
| q1 | q7 | 1 |
| q1 | q8 | 1 |
| q2 | q8 | 2 |
| q2 | q10 | 1 |
| q4 | q7 | 1 |
| q4 | q9 | 2 |
| q6 | q9 | 3 |
| q6 | q10 | 1 |
| q6 | q15 | 2 |
| q10 | q12 | 1 |
| q10 | q13 | 3 |

Parts constitution data table

FIG.49D

| Before - part code | After - part code |
|---|---|
| q11 | q7 |
| q11 | q12 |
| q14 | q5 |

211

Parts processing data table

FIG.50
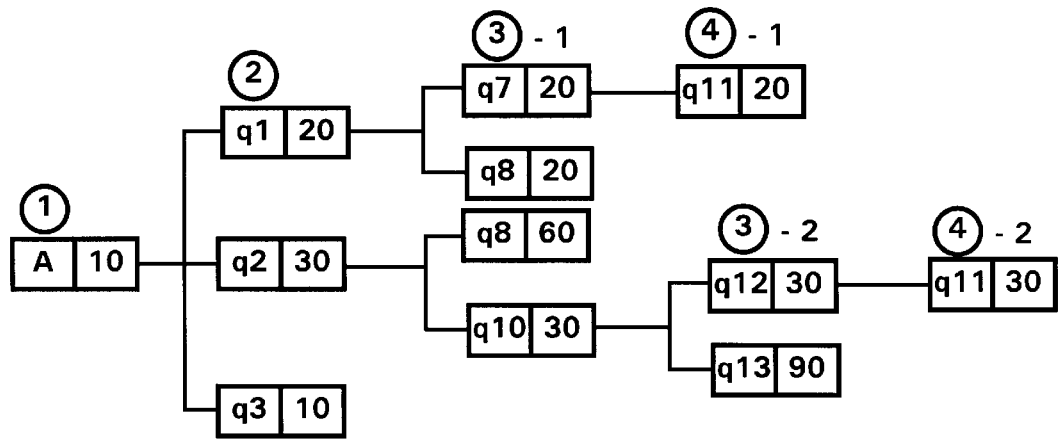
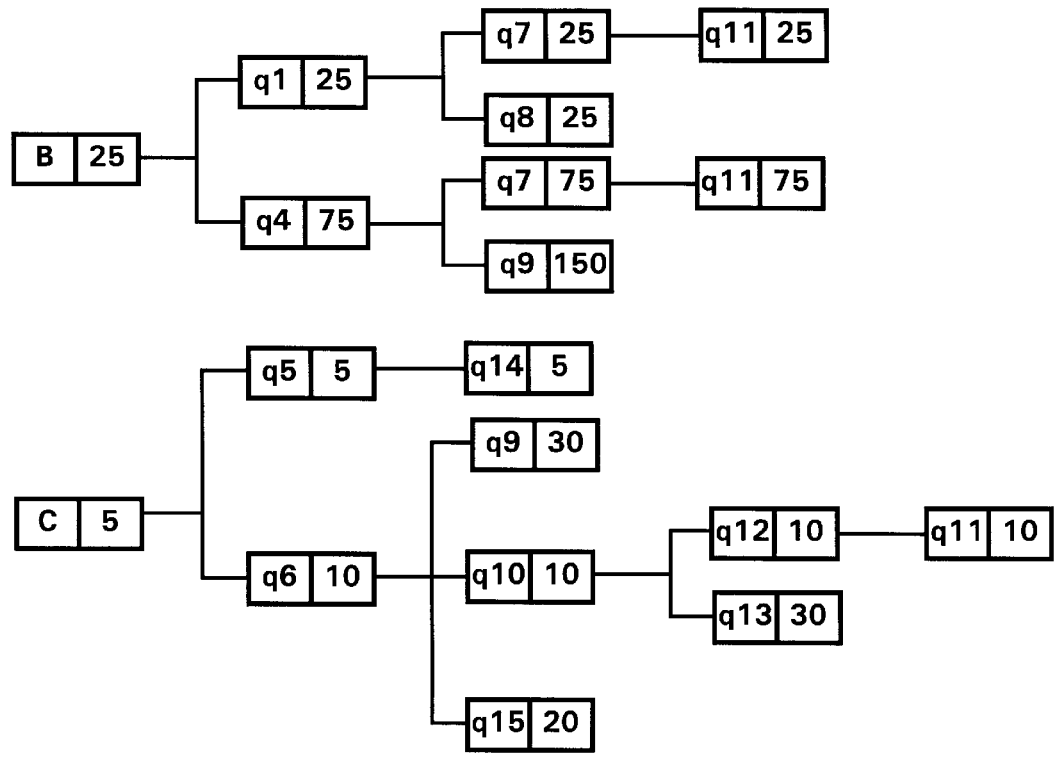
FIG.51
| PART CODE | q1 | q2 | q3 | q4 | q5 | q6 | q7 | q8 | q9 | q10 | q11 | q12 | q13 | q14 | q15 |
|---|---|---|---|---|---|---|---|---|---|---|---|---|---|---|---|
| DEMAND QUANTITY | 45 | 30 | 10 | 75 | 5 | 10 | 120 | 105 | 180 | 40 | 160 | 40 | 120 | 5 | 20 |
Parts demand quantity data table Production plan data table

RAW MATERIALS ORDERING SYSTEM

This application is a Divisional application of application Ser. No. 08/650,054, filed May 16, 1996, (pending), which is a Continuation of U.S. patent application Ser. No. 08/422,976, filed Apr. 17, 1995 (abandoned), which is a Continuation of U.S. patent application Ser. No. 07/692,425, filed Apr. 29, 1991 (abandoned).

BACKGROUND OF THE INVENTION

1. Technical Field

The present invention relates to a production system for retail goods such as beauty products and more particularly to a production system which receives sales information from retail outlets timely and with accuracy and manufacture said goods with flexibility.

The invention relates, in another aspect, to a raw material ordering system by which orders for raw materials necessary for the production of products can be placed with flexibility and economically, and thus insures timely procurement of raw materials without the disadvantage of carrying excessive raw material inventories. This raw material ordering system may be employed in conjunction with or independently from said production system.

2. Prior Art

Production Systems for Goods Sold Over Retail Counters

In manufacturing a product for marketing, the manufacturer generally determines the quantity to be manufactured according to a marketing plan initially and instructs its factory to produce that quantity, and as need arises, they instruct the factory to carry out additional production.

However, such a production system is dangerous to the so-called fashion manufacturer which must launch a new product as often as, say, once a year and is specializing in fashion articles with limited market lives. Assuming that such a manufacturer drafted a merchandizing plan, manufactured an article accordingly and introduced it to the market and the articles was accepted by consumers better than expected and sold out soon. Then, deficiencies occur at retail outlets and the manufacturer loses many sales opportunities. Assuming, conversely, that the manufacturer mapped out a grandiose campaign but the market was not ready to accept their product. Then, too many articles remain unsold and the manufacturer must carry large stocks to be somehow liquidated.

To solve these problems, many manufacturers have so far explored into better methods for predicting potential demands. Thus, they try to overcome the problems by predicting demands from the past sales performance of similar products and determining apparently appropriate production scales. However, when the article to be manufactured is an entirely new product, it is extremely difficult for the manufacturer to prognosticate the consumer acceptance, ascertain the trend in the potential competitors, or predict the effect of a marketing campaign. Moreover, since weather may be a major factor affecting the sale of products, demand prediction has its own limits and every one in the industry today is aware of the great risk of relying on such prediction.

Raw Material Ordering System I

While different industries have been using somewhat different systems for the procurement of raw materials, the average approach is that which is known as the fixed point-fixed quantity ordering system.

According to this fixed point-fixed quantity ordering system, a safe stock level is predetermined for each raw material and when the raw material inventory on hand has decreased to this critical stock level, a signal is given for placing a new order. This system is predicated on the principle that the manufacturer should carry a reasonable stockpile of any raw material that is required to be certainly on the safe side. This is an expedient and optimal system for industries where stable production is the rule rather than the exception.

However, the fixed point-fixed quantity ordering system does not work well and entails too large economic losses in industries where many kinds of products are manufactured in small lots and particularly where the dependency of any raw material on the production scale of the product is large. Thus, if a plurality of product items share a plurality of raw materials in common and such product items can be manufactured merely by altering the combination of such raw materials, the fixed point-fixed quantity ordering system can be employed with advantage. However, if, for example, three product items A, B and C have one raw material $\underline{a}$ in common, the safe stock level of $\underline{a}$, viz. the critical point for this raw material, will then be set at the maximum quantity required for the production of all the three product items, with the result that the safety stock level of that raw material is exaggerated of necessity and, hence, chances are that the manufacturer will have to carry an excessive raw material inventory.

To overcome the above disadvantage, a raw material ordering system called MRP (the acronym of Material Requirements Plan) has for some time been in use. This is a system such that an order for any raw material is placed in the quantity just necessary for the production of a given lot size of each product item and is intended to preclude the disadvantage of carrying an excessive raw material inventory.

As all the raw materials for each product item are assorted as a package, this system is convenient, indeed, but has the problem of rigidity. Thus, since the raw material $\underline{a}$ is earmarked for the production of item A only and no diversion of raw material $\underline{a}$ is made for the production of item B even if an instruction to produce B is entered, and the production of B must begin only after procurement of raw material $\underline{a}$ for B. Since the raw materials, $\underline{a}$, $\underline{b}$, $\underline{c}$ . . . have been packaged in necessary amounts for the production of item A, the diversion of raw material $\underline{a}$ from this package will result in a virtual waste of the other raw materials b, c . . . .

Raw Material Ordering System II

Furthermore, the raw material ordering system MRP involves particular difficulties and is disadvantageous when the raw materials call for long lead times between placement of an order and actual receipt of the raw materials. An example of such raw materials is bottles of cosmetics. Each manufacturer of cosmetics employs its own bottles with its own shape, configuration, color, and ornamental design. When a manufacturer of cosmetics places an order for bottles of a particular type, a manufacturer of the bottles then molds the bottles, does surface-finishing, and print brands and other characters and designs if any on the surface thereof. Thus, for placing an order for a raw material with a lead time of 3 months, it is of course necessary that the production scale as of 3 months ahead must have been determined but it is very difficult and even dangerous for manufacturers in the fashion and equivalent industries to predetermine a production size as of many months ahead.

Therefore, there has been proposed a still another system, viz. a preliminary ordering system in which the necessary quantities of parts, that is to say the amounts of consumption of parts, are predicted independently of the production of a finished product and these quantities of parts are arranged to be available beforehand. According to this system, the necessary production activity can be started as soon as a manufacturing instruction is received but the manufacturer must maintain constant inventories of parts at all times and, particularly where the variety of production items is large, must maintain a proportionally increased total inventory of raw materials.

Furthermore, raw materials and particularly containers and the like are fed to the production line only after passing through a plurality of processes such as surface and other treatments (factory) and assembling (factory), with the result that various forms of inventories are carried in the respective processes. In such a situation, it is very difficult to keep a constant tab on which process stage is carrying what size of inventory and this was near to impossibility particularly where the container, for one, is procured from a series of container manufacturers and finishers. For this reason, the manufacturer in such cases places orders for raw materials for each production job without a clear picture of the inventory, with the result that they will have to carry a fairly large total inventory of raw materials.

SUMMARY OF THE INVENTION

The Production System for Retail Goods

The present invention has been developed to overcome the aforementioned disadvantages.

It is, therefore, a first object of the present invention to provide an ideal production system, which takes in sales information from retail outlets timely and with accuracy and manufactures products with flexibility in quick response to the sales information, thus making it possible to supply the market with any product when it is needed and in the quantity needed.

To accomplish the above object, the production system for retail goods in accordance with the present invention has the following constitution. Thus, this system comprises a retail sales information collecting means, a production quantity setting means for determining a production quantity according to the sales information collected by the first-mentioned means, a directing means for directing the preparation and production of raw materials according to the production quantity determined as above, and a production means for producing the determined production quantity in accordance with the direction.

In the above arrangement, as sales information from retail outlets are transmitted by said retail sales information collecting means to said production quantity setting means, the production quantity is set immediately.

Then, this production quantity data is fed to said directing means for directing the preparation and production of necessary raw materials and the production means receiving a direction to produce from said directing means performs the production of the determined production quantity.

As mentioned just above, the production system according to the present invention sets a production quantity in response to sales information from retail outlets, directs the preparation and production of raw materials necessary for production of the set production quantity and performs the production of the same quantity, thus making it possible to produce any product that sells when it is needed and in the quantity that is certain to be sold.

Therefore, all the problems encountered in the past, such as deficiencies in stocks at retail outlets and the consequent loss of sales opportunities or excessive accumulation of inventories can be obviated and an ideal manufacturing system can be established.

Preferably, it is so arranged that said retail sales information is collected from a plurality of sample stores or departments and that said production quantity setting means comprises a scale-up estimating routine for scaling-up of the retail sales information and a demand forecast routine for predicting the demand according to the scale-up estimate. Such a construction is conducive to a more accurate setting of production quantity.

Furthermore, said production means is preferably provided with an automatic switching function for automatically changing the powers etc. of the components of production equipment in accordance with directions to produce. As the production means is so constructed, it is possible to establish a production system which is quick to respond to directions to produce without requiring switching of parts, for instance.

For directing or ordering the preparation and production of raw materials required in said production system for retail goods, one may employ Raw materials ordering systems I and II hereinafter explained. Raw materials ordering system I is to be used in connection with those raw materials which do not require special processings after placement of an order, such as material substances to be mixed to produce hair-lotions. Raw materials ordering system II is to be used for those raw materials which require various processings after placement of an order, such as containers of cosmetics.

Raw Material Ordering System I

It is a second object of the present invention to provide a raw material ordering system which is flexible enough to timely respond to production needs without carrying an excessive stock of raw materials and, particularly in industries where many items are produced in small lots, enables an economical and effective control and supply of raw materials which are otherwise complicated and time-consuming. In other words, the present invention provides a "raw material mixing system" wherein a raw material prepared for producing one item is diverted for producing another item when a necessity of producing additional number of products of such another item emergently arises.

To accomplish the above object, the raw material ordering system of the present invention has the following constitution. This system, which determines the order size of each raw material according to a production plan for a product, comprises an order quantity determining means which sequentially sets or modifies the required quantities of raw materials for each day in accordance with the daily production plan or changes in the production plan and determines the order size in accordance with the attributes, inventories, order backlogs and in process quantities of the raw materials and said required quantities of raw materials and a data input processing means which modifies said inventory quantities in response to raw material acceptance information and modifies said production plan and raw material inventory quantities in response to production data.

In the above arrangement, the required quantities of respective raw materials are set in accordance with the day-to-day production plan and the aforesaid required quantities are updated every time a change is made in the production plan.

Then, the order size is determined, and an order is placed, with reference to the raw material attributes, such as standard lead time, supply quantity, safe stock level, etc., current inventory, order backlog, in-process quantity and required quantity of the raw material so that the respective raw materials can be made available in amounts just necessary and sufficient for current production needs without the disadvantage of placing an unnecessary order.

Furthermore, as the production plan and raw material inventory values are updated automatically in accordance with raw material acceptance data and production data, a flexible raw material ordering system self-adapting to the flow of raw materials can be established.

Thus, the raw material ordering system of the present invention permits placing orders for raw materials which are commensurate with the daily production plan. The required quantities of raw materials are set in response to every change in the production plan for a given day, and based on the required quantities so set, as well as on the attributes, inventory levels, order backlogs and in-process quantities of respective raw materials, the optimum order sizes are determined so that necessary raw materials can be procured when needed and in appropriate quantities.

Since the raw material inventory data and the daily production plans are automatically updated upon receipt of raw material acceptance data and production data, the correct order sizes can be determined for meeting production needs without the risk of carrying excessive raw material inventories and, particularly for manufacturers who produce a large variety of products in small lots and, as such, should otherwise go through complicated ordering procedures, can now easily place orders for the necessary raw materials at the right time in the quantities just needed.

Furthermore, it is preferable to arrange said data input processing means so that the order backlog data is updated in response to the input of raw material order acknowledgement and acceptance data and that the in-process data be also updated in response to the input of said (order acknowledgement data.

Raw Material Ordering System II

It is a third object of the present invention to provide a raw material ordering system which controls raw material inventories in all forms according to processes and permits placing orders for necessary raw materials when needed and in the quantities needed, or at optimum times, without the disadvantage of carrying excessive inventories in the respective processes. This system is for those raw materials which require processings after placement of an order.

To accomplish the above object, the raw material ordering system of the present invention has the following constitution. This system, which places orders for the necessary raw materials comprises a raw material history memory means which, for any raw material undergoing various processes before it attains its final form, memorizes the relationship of the condition at feeding to each process with the condition at completion of the process, a raw material inventory register means which determines and registers the inventory quantity of each raw material, a product constitution memory means which memorizes the raw materials constituting each product and the required quantities thereof, a raw material demand setting means which, for the necessary raw materials, determines the raw material demand quantities for respective processes retroactively from release to feeding in each process by reference to said raw material history memory means, and a raw material order processing means which issues an order for any raw material to each process in accordance with the raw material demand quantity set by said raw material demand setting means and the raw material inventory quantity registered in said raw material inventory register means.

In the above arrangement, the relationship between feeding and release of each raw material undergoing various processes such as working, assembling, etc. are memorized as raw material history information. Therefore, once a scheduled marketing quantity is set for a given product, the required quantities of raw materials at each process level can be determined by tracing the flow back from the finished product to each necessary raw material and thence to the form of the same raw material at feeding to the process for conversion to the form suited for release.

Since, in this manner, an order can be issued to each of the processes for any raw material in the corresponding form or condition, the required raw materials can be procured when needed and in the quantities needed without the risk of carrying unnecessary raw material inventories.

Thus, in accordance with the raw material ordering system of the present invention, since ordering can be made on a process-by-process basis or in accordance with the form of each raw material at each process level by reference to the history of the raw material, viz. finishing, assembling, etc. (factory) up to the final raw material, the risk of carrying an excessive inventory can be avoided and the required raw materials can be made available when needed and in the quantities needed.

BRIEF DESCRIPTION OF THE DRAWINGS

FIG. 3 is a schematic view illustrating an example of product characteristics classification in the table of FIG. 2;

FIGS. 5A through 5B each is a diagram showing the data structure of a demand forecast data table;

FIG. 7 is a diagram showing the sales course pattern of a product;

FIG. 9 is a flow chart showing the action of a production quantity determining routine;

FIG. 10(a) through (d) each is a diagram showing the data structure of a raw material data table;

FIG. 15 is a view showing the overall construction of a raw material ordering system as an embodiment of the invention;

FIGS. 16 through 19 are diagrams showing an inventory data table, a production plan data table, a production plan modification transfer data table and a required quantity data table, respectively;

FIGS. 49A through 49D are explanatory diagrams showing the same data tables substituted by factual values;

FIGS. 50 and 51 are views explaining the processessing of values applied in FIG. 49;

DETAILED DESCRIPTION OF THE PREFERRED EMBODIMENTS

A Production System for Retail Goods

Figure 1:
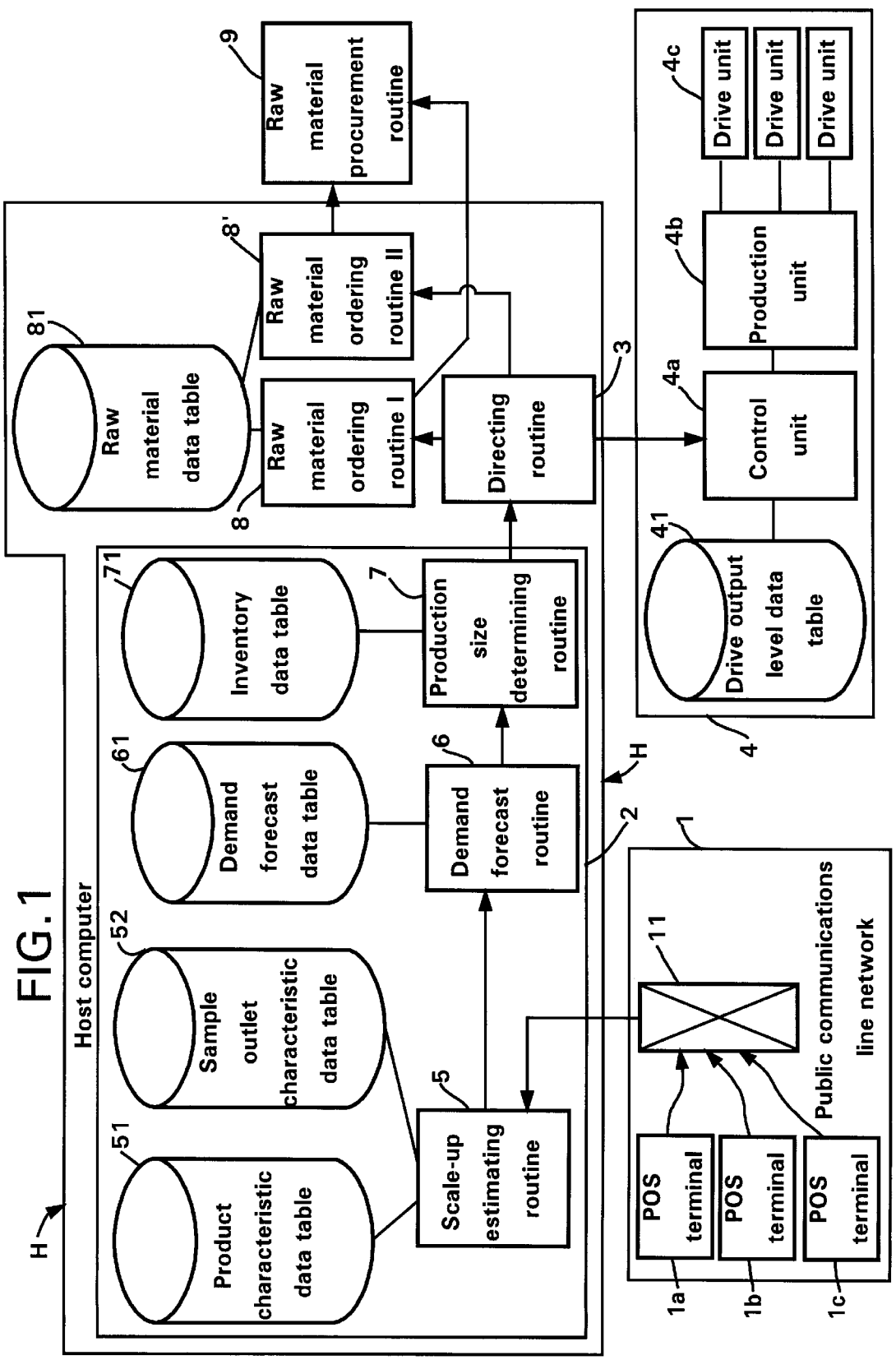
FIG. 1 is an overall block diagram showing an embodiment of the production system for retail goods in accordance with the present invention.

FIGS. 1 through 14 are views illustrating an embodiment of the production system linked to retail sales in accordance with the present invention. As shown, this system comprises a retail sales information collecting means 1, a production size setting means 2, a directing means 3 for directing the preparation and production of raw materials, and a production means 4.

The retail sales information collecting means 1 comprises a plurality of point-of-sale (POS) terminal units 1a, 1b, 1c . . . installed at different retail outlets and a public communications line network 11 connecting said POS terminal units 1a, 1b, 1c . . . with a host computer H. These POS terminals 1a, 1b, 1c . . . each memorizes the product names and the quantity of each product sold and transmits the stored information to the host computer H daily at a fixed hour of the day.

These POS terminals 1a, 1b, 1c . . . are not installed at all the retail outlets for any given product but are installed at sampled outlets representing a given percentage of the total of such retail outlets. These sample outlets are selected from among the volume-selling outlets so that the system may receive sales information more efficiently.

The production size setting means 2 includes a scale-up estimating routine 5, a demand forecast routine 6 and a production size determining routine 7.

The scale-up estimating routine 5 receives sales information from said plurality of POS terminals 1a, 1b, 1c . . . through said public communications line network 11 from time to time as input data. In this scale-up estimating routine 5, a scale-up estimate is obtained by means of the following equation (1). Scale-up estimate=

$$\begin{pmatrix} \text{Number of units of} \\ \text{product } X \text{ sold} \\ \text{at sample outlets} \end{pmatrix} \times \tag{1}$$

$$\frac{\begin{pmatrix} \text{Total number of} \\ \text{units purchased by} \\ \text{all outlets during} \\ \text{past year} \end{pmatrix}}{\begin{pmatrix} \text{Total number of} \\ \text{units purchased} \\ \text{by sample outlets} \\ \text{during past year} \end{pmatrix}} \times \begin{pmatrix} \text{Estimated deviation} \\ \text{for product } X \text{ when} \\ \text{all outlets are substituted for sample} \\ \text{outlets} \end{pmatrix}$$

The manner of the above estimation is now described using an example.

Figure 2:
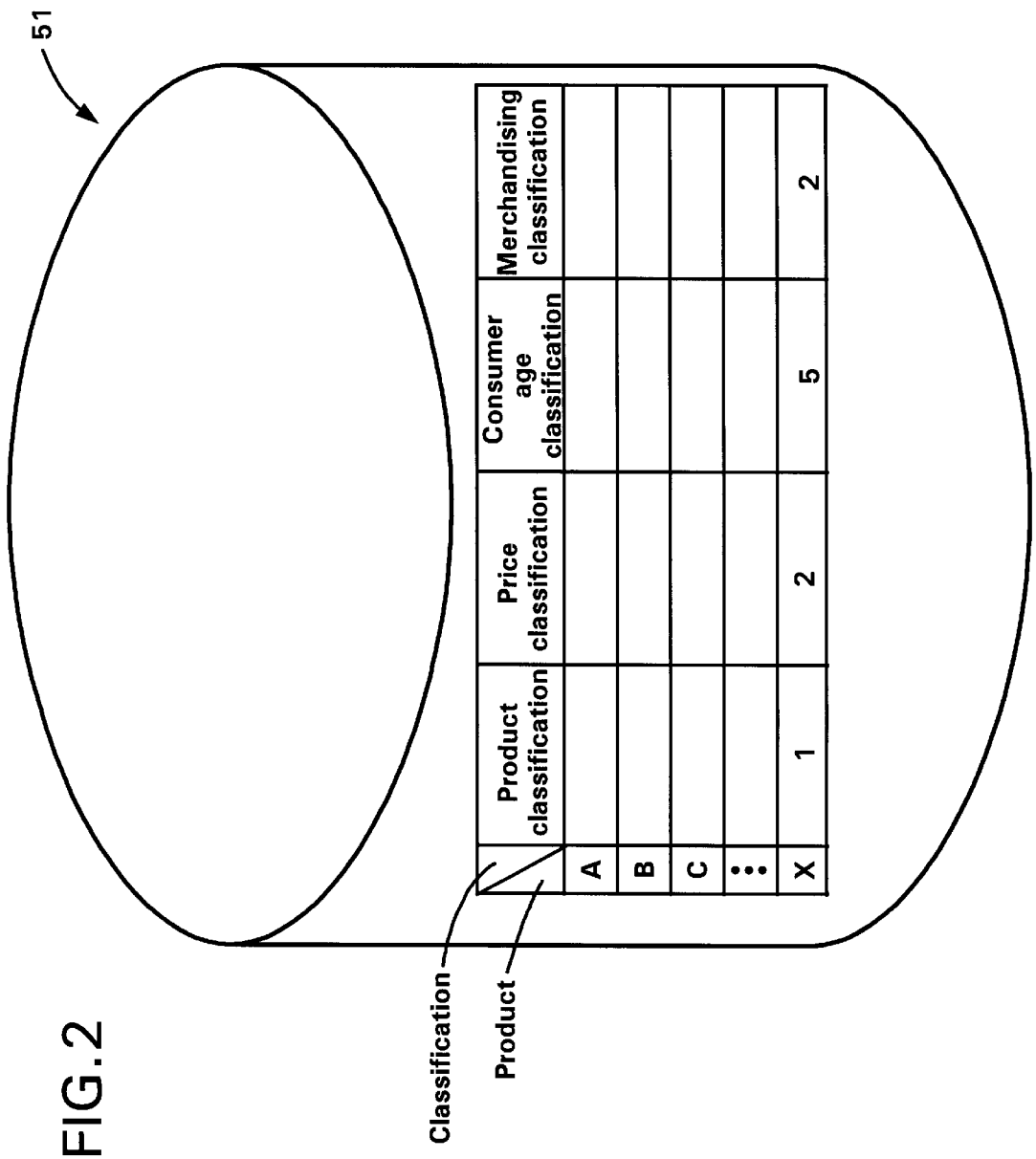
FIG. 2 is a diagram illustrating the data structure of a product characteristics data table.

FIG. 2 shows an example of the product characteristics data table 51 connected to the scale-up estimating routine 5. Here, for each of products A, B, C . . . X, the product classification, price classification, consumer age classification and merchandising classification data are stored.

FIG. 3 shows the particulars of each of the above four classifications. The product classification comprises six classes, namely foundation cosmetic, make-up cosmetic, shampoo & rinse, perfume & cologne, cosmetic sundry, and men's cosmetic as represented by the numerals of 1 through 6, respectively. The price classification comprises five classes of low, medium-low, medium, medium-high, and high. The consumer age distribution comprises five classes, namely low, intermediate between low and average, average, intermediate between average and high, and high as represented by numerals 1 through 5, respectively. The merchandising classification comprises five classes, namely display sale, rather display sale, equivocal, rather counseling sale, and counseling sale as represented by numerals of 1 through 5, respectively.

The above product characteristics data are determined at the stage of product planning and as shown by entries in the column of product X in FIG. 2, the above-mentioned numerals are entered and stored for respective classes of each classification. Thus, product X corresponds to Product Classification: 1 foundation cosmetic, Price Classification: 2 medium-low, Consumer Age Classification: 5 high, and Merchandising Classification: 2 rather display sale. Stated differently, product X is "a foundation cosmetic for consumers of advanced (high) age who spend in medium-to low-price goods, which is merchandised by a method of sale which is rather close to display sale."

Figure 4C:
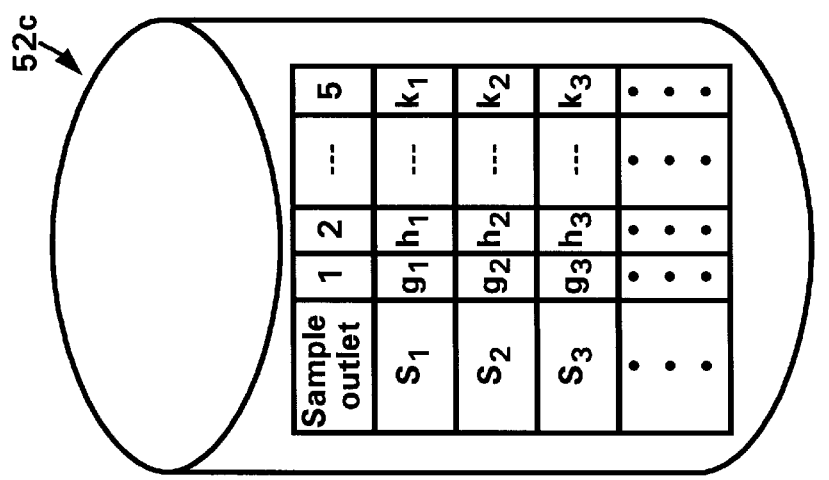
FIGS. 4A through 4E each is a diagram showing the data structure of a sampled outlet characteristics data table.
Figure 4B:
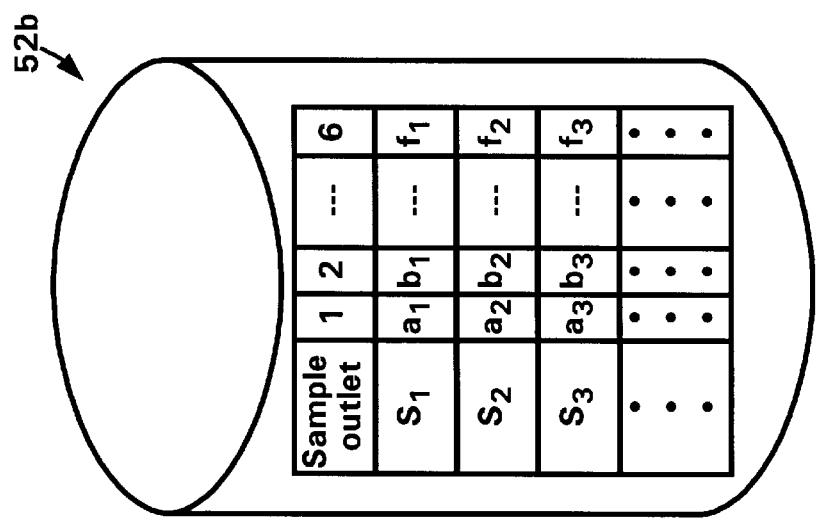
Figure 4A:
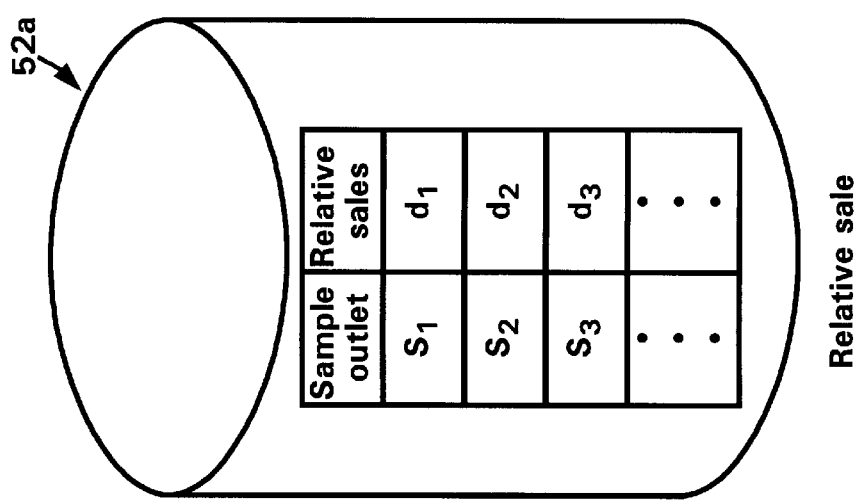
Figure 4D:
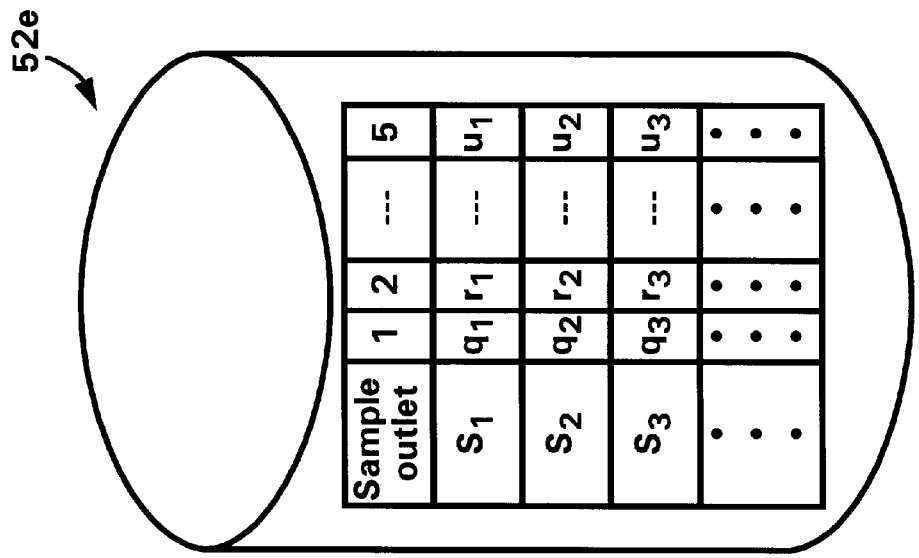
Figure 4E:
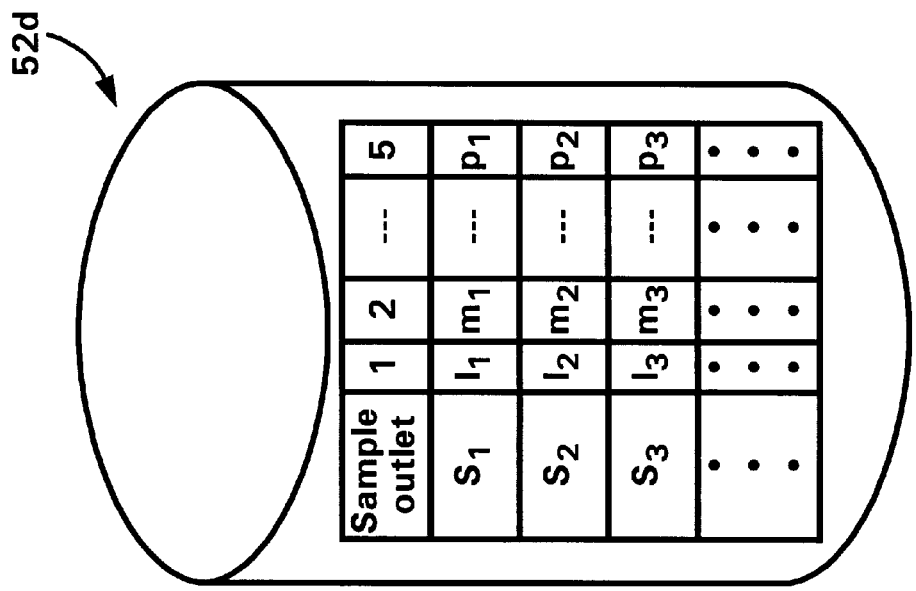

FIG. 4(a) through (e) are views showing examples of sample retail outlet characteristics data table 52. Here, for each of sample outlets $S_1$, $S_2$ and $S_3$, data on the constitution and quantities of purchases during the past year relative to those of all retail outlets are entered and stored. Thus, FIG. 4(a) is a data table 52a showing the relative sale for each of sample outlets $S_1$, $S_2$, $S_3$ .... FIG. 4(b) through (e) are data tables 52b, 52c, 52d and 52e showing the product characteristic, price characteristic, consumer age characteristic and merchandising characteristic, respectively, for each of sample outlets $S_1$, $S_2$, $S_3$ .... The aforesaid four characteristics in these data tables 52b, 52c, 52d and 52e are represented in index numerals (1 if each is the same as the national average) in correspondence with the four classifications described hereinbefore with reference to FIG. 3. Thus, for example, the index for Product Classification: 1 foundation cosmetic is $a_1$ and the index for Price Classification: 1 low is $g_1$ for sample outlet $S_1$.

Assuming that the quantities of product X sold at sample outlets $S_1$, $S_2$ and $S_3$ are $y_1$, $y_2$ and $y_3$, respectively, the scale-up estimate for product X can be calculated by the following equation using the data from the aforementioned product characteristics data table 51 and the sample outlet data table 52. Scale-up estimate for product X=

$$(y_1 + y_2 + y_3) \times \frac{1}{\alpha_1 + \alpha_2 + \alpha_3} \times \quad (2)$$

$$\frac{\alpha_1 + \alpha_2 + \alpha_3}{(\alpha_1 a_1 + \alpha_2 a_2 + \alpha_3 a_3)} \times \frac{\alpha_1 + \alpha_2 + \alpha_3}{(\alpha_1 h_1 + \alpha_2 h_2 + \alpha_3 h_3)} \times$$

$$\frac{\alpha_1 + \alpha_2 + \alpha_3}{(\alpha_1 p_1 + \alpha_2 p_2 + \alpha_3 p_3)} \times \frac{\alpha_1 + \alpha_2 + \alpha_3}{(\alpha_1 r_1 + \alpha_2 r_2 + \alpha_3 r_3)}$$

Thus, as the set characteristics of product X are Product Classification 1, Price Classification 2, Consumer Age Classification 5 and Merchandising Classification 2 as shown in FIG. 2, the indexes for respective characteristics shown in FIG. 4(b) through (e) correspond to the above classifications, namely $a_1$, $a_2$ and $a_3$ for Product Characteristic 52b, $h_1$, $h_2$ and $h_3$ for Price characteristic 52c, $p_1$, $p_2$ and $p_3$ for Consumer Age Characteristic 52d, and $r_1$, $r_2$ and $r_3$ for Merchandising Characteristic 52e.

The scale-up estimating routine 5 for calculating scale-up estimates is connected to a demand forecast routine 6 which predicts demands according to the scale-up estimates for respective products which are available from the scale-up estimating routine.

Figure 6:
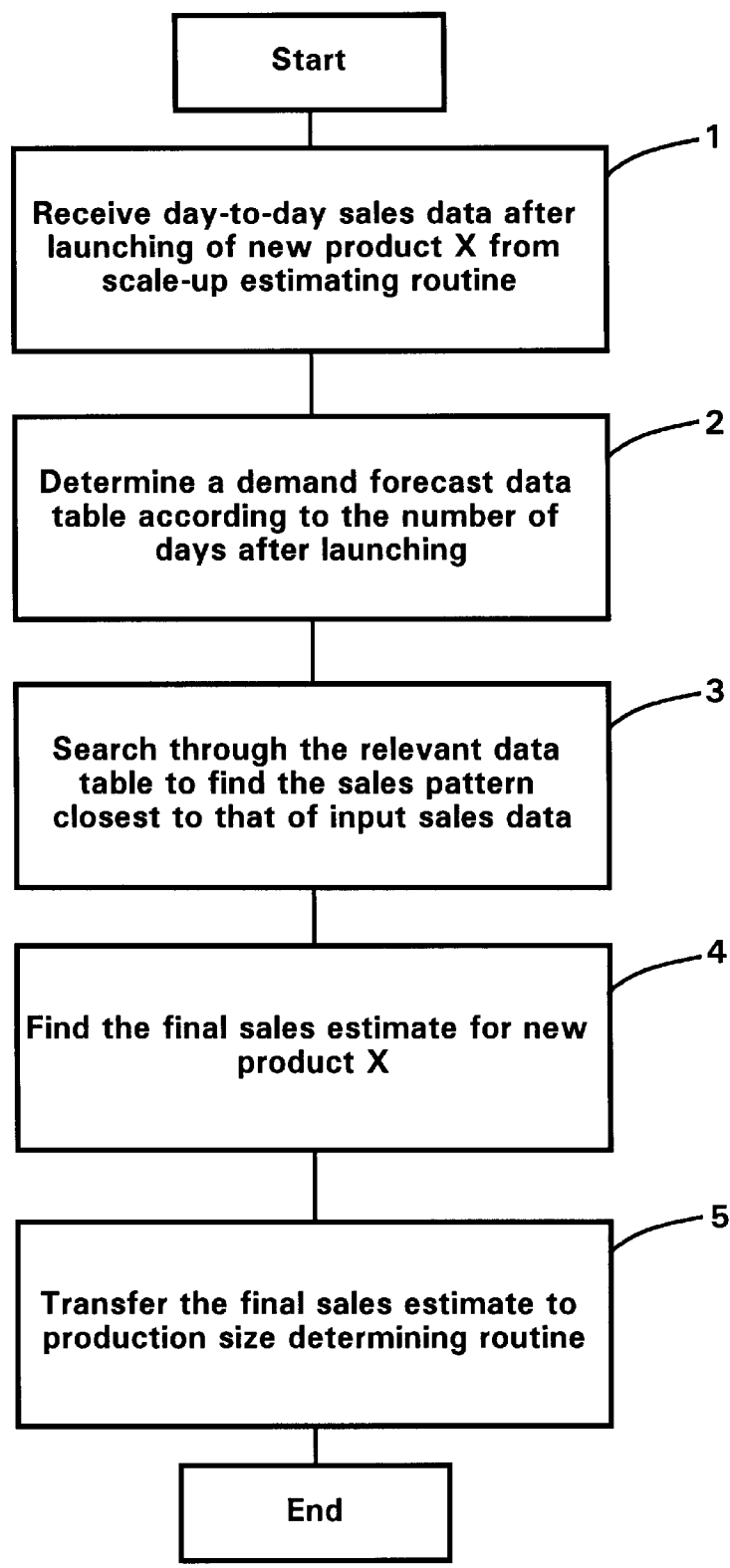
FIG. 6 is a flow chart showing the action of a demand forecast routine.

This demand forecast routine 6 performs a demand forecast in the steps shown in the flow chart of FIG. 6 using the data stored in demand forecast data tables 61a, 61b shown in FIG. 5(a) and (b). Thus, stored in the demand forecast data table 61a of FIG. 5(a) are many sales course patterns (3 patterns ① through ③ in the views) during 5 days following the launching of the product and the final sales estimates applicable to the respective patterns ① through ③. Similarly stored in the demand forecast data table 61b shown in FIG. 5(b) are the sales course patterns after said 5 days, namely during 6 days after launching, as well as final sales estimates, for the product for which the pattern ② was found in said table 61a.

Then,

Step ①: Receiving of daily sales course data after launching of new product X from said scale-up estimating routine 5;

Step ②: Selecting the relevant demand forecast data table 61 according to the number of days after launching. Thus, if it is 5 days after launching, the above table 61a for 5 days is selected and if it is 6 days, table 61b is selected.

Step ③: Searching through the data table 61 selected in step ② to find a sales course pattern nearest to the pattern of sales course data received.

Step ④: Finding the final sales estimate for the product.

Step ⑤: Transfer ring the above estimate to a production size determining routine 7 which is described hereinafter.

Thus, let it be assumed that the sales course pattern during 5 days following the launching of new product X is as shown in FIG. 7. Then, the demand forecast data table 61a shown in FIG. 5(a) is chosen as the relevant table and this table 61a is searched through for pattern matching. As a result, the sales course pattern of new product X is found to approximate the pattern ② stored in the table 61a and a forecast is made that at least $a_2$ units of this product X will be ultimately sold. Then, the production size determining routine 7 is approached accordingly. Since this final sales estimate is the lowest value selected by reference to the past sales performance, the very selection of pattern ② in the table 61a guarantees the sale of $a_2$ units.

Figure 8:
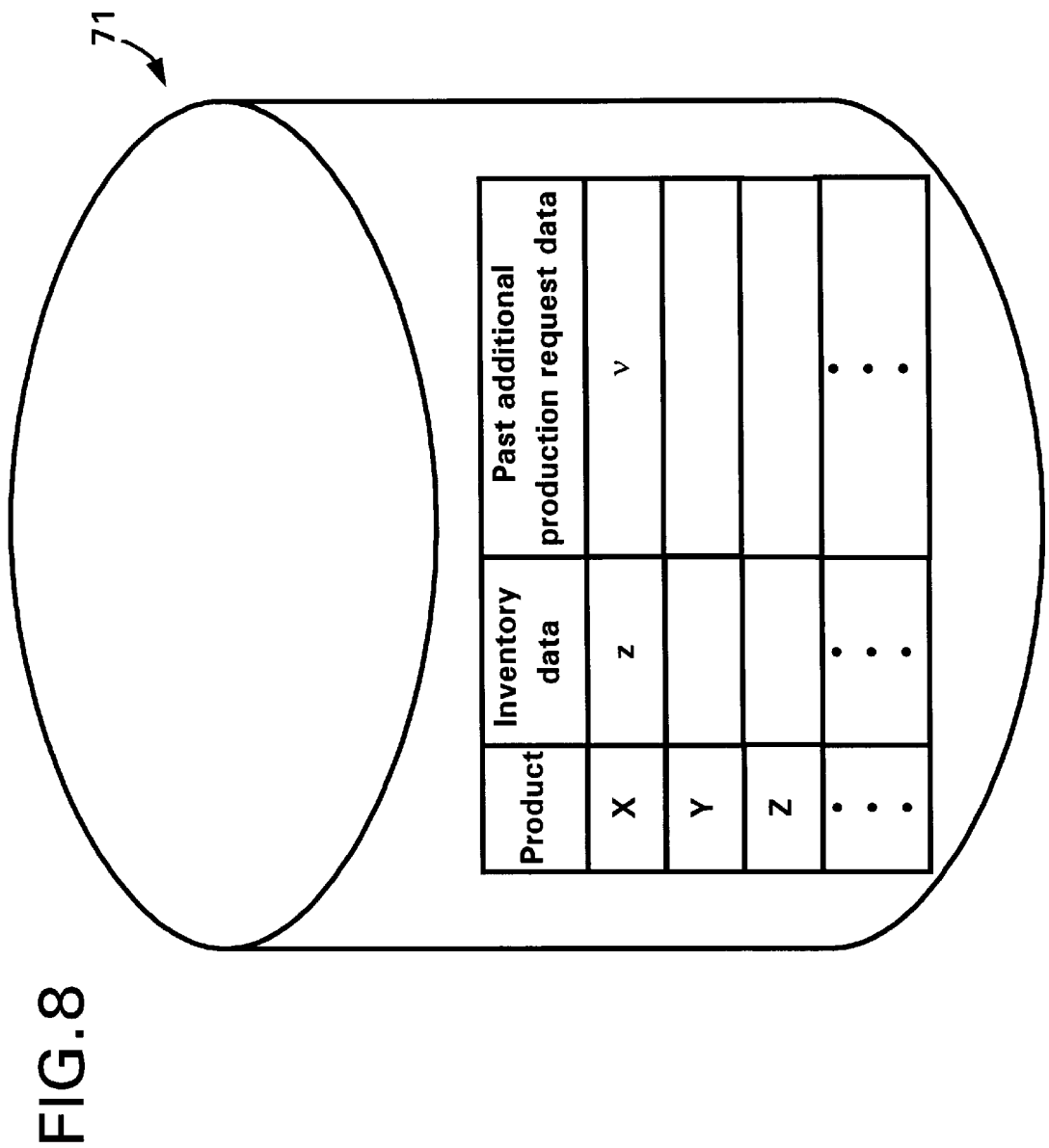
FIG. 8 is a diagram showing the data structure of an inventory data table.

The final sales estimate thus obtained in the demand forecast routine 6 is fed to the production size determining routine 7 connected to the demand forecast routine, where the production size is determined in the steps shown in the flow chart of FIG. 9 using an inventory data table 71 shown in FIG. 8. Thus, stored in the inventory data table 71 of FIG. 8 are the inventory quantities and past additional production request quantities for new products X, Y, Z . . . .

Thus,

Step ①: Retrieving the final sales estimate X for new product X from said demand forecast routine Step ②: Retrieving the inventory quantity z and past additional production request quantity v for product X from said inventory data table 71

Step ③: Assuming that the number of days after launching of new product X is n days, calculating the sales volume by scale-up estimation for this period, $$\sum_{i=1}^{n} yi$$

(yi is the sales volume by scale-up estimation on day i after launching)

Step ④: Calculating the required size of additional production of new product X by means of the following equation (3):

$$X - \sum_{i=1}^{n} yi - z - v$$

=required size of additional production S (3)

Step ⑤: Transferring this required size of additional production S to the raw material ordering routine 8 and the control routine 4a for the production means 4, which are described hereinafter.

Step ⑥: Updating said additional production request quantity data in the inventory data table 71 with the result of the above calculation to provide a new data.

The required size of additional production thus determined in the production size determining routine 7 is fed to the raw material ordering routine 8 and the control routine 4a for the production means 4 simultaneously through the directing means (directing routine) 3 connected to said determining routine 7 for timely production.

As the production is completed in production means 4, the inventory data and past additional production request quantity data in the inventory data table 71 are updated to provide new data. Thus, the current inventory of new product X is Z units but upon receipt, from the control routine 4a of production means 4, of the information that the production of additional production request quantity S of product X has just been completed, the inventory data for poduct X is updated to Z+S.

Meanwhile, the past additional production request quantity for this product X is U units as of the present time but upon receipt of the information that the production of said required quantity S has been completed, the additional request quantity data is updated to U−S units.

Figure 11:
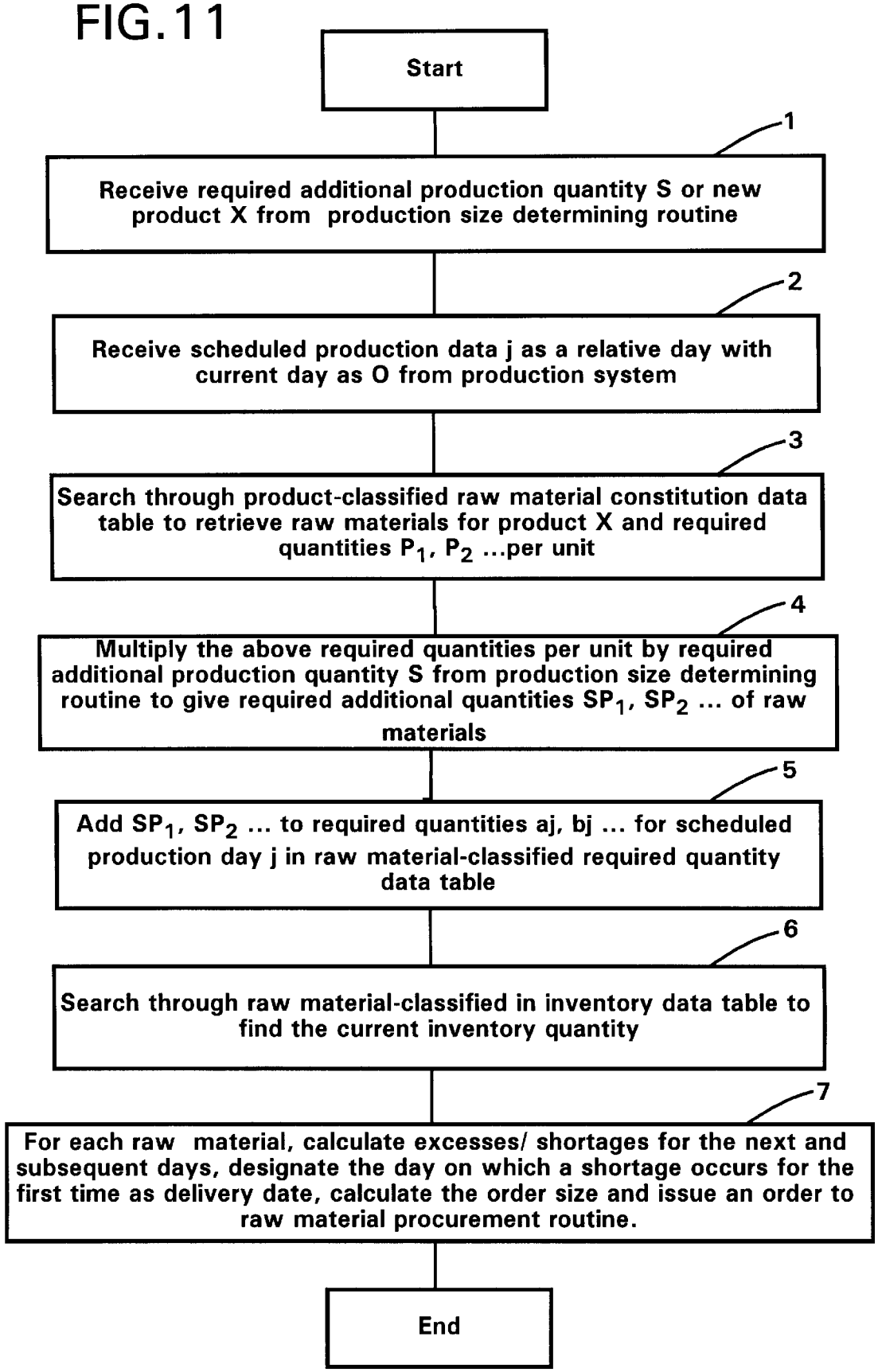
FIG. 11 is a flow chart showing the action of a raw material ordering routine.
Figure 12:
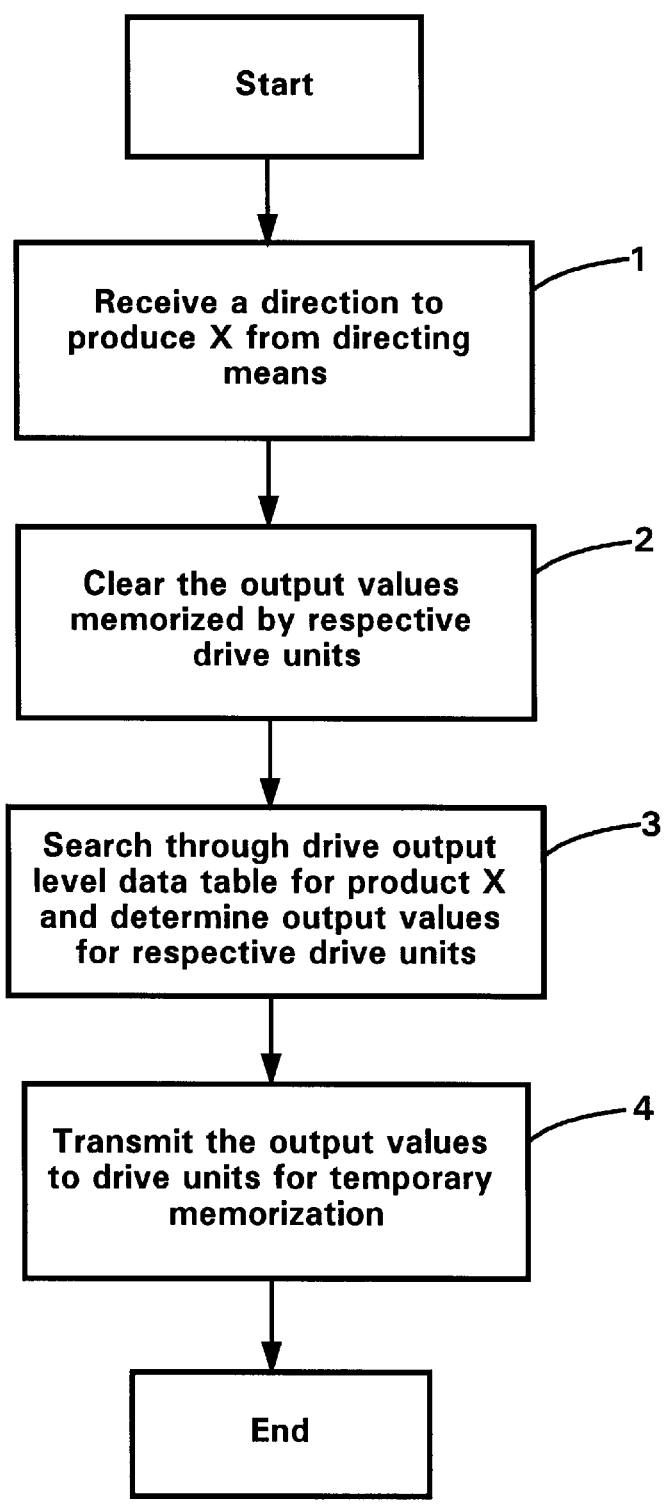
FIG. 12 is a flow chart showing the action of a production means control routine.

A raw material ordering system will now be briefly explained making reference to FIGS. 10 and 11. This system is substantially the same with what is stated in details in the section of Raw material ordering system I below. In this case, a raw material ordering routine 1 I 18 in FIG. 1 is employed. Instead of this raw material ordering routine, one may utilize the system described in the section of Raw material ordering system II below. In this latter case, a raw material ordering routine II 8' in FIG. 1 is used.

Thus, the raw material ordering routine I 8 using the raw material data table 81 shown in FIGS. 10(a) through (d) calculates the quantities of raw materials to be ordered in the steps shown in FIG. 11 and place orders to a raw material procurement routine 9. This raw material data table 81 comprises a product-classified raw material constitution data table 81a shown in FIG. 10(a), a raw material-classified required quantity data table 81b shown in the same figure (b), a raw material-classified inventory data table 81c shown in the same figure (c), and a raw material-classified acceptance schedule data table 81d shown in the same figure (d). Entered and stored in said product-classified raw material constitution data table 81a are the required quantities, per unit, of constituent raw materials α, β ... for each of product A, B ... X. For example, these data indicate that $p_1$ units of raw material α are required for the production of 1 unit of product X. Similarly entered and stored in the raw material-classified required quantity data table 81b are the quantities $\alpha_1, \alpha_2, \ldots \alpha_n$ of each raw material required (to be used) on a day-to-day basis (1~n days). Stored in the raw material-classified inventory data table 81c are the inventory data Zα, Zβ ... for raw materials α, β ..., while the acceptance schedule quantity data for raw materials α, β ... on a day-to-day basis (1~n days) are stored in the raw material-classified acceptance schedule data table 81d.

Thus,

Step ①: Receiving required additional production quantity S for new product X from said production size determining routine 7

Step ②: Receiving scheduled production day information j, with the current day being taken as 0, from the production means 4

Step ③: Searching through the product-classified raw material constitution data table 81a to find the constituent raw materials for this product X and the required quantities $p_1, p_2 \ldots$ thereof per unit of product X Step ④: Multiplying the above required quantities $p_1, p_1 \ldots$ of raw materials per unit by the required additional production size data S from said production size determining routine 7 to find the required additional quantities of raw materials $sp_1, sp_2 \ldots$ Step ⑤: Adding the required additional quantities of raw materials $sp_1, sp_2 \ldots$ to the respective required quantities aj, bj ... for scheduled production day j in the raw material-classified required quantity data table 81b.

Step ⑥: Searching through the raw material-classified inventory data table 81c to find the current raw material-classified inventory volume data as of the current day.

Step ⑦: Calculating the excess or shortage on each of the following and subsequent days for each raw material by means of the following equation (4) and designating the day on which a shortage occurs for the first time, that is to say when the aforesaid excess/shortage becomes negative, as the delivery date. The order size at this time is determined by the following equation (5) and this order size data is fed to the raw material procurement routine 9. Excess or shortage of raw material α on day k=

$$Z\alpha + \sum_{i=1}^{k} (ai* - ai) \qquad (4)$$

$$\text{Order size} = \sum_{i=1}^{n} (ai - ai*) - Z\alpha \qquad (5)$$

Thus, it is found from the product-classified raw material constitution data table 81a that 3 $p_1$ units of raw material α is required for the production of 3 units of new product X, and in the raw material-classified required quantity data table 81b, this required quantity $3p_1$ is added to the initially required (scheduled to use) quantity aj of raw material α for scheduled production day j. In other words, $aj+3p_1$ units of raw material α is required on day j. This is set as the new aj. Then, assuming that the current inventory of raw material α is Zα units, it is calculated that $$Z\alpha + \sum_{i=1}^{k} (ai* - ai)$$

units of raw material α will remain on day k. Assuming that this value becomes negative for the first time on day k, this day k is regarded as the delivery date for raw material α.

The production means 4, which receives a direction to produce from the directing routine 3 and performs the directed production, comprises a production unit 4b, which is a hardware, and a control routine 4a which controls the production unit 4b according to said direction.

Figure 13:
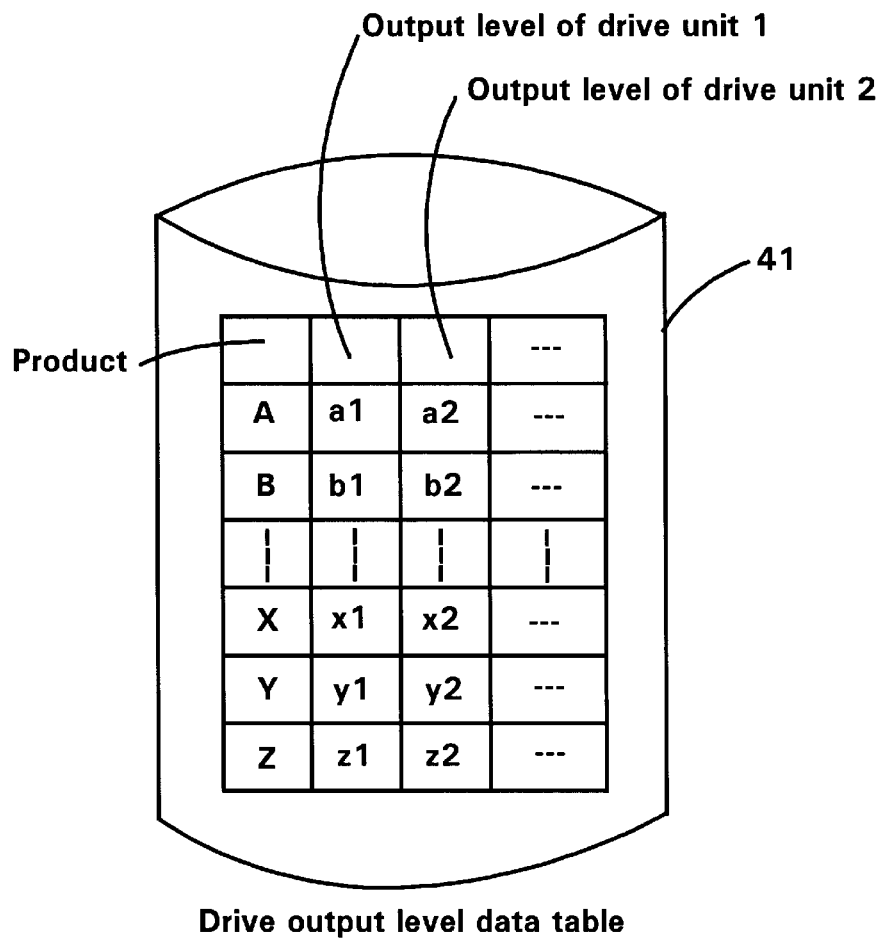
FIG. 13 is a diagram showing the data structure of a drive output data table.

The production unit 4b has drive units 4c for setting and outputting action ranges, speeds and powers for respective machine units and these drive units 4c are controlled by said control routine 4a. And as shown by the flow chart of FIG. 12, a drive unit output data table 41 shown in FIG. 13 is searched through on receipt of a direction to produce for automatic switching of respective drive units 4c. Entered and stored in this drive unit output data table 41 are the output values of drive units 1, 2 ... for each of products A, B ... Z.

Thus,

Step ①: Receiving a direction to produce product X from said directing means 3

Step ②: Clearing the output values memorized by respective drive units 4c

Step ③: Searching through the drive unit output data table 41 for this product X to determine output values for the respective drive units 4c

Step ④: Transmitting the output values to the respective drive units for temporary memorization and start of the production of product X.

Figure 14:
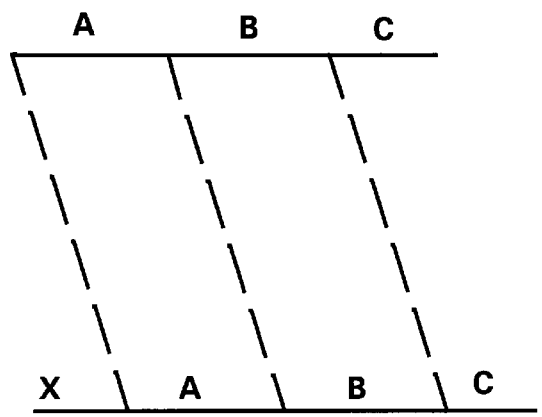
FIG. 14 is a diagram explaining the production system in a production routine.

Furthermore, this production means 4 is constituted so as to immediately respond to a direction to produce from said directing means 3. Thus, it is so arranged, as shown in FIG. 14, that the production line (production unit) 4b to which a direction for additional production of new product X will be issued is normally used for the production of staple products A, B and C (products such that if produced in anticipation, there is no risk of carrying large inventories) which are comparatively long in delivery term and that when a direction for additional production of new product X arrives from said directing means 3, the production of staple products A, B and C is deferred in the order mentioned to give priority to the production of this product X. Thus, for product X, the action from step ② explained with reference to FIG. 12 can be immediately commenced.

Figure 57:
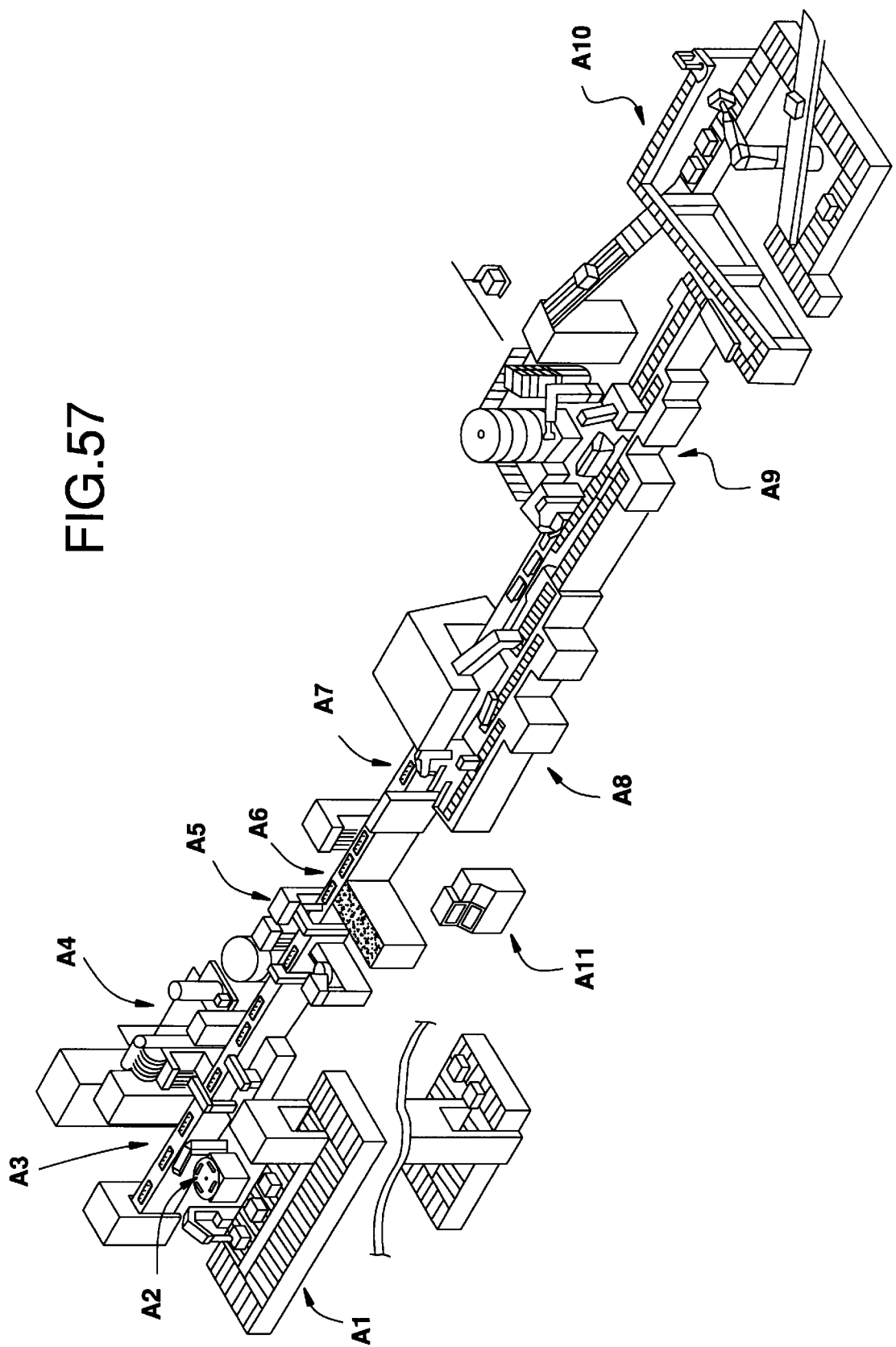
FIGS. 57 and 58 respectively show examples of production means having drive units and control routines.
Figure 58:
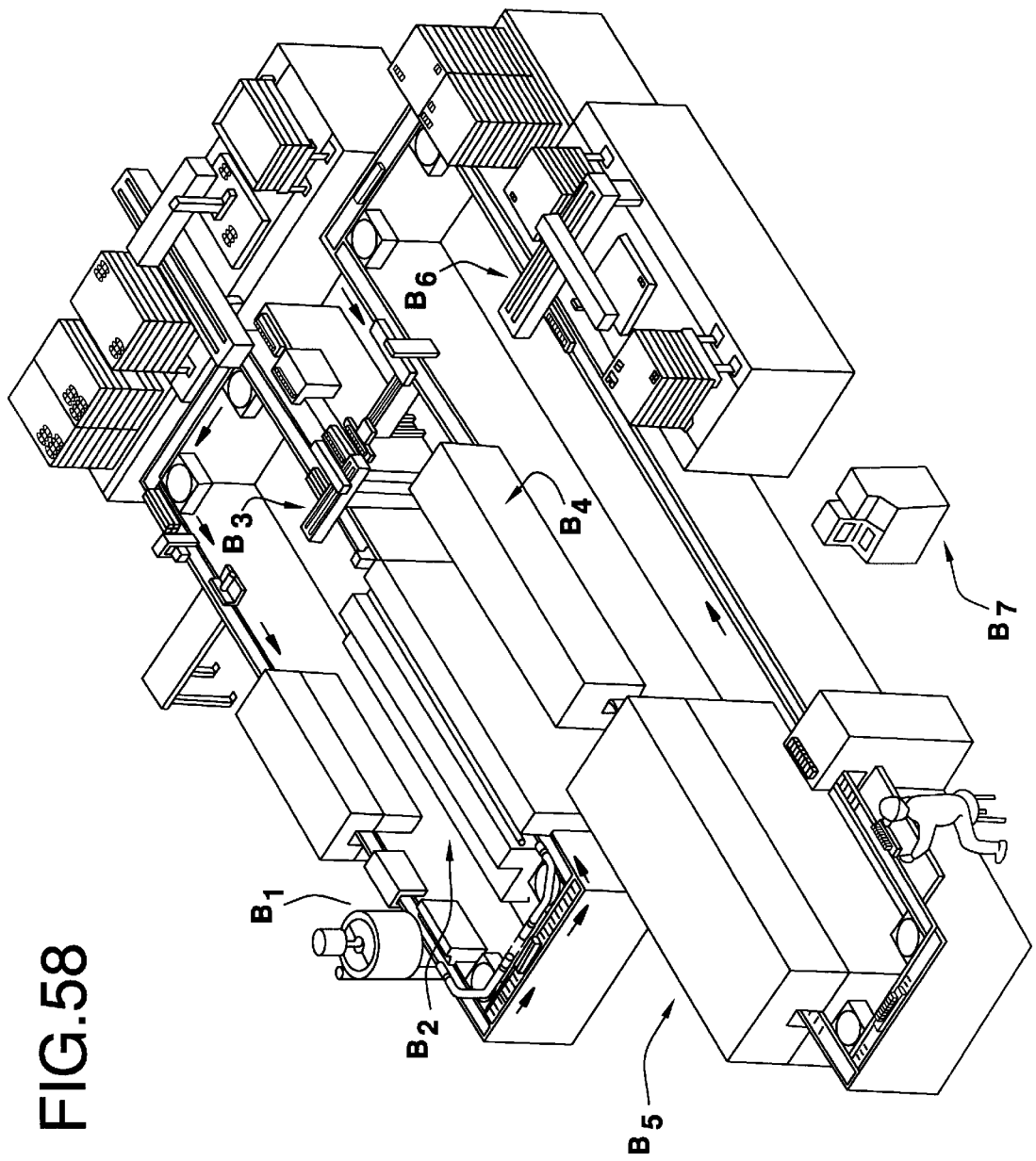

An example of the production means 4 is shown in FIG. 57, which is used for producing, for example, bottled lotions. The reference characters $A_1$ to $A_{10}$ and $A_{11}$ denote drive units and a control routine respectively.

Bottles are taken out from a box at the unit $A_1$, examined at the unit $A_2$, and conveyed by the unit $A_3$. Cosmetic materials (lotion) is bottled by the unit $A_4$. And inner caps and outer caps are fastened by the units $A_4$ and $A_5$ respectively. The outer appearance of the bottles are then examined by the unit $A_7$. A few bottles are packed in a box at the unit $A_8$, a certain number of such boxes are packed in a larger box at the unit $A_9$, and furthermore a certain number of the larger boxes are packed in a still larger box at the unit $A_{10}$. These drive units are controlled by a control routine $A_{11}$.

Raw Material Ordering System I

FIGS. 15 through 32 show a raw material ordering system embodying the present invention. In this system, a raw material ordering routine I 8 in FIG. 1 is used.

FIG. 15 is a view showing the overall construction of the raw material ordering system of the embodiment. As shown, this system comprises an order size determining means A and a data input processing means B.

The order size determining means A comprises an initial setting routine 101, a production plan setting routine 102, a required quantity setting routine 103, a production plan modifying routine 104, a required quantity modifying routine 105 and a order size determining routine 106.

Figure 19:
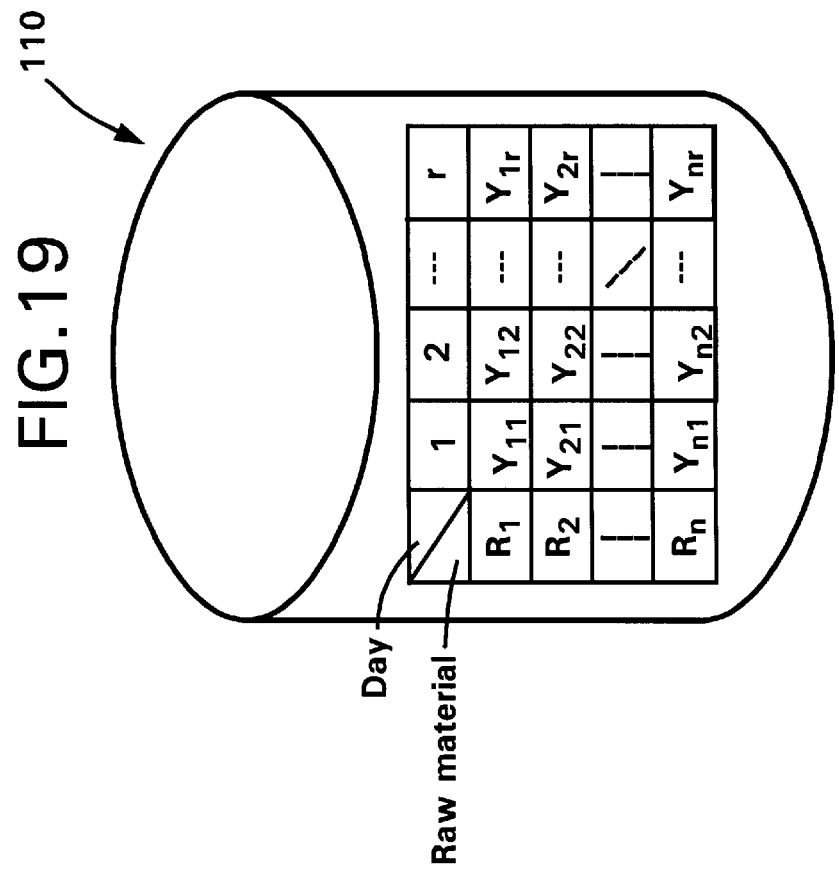
Figure 18:
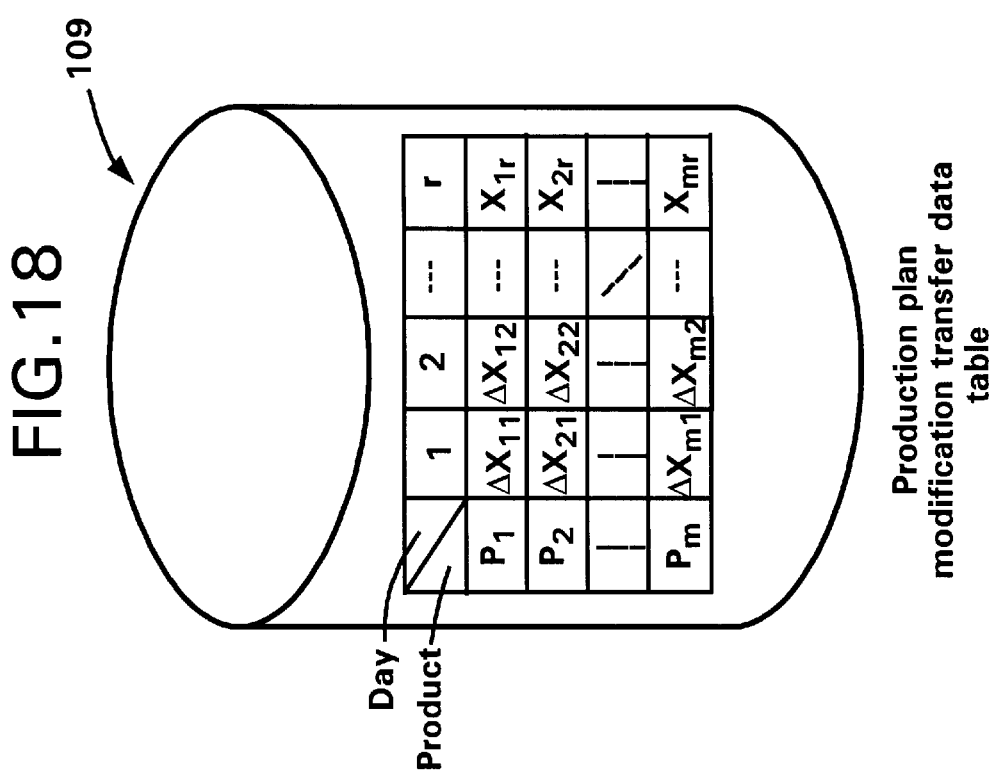
Figure 20:
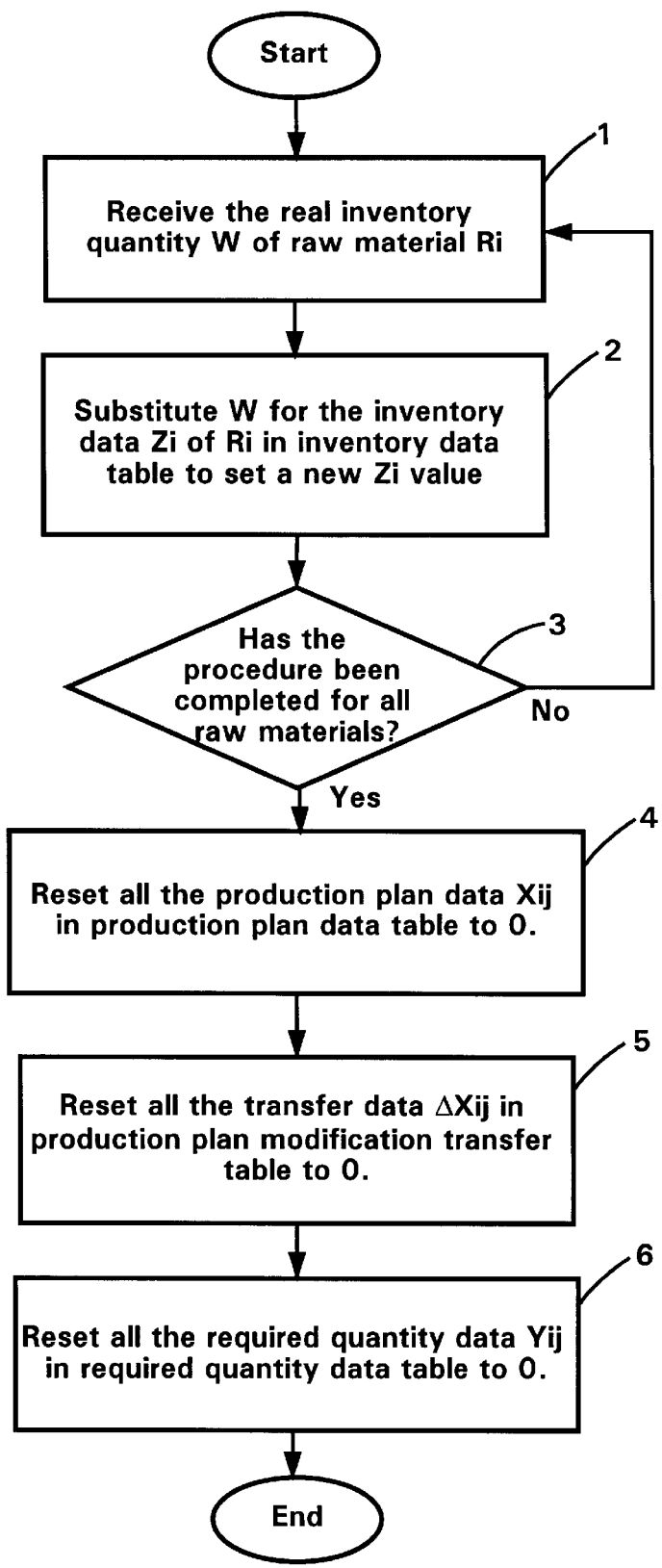
FIG. 20 is a flow chart showing steps in an initial setting routine.
Figure 21:
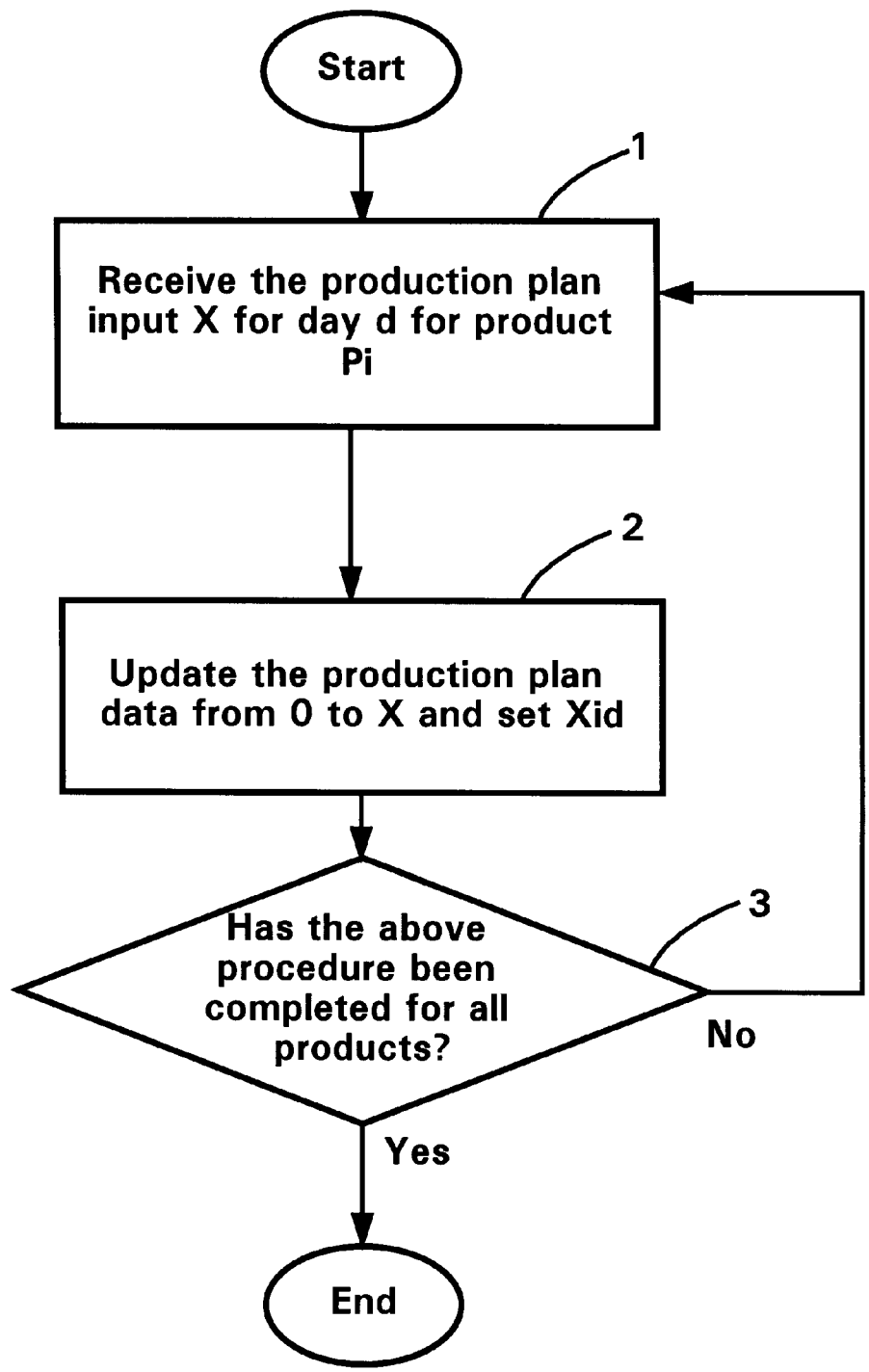
FIG. 21 is a flow chart showing steps in a production plan setting routine.
Figure 22:
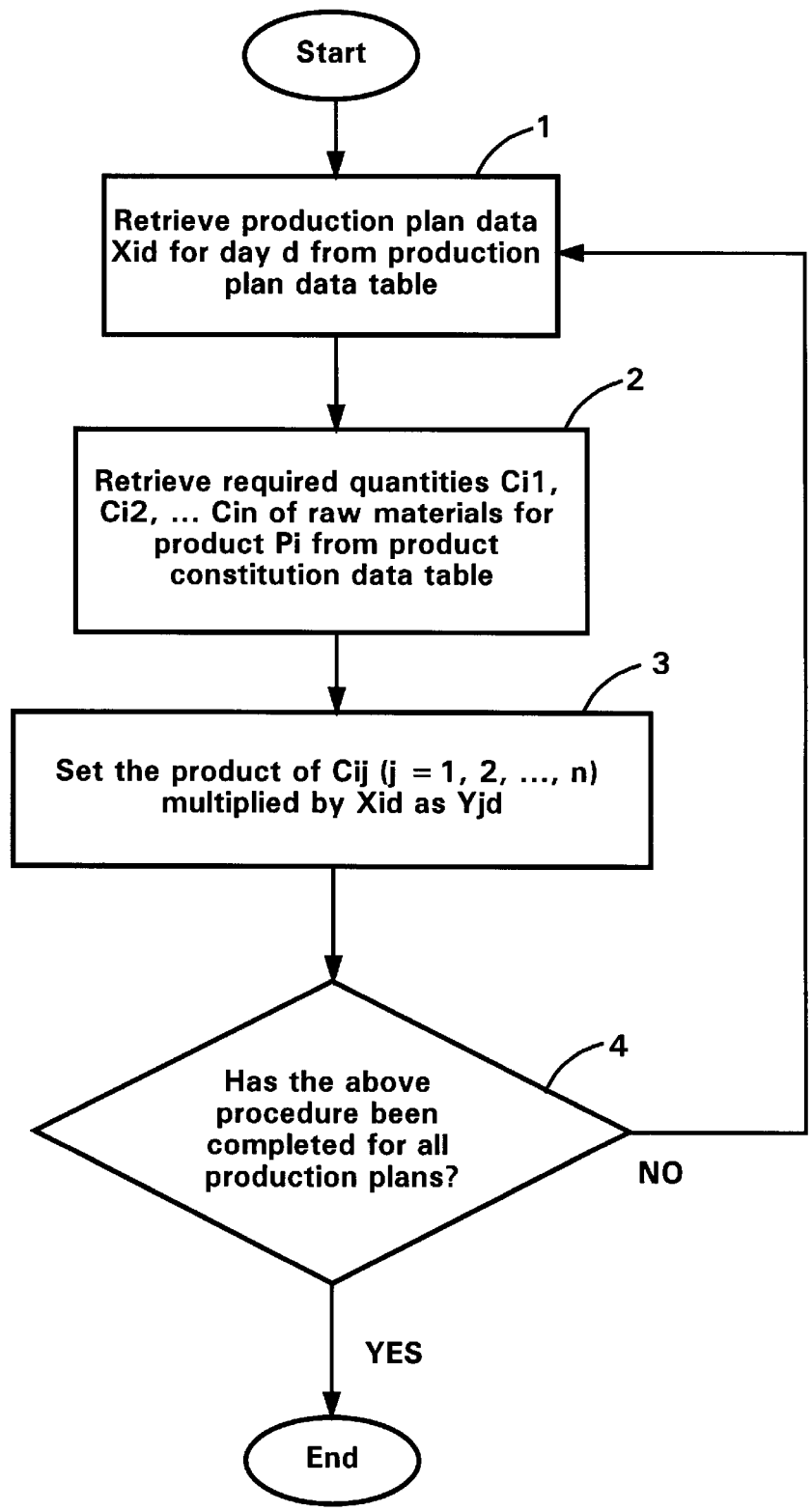
FIG. 22 is a flow chart showing a required quantity setting routine.
Figure 23:
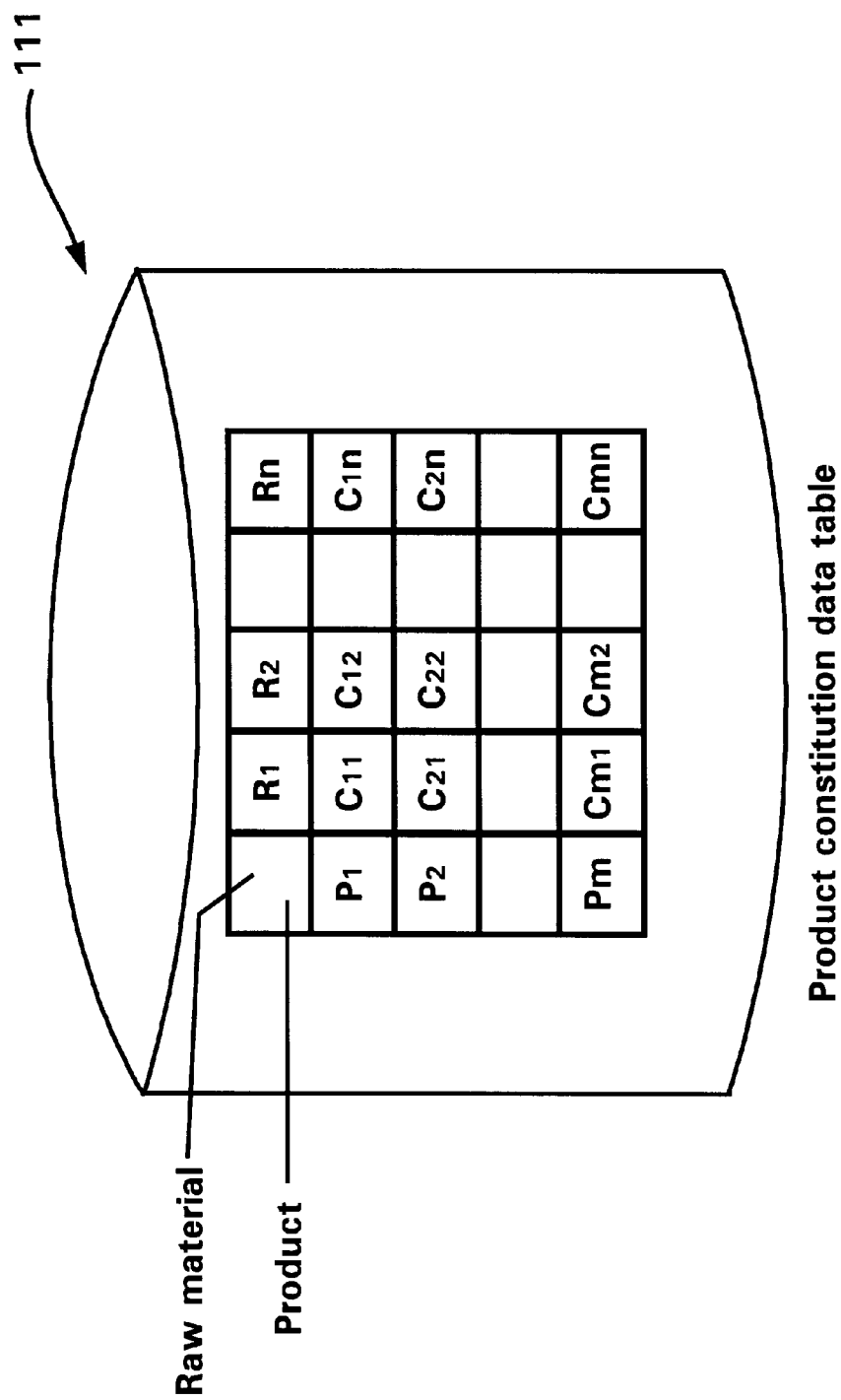
FIG. 23 is a diagram showing a product constitution data table.

Connected to the initial setting routine 101 are an inventory data table 107 shown in FIG. 16, a production plan data table 108 shown in FIG. 17, a production plan modification transfer data table 109 shown in FIG. 18 and a required quantity data table 110 shown in FIG. 19, so that for the data stored in these respective tables 107, 108, 109 and 110, initial setting may be performed in the steps shown in a flow chart of FIG. 20. Thus, in the inventory data table 107 shown in FIG. 16, inventory quantity data for respective raw materials are stored, while daily production plan data for respective raw materials are stored in the production plan data table 108. The production plan modification transfer data table 109 is designed for effecting the transfer of data when a modification of data in the required quantity data table 110 shown in FIG. 19 is made in response to modification of data in said production data table 108 and its details are described hereinafter.

Stored in the required quantity data table 110 are the data representing the required quantities of respective raw materials for respective days.

Step ①: Receiving an input of the current actual inventory quantity W of raw material Ri Step ②: Replacing the inventory quantity $Z_i$ for Ri in said inventory data table 107 with W to provide a new value of $Z_i$ Step ③: Confirming that all the above procedure has been completed for all raw materials. If the answer is affirmative, the sequence proceeds:

Step ④: Resetting all the production plan data $X_{ij}$ in said production plan data 108 to zero.

Step ⑤: Resetting all the transfer data $\Delta X_{ij}$ in the production plan modification transfer data table 109 to zero.

Step ⑥: Resetting all the required quantity data $Y_{ig}$ in required quantity data table 110 (made zero) to complete the initial setting.

Thus, the actual current inventory may not necessarily be in agreement with the difference found by subtracting the used quantity from the initial inventory data but some error due to breakage or the like is more or less inevitable. Therefore, it is necessary to first correct all the inventory data at the beginning processing. For the production plan data, production plan modification transfer data and required quantity data, too, all the initial values are reset for starting from zero.

After such initial setting, production plan setting is carried out in the production plan setting routine 102. This production plan setting routine 102 is connected to said production plan data table 108 so that production plan setting can be made in accordance with the flow chart of FIG. 21. Thus, Step ①: Receiving a production plan input X for day d for product Pi Step ②: Substituting X for the production plan data which has been initialized to zero by said initial setting to provide a new $X_{id}$ value Step ③: Confirming that production plan setting has been completed for all products to complete the processing.

Then, the required quantities of respective raw materials in an initial stage are calculated in a required quantity setting routine 103. Connected to this required quantity setting routine 103 are said production plan data table 108, required quantity data table 110 and product constitution data table 111 and the initial required quantities are calculated in the steps shown in the flow chart of FIG. 22. Stored in said product constitution data table 111 are the quantities of respective raw materials necessary for the production of one unit of each product.

Step ①: Retrieving the production plan size $X_{id}$ for day d for product Pi from the production plan data table 108

Step ②: Retrieving the required quantities $C_{i1}$, $C_{i2}$ ... and $C_{in}$ of raw materials for the production of one unit of product Pi from the product constitution data table 111

Step ③: Multiplying $C_{ij}$ (j=1, 2 ..., n) by said $X_{id}$ to prepare $Y_{id}$ (j=1, 2 ..., n) in the required quantity data table 110

Step ④: Confirming that the above procedure has been completed. The required quantity setting is thus completed.

The flow from initial setting from required quantity setting has been described so far. Now, the flow for modifying the required quantity data in response to modification of production plan data is explained below.

Figure 24:
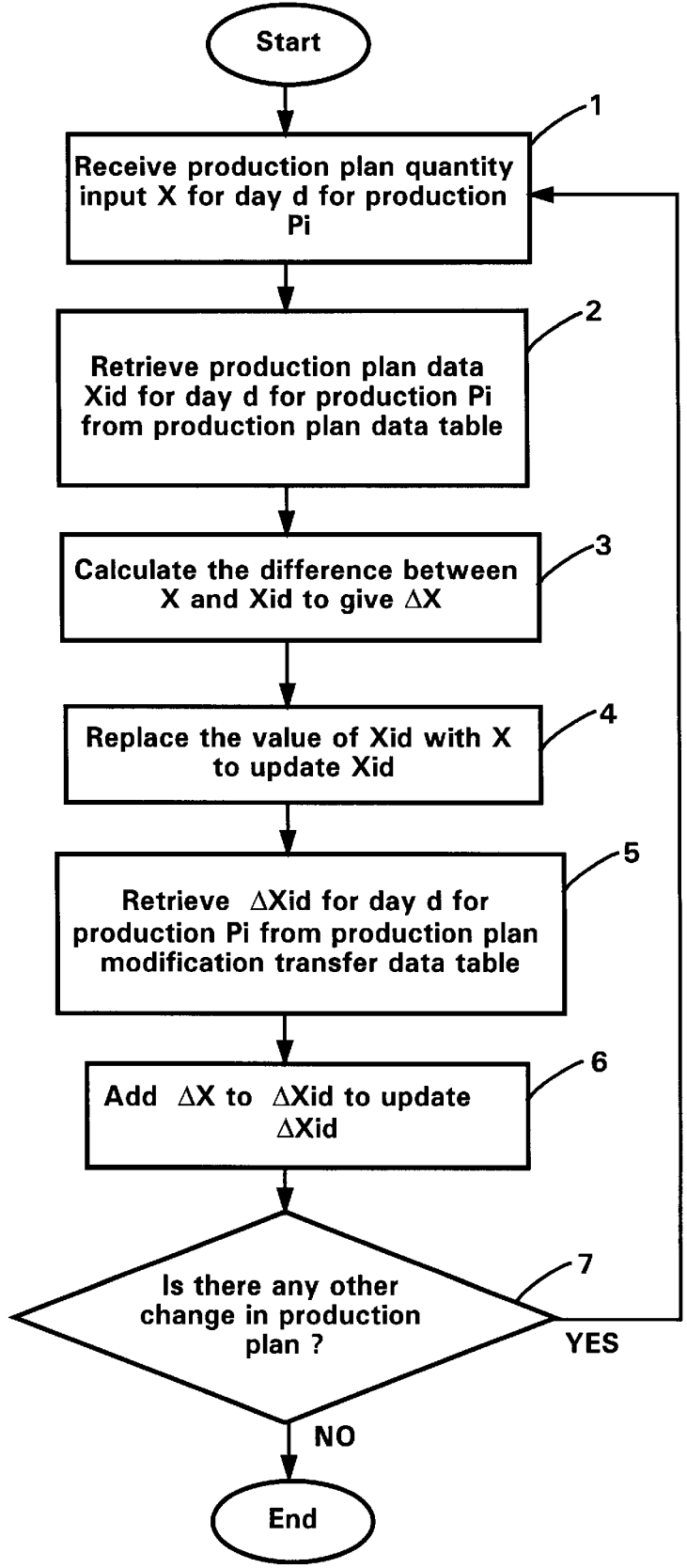
FIG. 24 is a flow chart showing steps in a production plan modifying routine.
Figure 25:
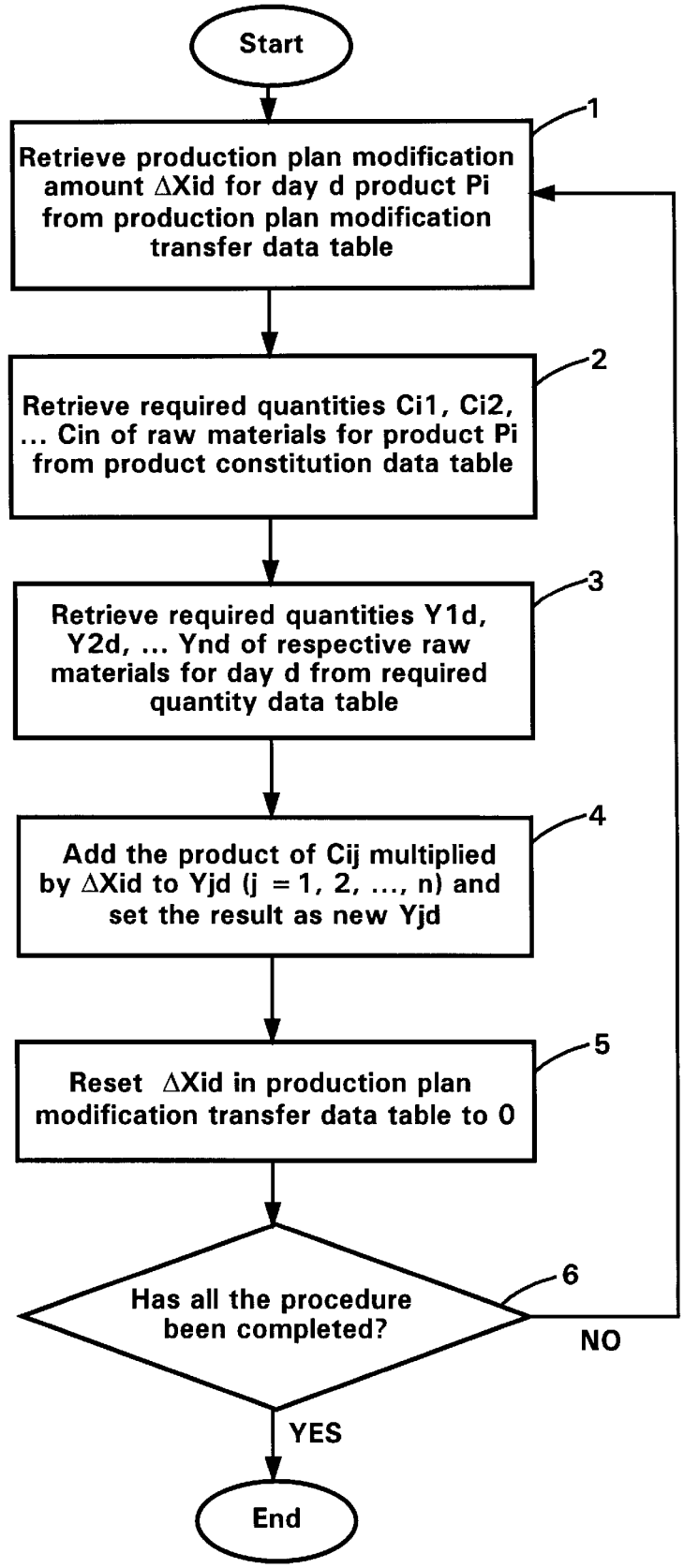
FIG. 25 is a flow chart showing steps in a required quantity modifying routine.

Modification of production plan data is carried out in the production plan modifying routine 104 in the steps shown in the flow chart of FIG. 24. Connected to this production plan modifying routine 104 is not only the production plan data table 108 but also said production plan modification transfer data table 109 shown in FIG. 18. Thus, Step ①: Receiving a production plan input X for day d for product Pi Step ②: Retrieving the production plan data Xid for day d for product Pi from the production plan data table 108

Step ③: Calculating the difference ΔX between X and Xid

Step ④: Replacing the Xid value with X to provide a new Xid value

Step ⑤: Retrieving the production plan modification amount ΔXid for day d for product Pi from the production plan modification transfer data table 109

Step ⑥: Adding said ΔX to this ΔXid to provide a new ΔXid value

Step ⑦: Confirming that there is no change in the other production plan data. The modification of production plan data is thus completed.

As the production plan data are thus modified, modification of required quantity data is automatically carried out in the required quantity modifying routine 105. Connected to this required quantity modifying routine 105 are the production plan modification transfer data table 109, product constitution data table 111 and required quantity data table 110 and the modification of required quantity data is performed in the steps shown in the flow chart of FIG. 25. Thus, Step ①: Retrieving the production plan modification amount ΔXid for day d for product Pi from the production plan modification transfer data table.

Step ②: Retrieving the required quantities $C_{i1}$, $C_{i2}$, ... $C_{in}$ of raw materials for the production of one unit of product Pi from the product constitution data table 111

Step ③: Retrieving the required quantities $Y_1d$, $Y_2d$ ... and $Y_nd$ of respective raw materials for day d from the required quantity data table 110

Step ④: Adding the product of Cij (j=1, 2 ... , n) multiplied by ΔXid to said Yjd (j=1, 2 ... and n) to provide a new Yid value Step ⑤: Resetting ΔXid to zero in the production plan modification transfer data table 109

Step ⑥: Confirming that all the above procedure has been completed. The modification of required quantities is thus completed.

Thus, if a change is made in the production plan, modification of the required quantity data table 110 is made through the production plan modification transfer data table 109 from the production plan data table 108. For this reason, even if changes in the production plan take place in close sequence for one given product, the modification of required quantities can be easily carried out.

After the above setting or modification of required quantities of raw materials for each day, calculation of quantities to be ordered is carried out in the order size determining routine 106.

Figure 26A:
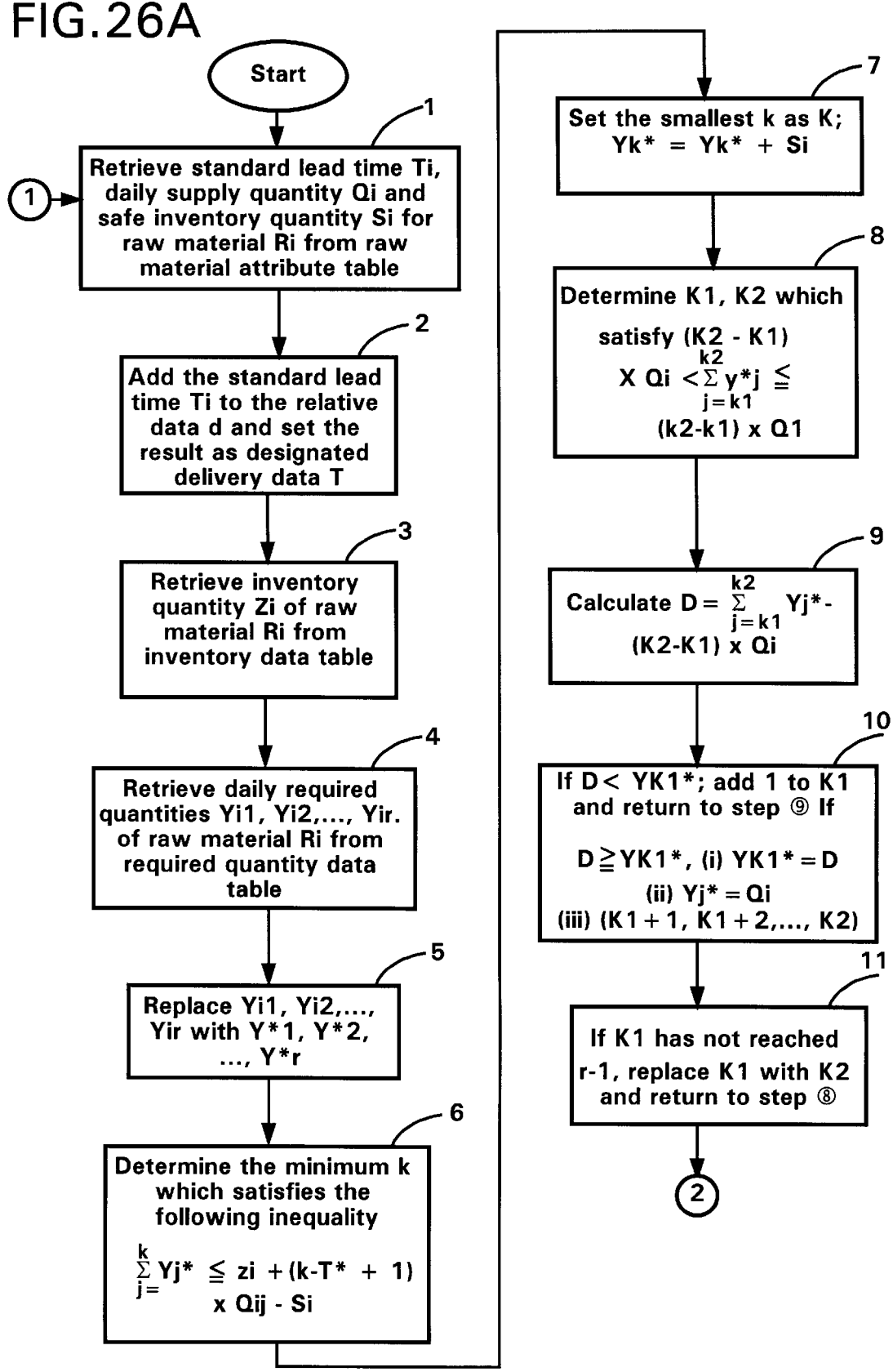
FIGS. 26A and 26B are flow charts showing steps in an order quantity determining routine.
Figure 26B:
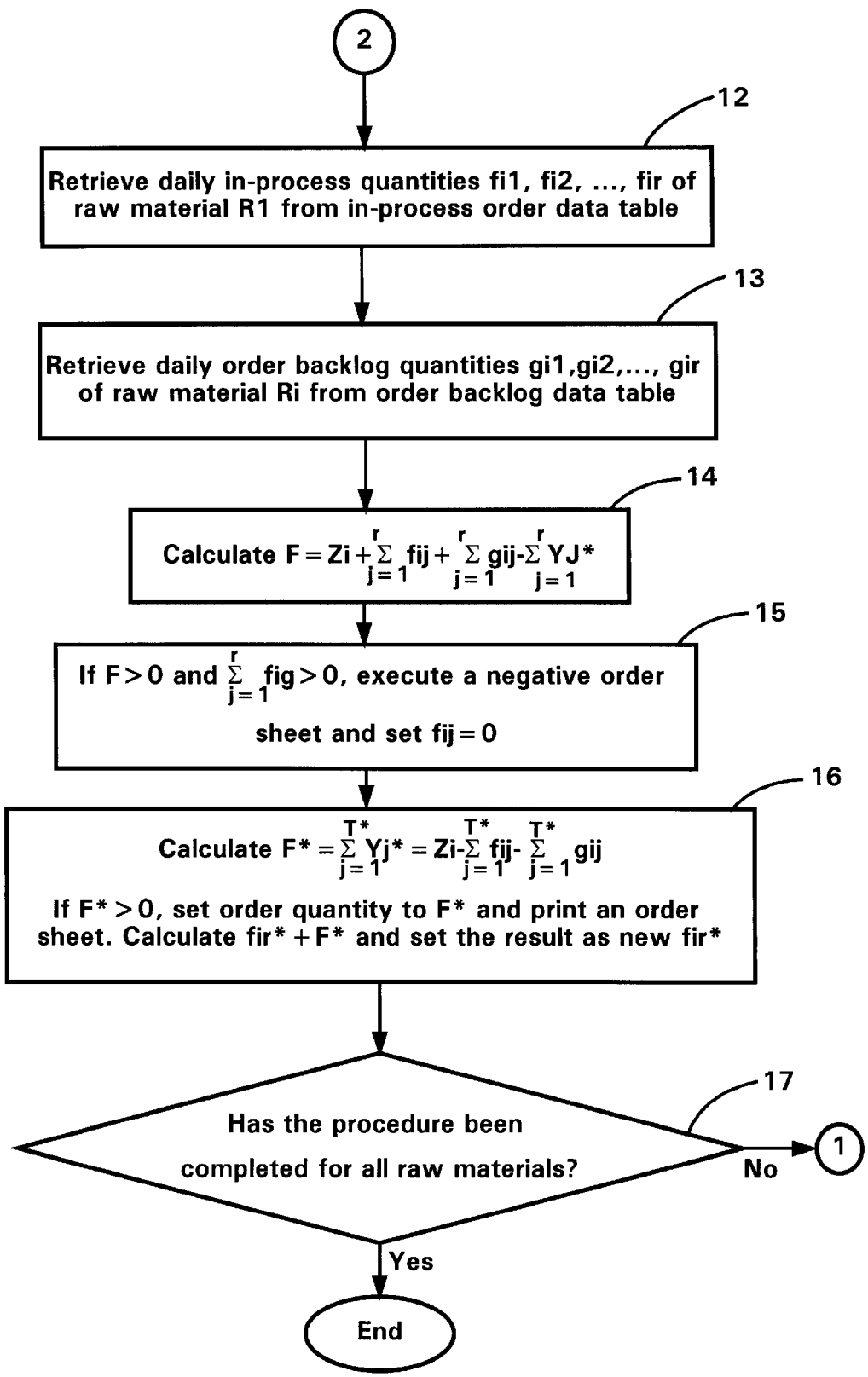

Connected to this order size determining routine 106 are not only the inventory data table 107 and required quantity data table 110 but also the raw material attribute data table 112, the in-process order data table 113 and the order backlog data table 114, and the calculation of the order size is performed in the steps shown in the flow chart of FIG. 26.

Figure 27:
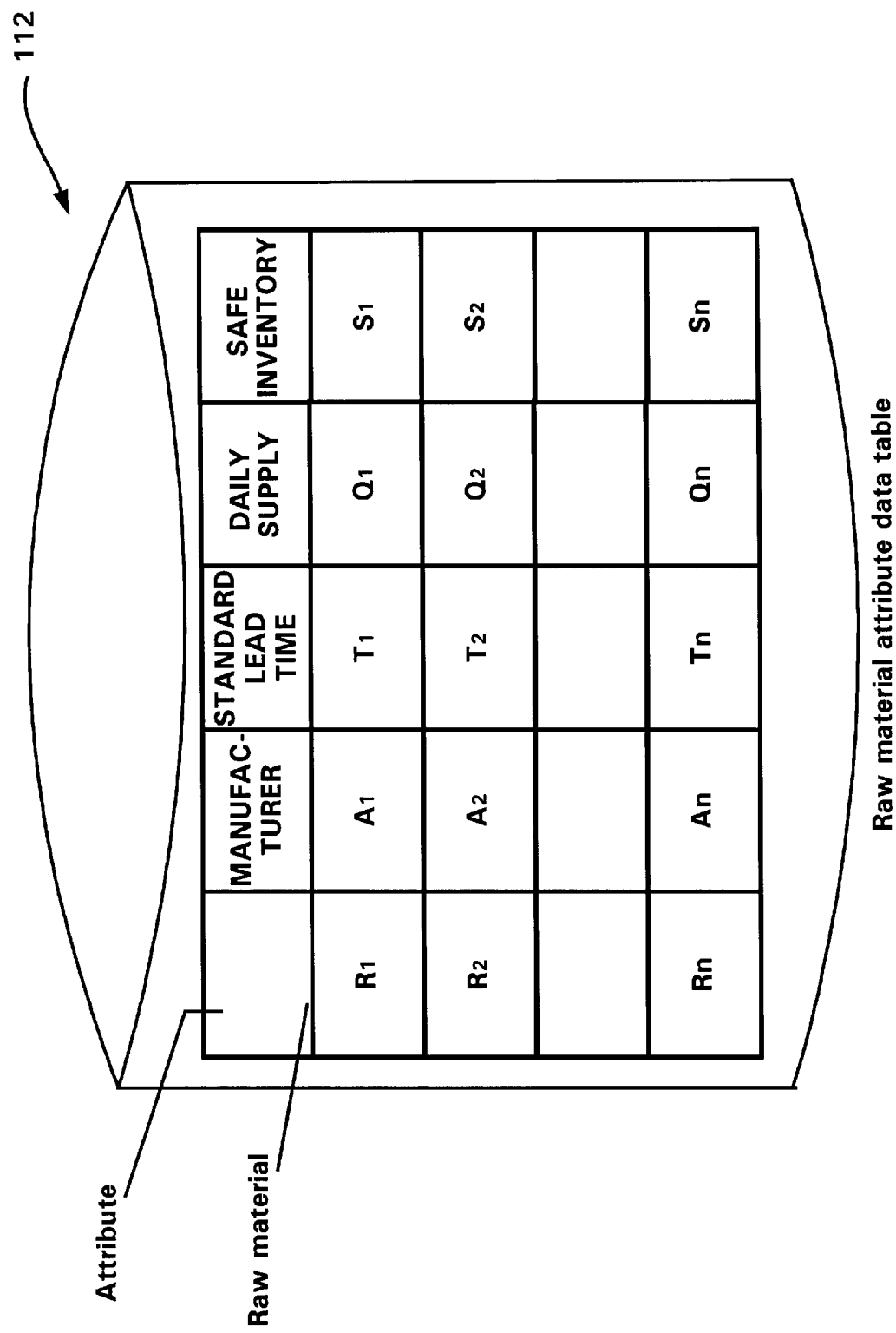
FIGS. 27 through 29 are diagrams showing a raw material attribute data table, an order course data table and an order backlog data table, respectively.
Figure 28:
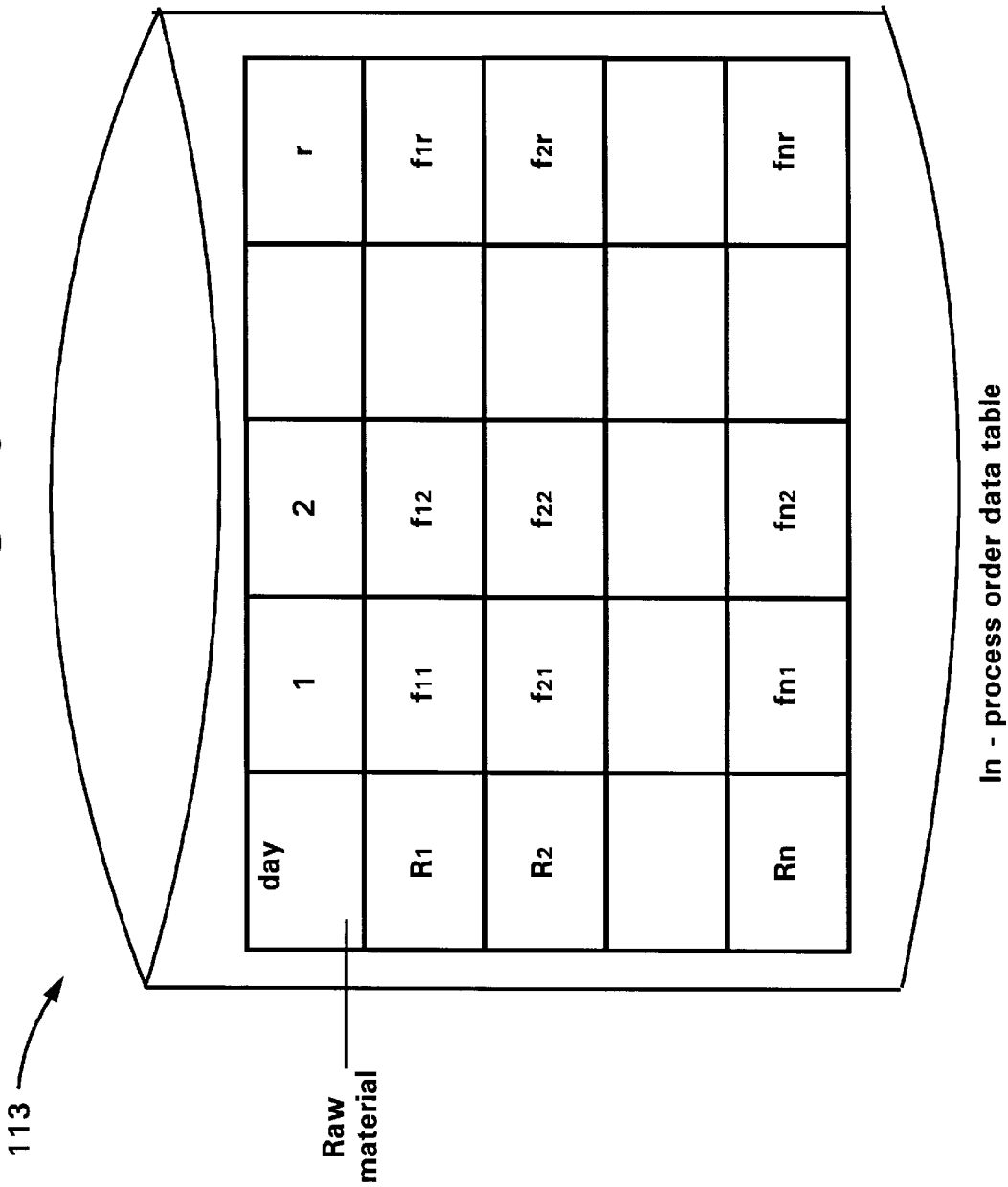
Figure 29:
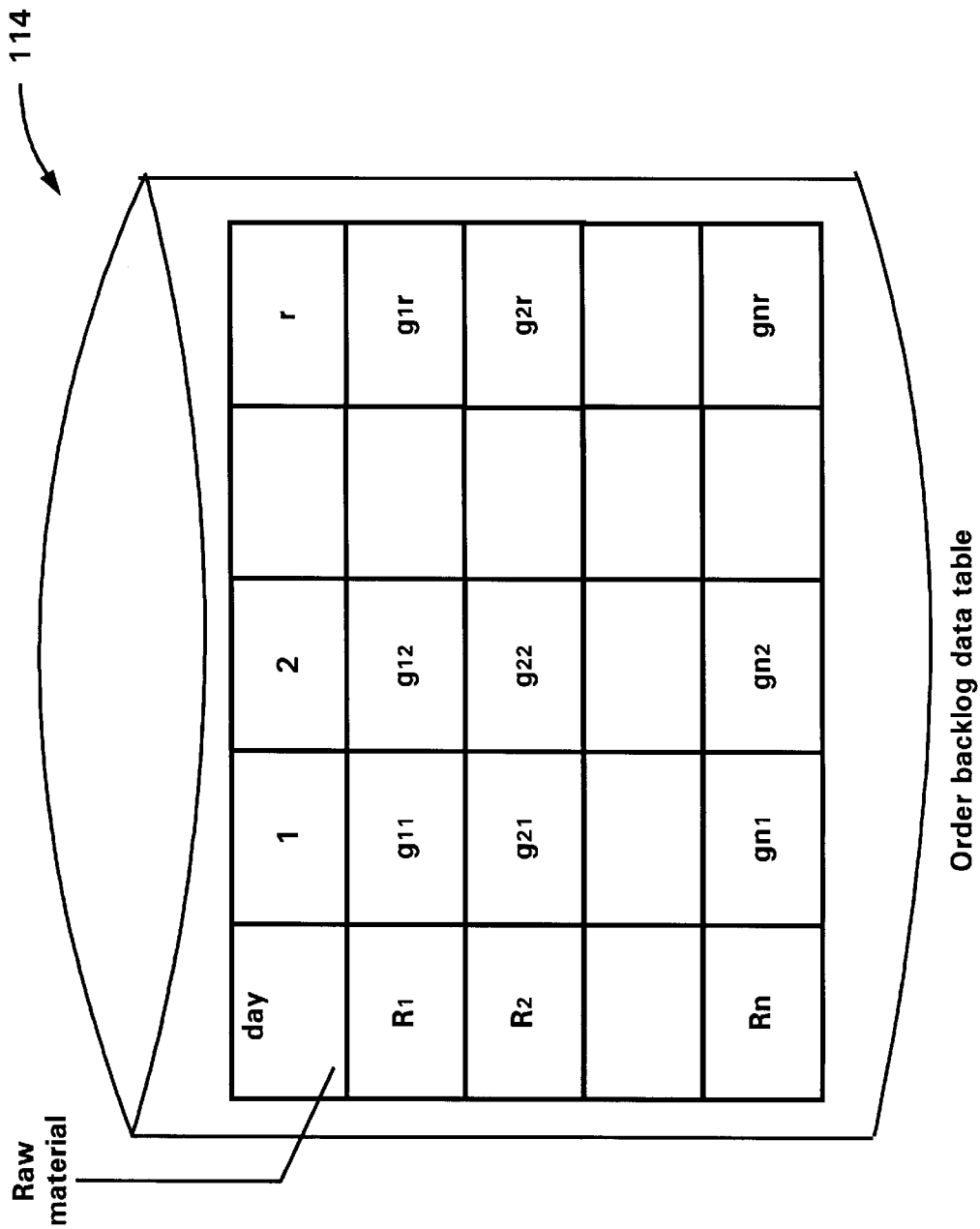

FIG. 27 shows an example of said raw material attribute data table 112. As shown, stored in this raw material attribute data table 112 are the names of suppliers of respective raw materials, standard lead times, daily supply quantities and safe inventory levels as data representing attributes of the respective raw materials. Furthermore, the in-process order data table 113 shown in FIG. 28 and the order backlog data table 114 shown in FIG. 29 contains daily in-process order data and order backlog data, respectively, for respective raw materials.

Step ①: Retrieving the standard lead time Ti, daily supply quantity Qi and safe inventory level Si for raw material Ri from the raw material attribute data table 112

Step ②: Adding said standard lead time Ti to the current relative date d and setting the result as the designated delivery date T*. Thus, in initial setting, the standard lead time as such becomes the designated delivery date.

Step ③: Retrieving the inventory data Zi of raw material Ri from the inventory data table 107

Step ④: Retrieving the daily required quantities $Y_{i1}$, $Y_{i2}$, ... and $Y_{ir}$ of raw material Ri from the required quantity data table 110

Step ⑤: Copying said $Y_{i1}$, $Y_{i2}$ ... and $Y_{ir}$ to provide $Y_1^*$, $Y_2^*$, ... and $Y_r^*$ Step ⑥: calculating the minimum k (k=T*, T*+1, ..., r) that satisfies the following inequality (1) ... using the above values $$\sum_{j=1}^{k} Yj^* \leq Zi + (k - T^* + 1) \times Qij - Si \tag{1}$$

Step ⑦: Designating the smallest of the calculated k values as K and altering the Yk* value using the following equation (3)

$$Yk^* = Yk^* + Si \tag{3}$$

Step ⑧: Determining $k_1$ and $k_2$ ($k_1$=1, 2 ... and r−1; $k_2$=r, ..., $k_1$+2, $k_1$+1) which satisfy the following inequality (4)

$$(k_2 - k_1) \times Qi < \sum_{j=k_1}^{k_2} Yi^* \leq (k_2 - k_1 + 1) \times Qi \tag{4}$$

Step ⑨: Calculating D by the following equation (5) using the $k_1$ and $k_2$ values determined as above $$D = \sum_{j=k_1}^{k_2} Yi^* - (k_2 - k_1) \times Qi \tag{5}$$

Step ⑩: Provided that D<$Yk_1^*$, adding 1 to $k_1$. The sequence then returns to step ⑨. Provided that D≥$Yk_1^*$, effecting the following changes (i) $Yk_1^*$=D (ii) $Yj^*$=Qi (j=$k_1$+1, $k_2$+2, ... , $k_2$)

Step ⑪: Checking to see whether the $k_1$ has reached r. If not, substituting $k_2$ for $k_1$ and repeating the sequence from step ⑧.

The modification of required quantity data is complete when $k_1$ has reached r and this means a completion of the required quantity data table 110.

Prior to proceeding to the next step, the above flow is explained using specific values for ease of understanding.

Step ①: Let it be assumed that the data on raw material $R_1$ in the raw material attribute data table 112 are as follows.

Standard lead time $T_1$=4 days

Daily supply quantity $Q_1$=8 units

Safe inventory level $S_1$=2 units

Step ②: Designated delivery day $T^*=T_1=4$

Step ③: In the inventory data table 107, the inventory quantity $Z_1$ of raw material $R_1=23$ units.

Step ④: From the required quantity data table 110, the current daily requirements of raw material $R_1$ are retrieved as shown in the following table.

| Raw material | Day | | | | | | | | | |
|---|---|---|---|---|---|---|---|---|---|---|
| | 1 | 2 | 3 | 4 | 5 | 6 | 7 | 8 | 9 | 10 |
| R1 | 5 | 8 | 6 | 10 | 4 | 7 | 9 | 4 | 2 | 6 |

Step ⑤: $Y_1^*=5, Y_2^*=8, Y_3^*=6, \ldots, Y_{10}^*=6$.

Step ⑥: Among $k=T^*, T^*+1, \ldots, 10$, i.e. $k=4, 5, \ldots, 10$, $k=4$ does not satisfy the inequalities because $$\sum_{j=1}^{4} Yj^* = 29$$

$$Z_1 + (k - T^* + 1) \times Q - S_1 = 25$$

However, $k=5$ satisfies the inequalities, thus $$\sum_{j=1}^{5} Yj^* = 33$$

$$Z_1 + (k - T^* + 1) \times Q - Si = 33$$

Step ⑦: $k=5$, and $Y_5^*=Y_5^*+S_1=4+2=6$. Therefore, the current setting $Y_5^*=4$ is altered to $Y_5^*=6$.

Step ⑧: Search to find that $k_1$ and $k_2$ which satisfy the following equality $$(k_2 - k_1) \times Qi < \sum_{j=k_1}^{k_2} Yj^* \leq (k_2 - k_1 + 1) \times Qi \text{ are } k_1 = 3 \text{ and } k_2 = 4.$$

$$(4-3) \times 8 = 8 < \sum_{j=3}^{4} Yj^* = 16 \leq (4-3+1) \times 8 = 16$$

Step ⑨:

$$D = \sum_{j=3}^{4} Yj^* - (4-3) \times 8 = 8$$

Step ⑩: Since $D=8 \geq Yk_1^*=6$, set
 (i) $Y_3^*=8$
 (ii) $Y_4^*=8$
Thus, the settings $Y_3^*=6$ and $Y_4^*=10$ are respectively changed to 8.

Step ⑪: Since $k_1=3$ and has not reached $r=10$, select $k_1=4$ and repeat the sequence from step ⑧.

Then, $k_1=6$ and $k_2=7$ are found and, as a result, the following changes are made in step ⑩.
 (i) $Y_6^*=8$
 (ii) $Y_7^*=8$.

After the above modification, the required quantity data table 110 is as follows.

| Raw material | Day | | | | | | | | | |
|---|---|---|---|---|---|---|---|---|---|---|
| | 1 | 2 | 3 | 4 | 5 | 6 | 7 | 8 | 9 | 10 |
| $R_1$ | 5 | 8 | 8 | 8 | 6 | 8 | 8 | 4 | 2 | 6 |

Comparison of the above table with the pre-modification table shows that the quantity of 4 units on day 5 has been changed to the quantity of 6 units, and the required quantity of 10 units on day 4 and that of 9 units on day 7 have been advanced to day 3 and day 6, respectively, indicating that the data have been made compatible with the daily supply quantity of raw material $R_1$, which data supplements the safe inventory level on a suitable timing.

Now, referring back to the flow chart of FIG. 26, the sequence from step ⑫ is explained.

Step ⑫: From the in-process order data table 113, the daily in-process quantities $fi_1, fi_2, \ldots$ and fir of raw material $R_1$ are retrieved.

Stored in this in-process order data table 113 are the quantities of raw materials for which orders have already been placed but are yet to be included in the inventory quantities Zi.

Step ⑬: From the order backlog data table 114, the daily order backlog quantities $gi_1, gi_2, \ldots$ and gir of raw material $R_1$ are retrieved.

Step ⑭: The following equation (6) is calculated.

$$F = Zi + \sum_{j=i}^{r} fij + \sum_{j=1}^{r} gij - \sum_{j=1}^{r} Yj^* \tag{6}$$

Step ⑮: Provided that $F>0$ and $$\sum_{j=1}^{r} fij > 0,$$

a negative order sheet is executed for $fij>0$ and the particular fij is reset to 0. Here, the order of fij data to be thus processed begins with the one in which j is closest to r, that is to say the last one.

Step ⑯: The following equation is calculated.

$$F^* = \sum_{j=1}^{T^*} Yj^* - Zi - \sum_{j=1}^{T^*} fij - \sum_{j=1}^{T^*} gij \tag{7}$$

Provided that $F^*>0$, the order size is set to $F^*$ and an order sheet is printed. Then, $fiT^*+F^*$ is calculated to set $fiT^*$.

Step ⑰: Finally, it is confirmed that all the above processing has been completed for all the raw materials.

Now, the sequence beginning with step ⑫ following the aforesaid step ⑪ is described in further detail.

Steps ⑫, ⑬: From the in-process order data table 113 and order backlog data table 114, the daily in-process quantity and daily order backlog quantity data for raw material $R_1$ are retrieved as shown in the following table. It should be noticed that the figures in the top row represent the daily requirements of raw material $R_1$ as determined up to step ⑪.

| Day |
|---|

-continued

|      | 1 | 2 | 3 | 4       | 5       |
|------|---|---|---|---------|---------|
| Yj*  | 5 | 8 | 8 | 8       | 6       |
| f₁j  | 7 | 0 | 3 | Omitted |         |
| g₁i  | 5 | 4 | 0 | Omitted |         |

|      | Day |   |   |   |    |
|------|-----|---|---|---|----|
|      | 6   | 7 | 8 | 9 | 10 |
| Yi*  | 8   | 8 | 4 | 2 | 6  |
| f₁j  | —   | — | — | — | —  |
| f₁j  | —   | — | — | — | —  |

Step ⑭: The following equation is calculated.

$$F = Z_1 + \sum_{j=1}^{10} f_1 i + \sum_{j=1}^{10} g i j - \sum_{j=1}^{10} Y j *$$

Step ⑮: Provided that F>0 and $$\sum_{j=1}^{10} f_1 j > 0,$$

it means that the order size is excessive. Therefore, the $f_1 j$ settings are changed to zero from the back, i.e. starting with day 10.

The result is assumed to be as follows.

|      | Day |   |   |   |   |   |   |   |   |    |
|------|-----|---|---|---|---|---|---|---|---|----|
|      | 1   | 2 | 3 | 4 | 5 | 6 | 7 | 8 | 9 | 10 |
| Yj*  | 5   | 8 | 8 | 8 | 6 | 8 | 8 | 4 | 2 | 6  |
| f₁j  | 0   | 0 | 0 | 0 | 0 | 0 | 0 | 0 | 0 | 0  |
| g₁j  | 5   | 0 | 0 | 0 | 0 | 0 | 0 | 0 | 0 | 0  |

Step 16: Since $$F^* = \sum_{j=1}^{4} Y_1^* - 23 - \sum_{j=1}^{4} f_1 j - \sum_{j=1}^{4} g_1 i = 1$$

and F*>0, the order size is set to 1, an order sheet is printed, and $f_{14}$ is set to 1.

After the order size has thus been determined in the order size determining routine A, the order sheet is issued and the data processing is carried out in the data input processing means B. This data input processing means B comprises an order acceptance data input processing routine 115, a raw material acceptance data input processing routine 116 and a production data input processing routine 117.

Figure 30:
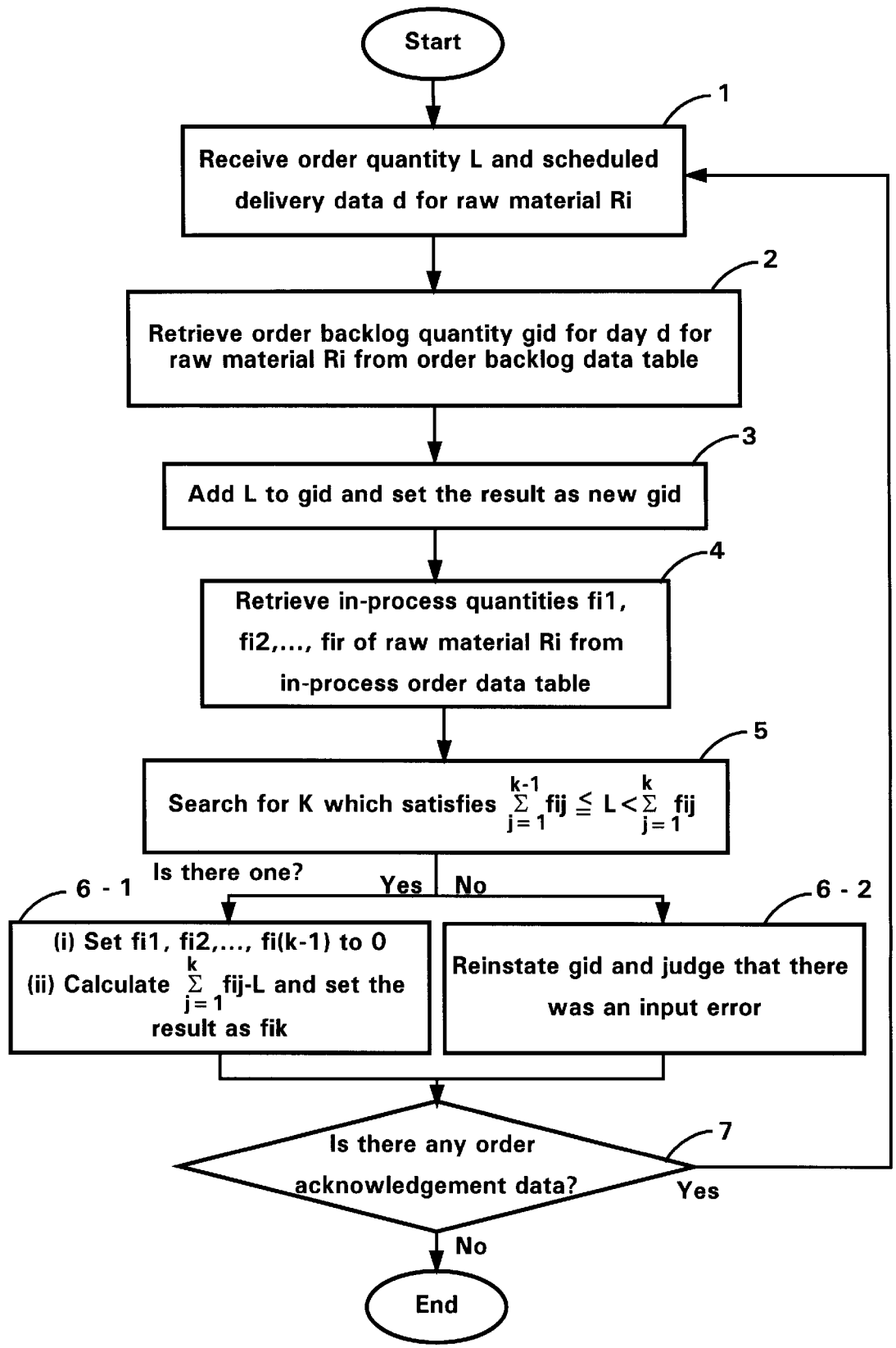
FIG. 30 is a flow chart showing steps in an order acknowledgement data input processing routine.

Connected to the order acceptance data input processing routine 115 are said order backlog data table 114 and in-process order data table 113 and the data processing is performed in the steps shown in the flow chart of FIG. 30. Thus, Step ①: Retrieving the data on the order quantity L and scheduled delivery day d for raw material Ri from the order acknowledgement from the supplier of the raw material Step ②: Retrieving the order backlog quantity gid for day d for raw material Ri from the order backlog data table 114

Step ③: Adding the order quantity L to said order backlog quantity gid to set a new gid value Step ④: Retrieving the in-process order quantities $fi_1$, $fi_2$, ... and fir for raw material Ri from the in-process order data table 113.

Step ⑤: Searching for k which satisfies the following inequality (8) (provided, however, that $fi_0=0$)

$$\sum_{j=1}^{k-1} f i g \leq L < \sum_{j=1}^{k} f i j \tag{8}$$

Step ⑥-1: If there exists one,
(i) The $fi_1$, $fi_2$, ... and fir values retrieved in step ④ are made 0, and
(ii)

$$\sum_{j=1}^{k} f i j - L$$

is calculated and the result is set as a new fik value.

Step ⑥: If there is none, the initial order backlog quantity gid is reinstated and it is judged that there was an error in the input data.

Step ⑦: Confirming that there is no other order acknowledgement data. The input processing of order acknowledgement data is now complete.

Figure 31:
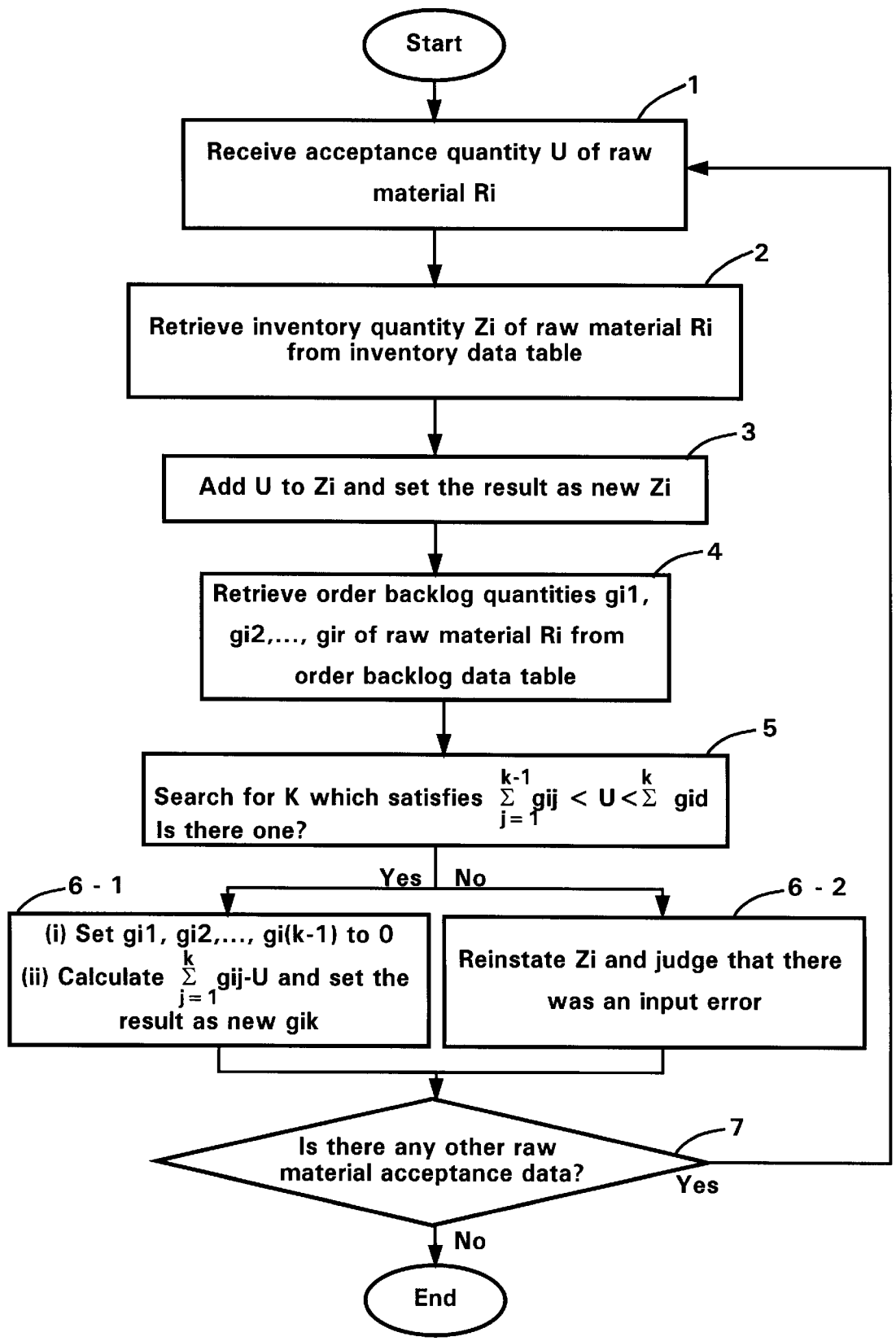
FIG. 31 is a flow chart showing steps in a raw material acceptable data input processing routine.

Connected to the raw material acceptance data input processing routine 116 are said inventory data table 107 and order backlog data table 114 and the data processing is performed in the steps shown in the flow chart of FIG. 31. Thus, Step ①: Receiving an acceptance quantity input U for raw material Ri Step ②: Retrieving the inventory quantity Zi for raw material Ri from the inventory data table 107

Step ③: Adding the acceptance quantity U to said inventory quantity Zi to provide a new Zi value Step ④: Retrieving the order backlog quantities $gi_1$, $gi_2$, ... and gir of raw material Ri from the order backlog data table 114.

Step ⑤: Searching for k which satisfies the following inequality (9) (provided, however, that $gi_0 = 0$)

$$\sum_{j=1}^{k-1} g i j \leq U < \sum_{j=1}^{K} g i j \tag{9}$$

Step ⑥-1: If there exists one,
(i) $gi_1$, $gi_2$, ... and gi (k−1) are set to 0, and
(ii)

$$\sum_{j=1}^{k} g i j - U$$

is calculated and the result is set as a gik value.

Step ⑥-2: If there is one,
the initial inventory quantity value Zi is reinstated and it is judged that an error occurred in input data.

Step ⑦: Confirming that there are no other raw material acceptance data. The input processing of raw material acceptance data is now complete.

Figure 32:
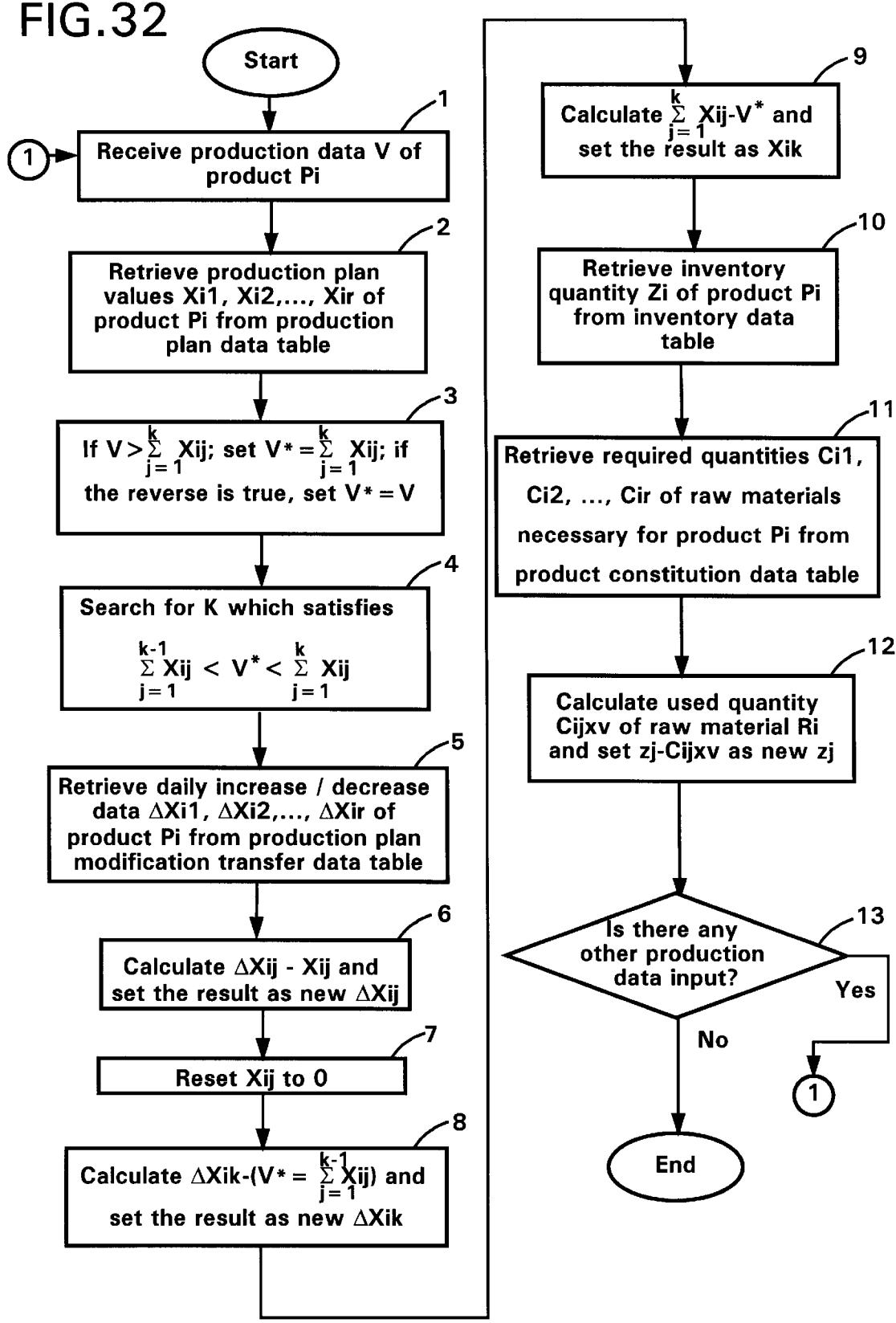
FIG. 32 is a flow chart showing steps in a production data input processing routine.

And in the production data input processing routine 117, using the data stored in the production plan data table 108, production data modification transfer data table 109, inventory data table 107 and product constitution data table 111, which are connected thereto, the input processing of production data is carried out in the steps shown in the flow chart of FIG. 32.

Thus,

Step ①: Receiving a production data input V for product Pi

Step ②: Retrieving the production plan data $Xi_1, Xi_2, \ldots$ and Xir for product Pi from the production plan data table 108

Step ③: Comparing said production data V with $$\sum_{j=1}^{r} Xij$$

If V is larger, V* is set to $$\sum_{j=1}^{r} Xij.$$

If V is smaller, V* is set to V.

Step ④: Searching for K which satisfies the following inequality (10) (provided, however, that $Xi_0=0$)

$$\sum_{j=1}^{k-1} Xij \le V^* \le \sum_{j=1}^{k} Xij \quad (10)$$

Step ⑤: Retrieving the daily increase/decrease value $\Delta Xi_1, \Delta Xi_2, \ldots$ and $\Delta Xir$ for product Pi from the production plan modification transfer data table (9)

Step ⑥: Calculating $\Delta Xij-Xij$ to provide a new $\Delta Xij$ value (j=1, 2, ..., k-1)

Step ⑦: Set Xij to 0

Step ⑧: Calculating $$\Delta Xik - \left[ V^* - \sum_{j=1}^{k-1} Xij \right]$$

to provide $\Delta Xik$

Step ⑨: Calculating $$\sum_{j=1}^{k} Xij - V^*$$

to provide a new Xik value.

Step ⑩: Retrieving the inventory quantity Zi of product Pi from the inventory data table 107

Step ⑪: Retrieving the required quantities $Ci_1, Ci_2, \ldots$ and Cin of raw material Ri for the production of one unit of product Pi from the product constitution data table 111

Step ⑫: Calculating the used quantity CijxV of raw material Ri (j=1, 2, ... and n) and subtract the result to provide a new Zj value.

Step ⑬: Confirming that there is no other production data to be inputted. The input processing of production data is now complete.

Thus, in the data input processing means B, updating of data is automatically carried out according to the order acknowledgement data, raw material acceptance data and production data incomming in sequence. Therefore, the data in the tables such as the inventory data table 107, production plan data table 108 and required quantity data table 110 are always reflecting flexibly the changes in the flow of raw materials and so on, thus eliminating the risk of placing orders without true needs.

Furthermore, since the required quantity of each raw material can be ordered with certainty on a day-to-day basis, the risk of delay in production due to delays in receipt of raw materials can also be obviated.

Raw Material Ordering System II

FIGS. 33 through 56 show another embodiment of the raw material ordering system according to the present invention. In this case, a raw material ordering routine II 8' is used.

Figure 33:
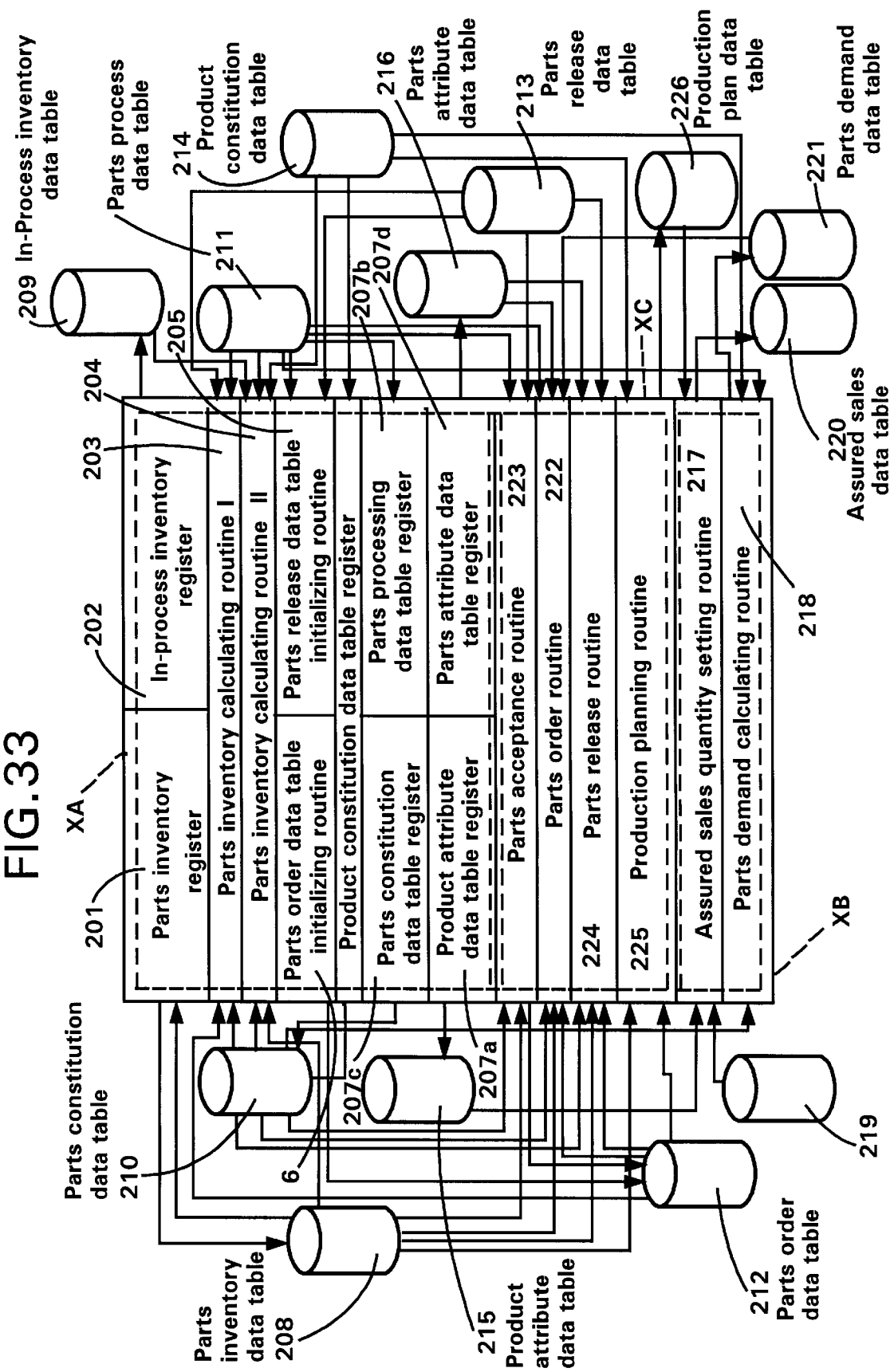
FIG. 33 is a view showing the overall construction of another raw material ordering system embodying the invention.

FIG. 33 shows the overall construction of the raw material ordering system of this embodiment as applied to the ordering for parts.

As shown, this system comprises a data register means XA, a parts demand setting means XB, and a parts control means XC.

The data register means XA comprises a parts inventory register routine 201, an in-process inventory register routine 202, a parts inventory calculating routine I203, a parts inventory calculating routine II 204, a parts release data table initializing routine 205, a parts order data table initializing routine 206 and a data table register routine 207.

Figure 34:
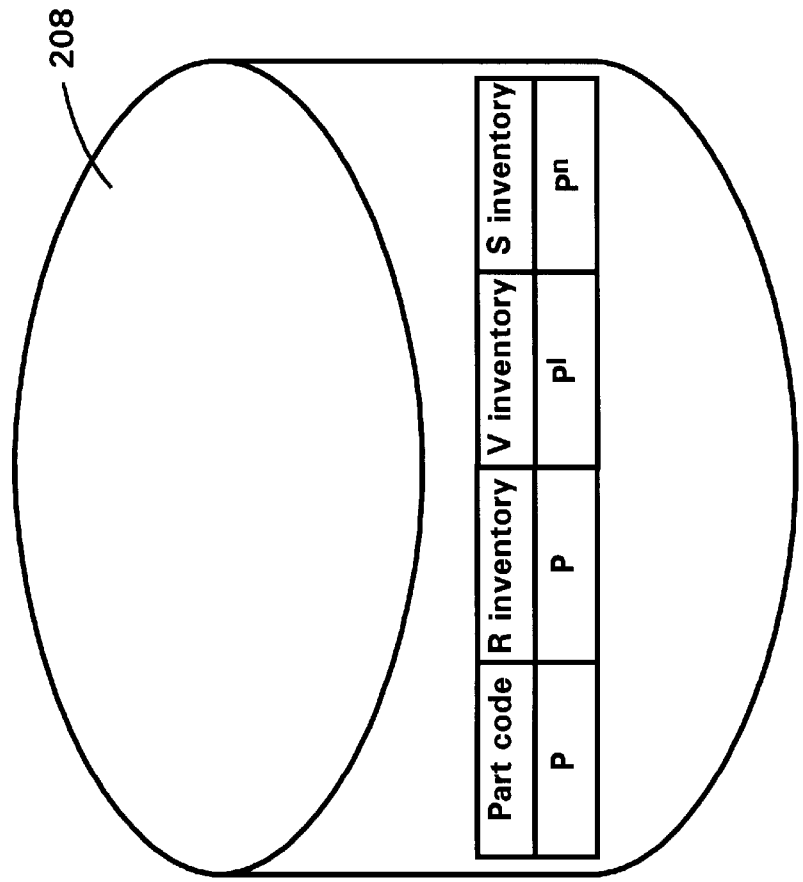

The parts inventory register routine 201 is connected to a parts inventory data table 208 shown in FIG. 34 and the current actual parts inventory quantities are registered in this routine 201. Thus, since the true inventory quantity does not necessarily agree with the difference found by subtracting the used quantity from the initial inventory quantity data but contains some error due to breakage etc., it is necessary to correct for the error, for example at the end of each month. And when the current inventory quantity data of, for example, part code P is P units, this number is registered as R (real) inventory of part code P in the parts inventory data table 208.

Figure 35:
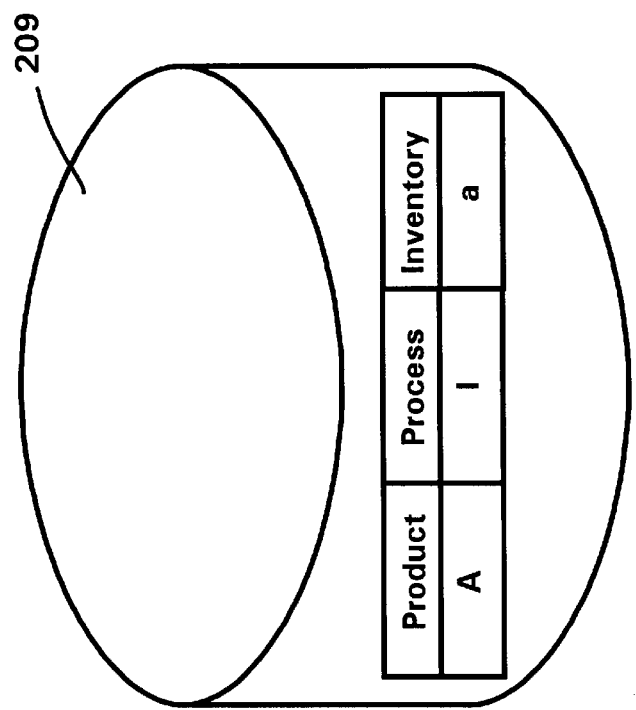
FIGS. 34 through 39 are data tables in the same embodiment.

The in-process inventory register routine 202 is connected to an in-process inventory data table 209 shown in FIG. 35 and the in-process inventory quantity is registered in this routine 202. Thus, when the in-process inventory quantity of product A in process i is a units, the inventory quantity of A in process i in the in-process inventory data table 209 is registered as a units.

After the registration of R inventory (real stock) in the parts inventory data table 208 and the in-process inventory quantity of each product item in each process in the in-process inventory table 209, the V inventory (the stock at a given stage in the manufacturing process, such as surface treatment, assembling, etc.) and S inventory (cumulative stock) quantities are calculated in the parts inventory calculating routine I203 and the parts inventory calculating routine II204, respectively.

Figure 40:
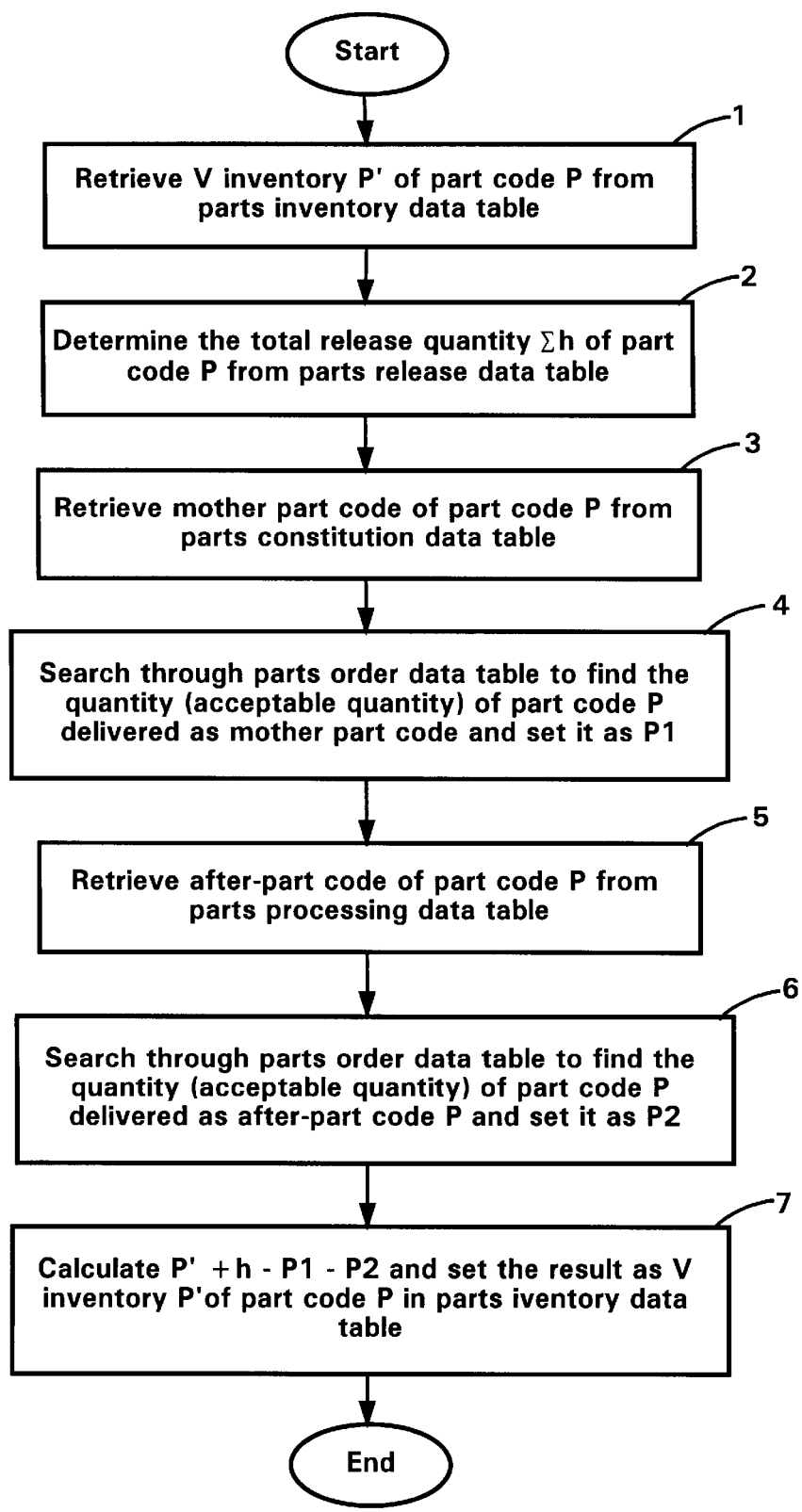
FIG. 40 is a flow chart showing steps in a parts inventory calculating routine I.
Figure 41:
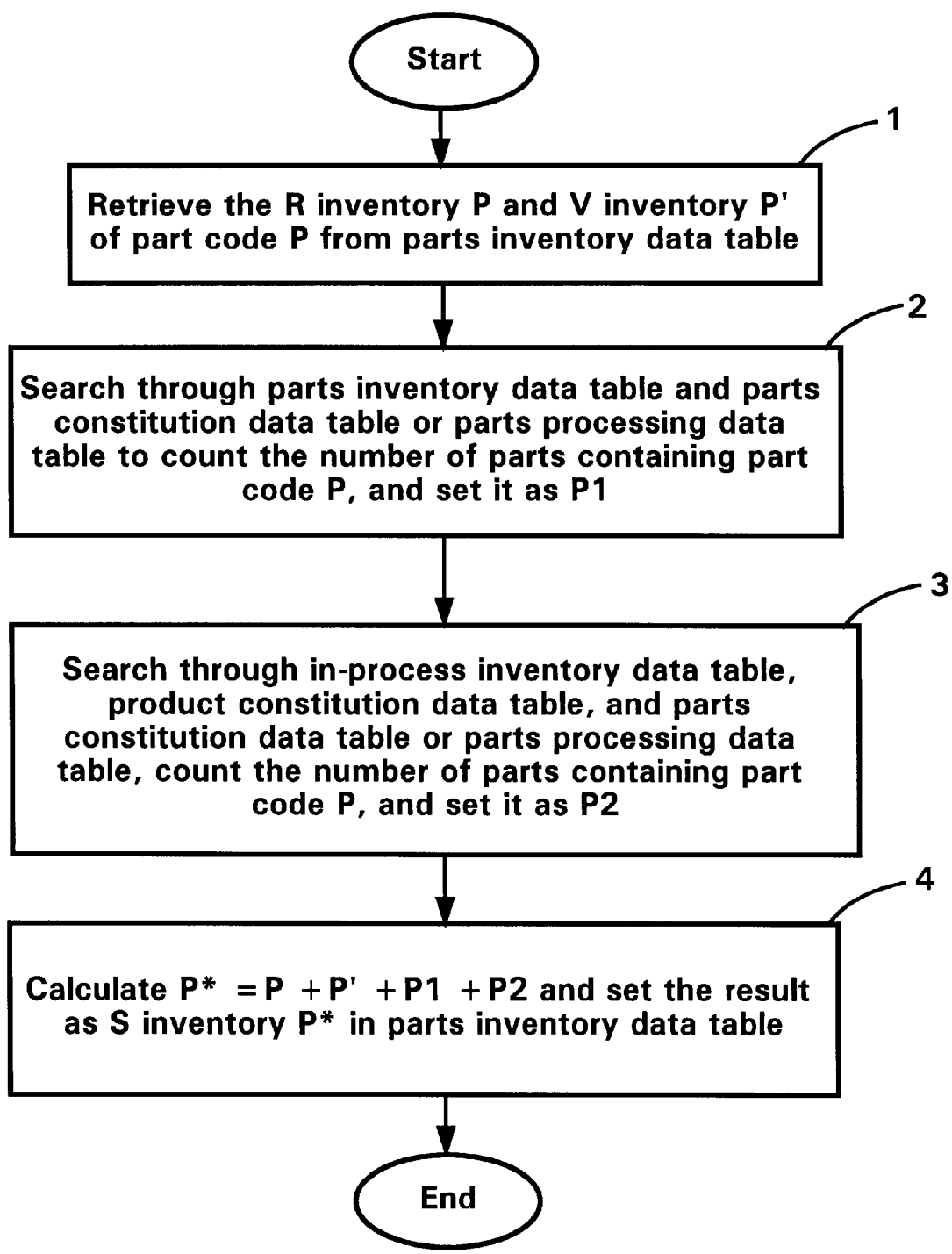
FIG. 41 is a flow chart showing steps in a parts inventory calculating routine II.

The above parts inventory calculating routine I203 is connected to said parts inventory data table 208, a parts constitution data table 210 and a parts processing data table 211, which store parts history information, a parts order data table 212 and a parts release data table 213, and the V inventory of the parts is calculated in the steps shown in FIG. 40.

Figure 37:
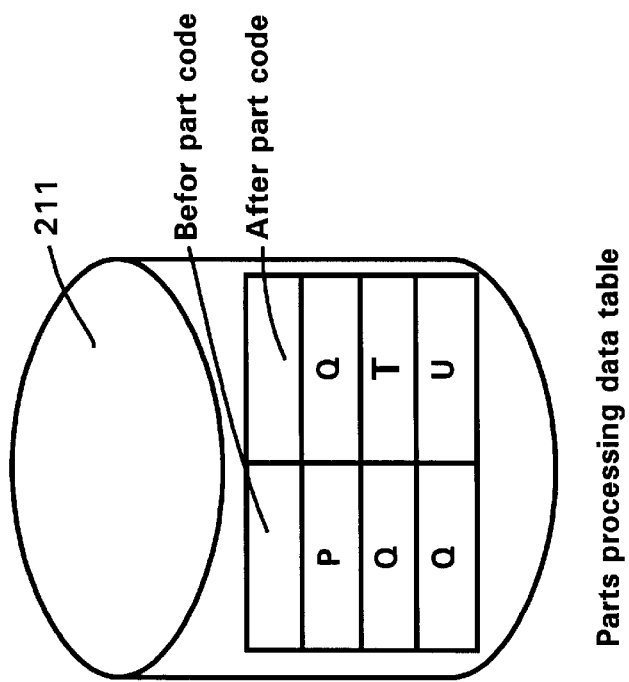
Figure 36:
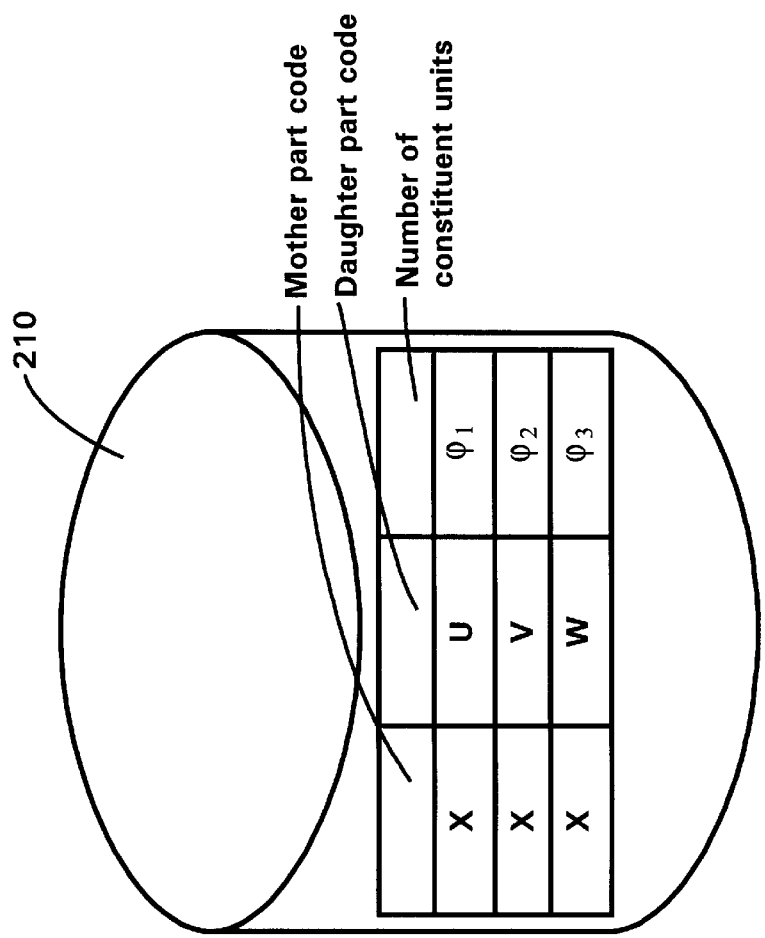

FIG. 36 shows the above parts constitution data table 210. Stored in this table are the constitution data of the parts. The constitution data are the data showing the relationship between the daughter part before assembling and the mother part after assembling as expressed in the number of daughter parts required for the constitution of each mother part after assembling. Thus, referring to FIG. 36, the mother part X consists of $\psi_1$ units of daughter part U, $\psi_2$ units of daughter part V and $\psi_3$ units of daughter part W. Stored in the parts processing data table 211 are the processing data of respective parts as shown in FIG. 37. The processing data mentioned above represent the relationship between the before-part prior to processing and the after-part after processing such as a surface treatment. Thus, FIG. 37 indicates that the processing of before-part P gives after-part Q and that the processing of this part Q as a before-part gives after-part T or U.

Figure 39:
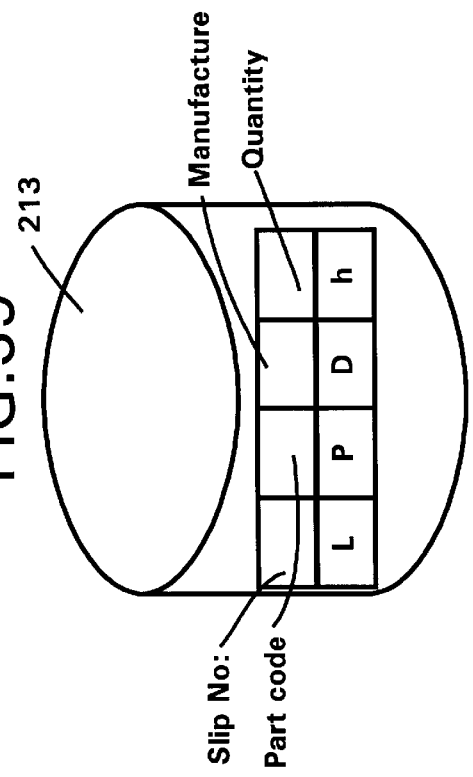
Figure 38:
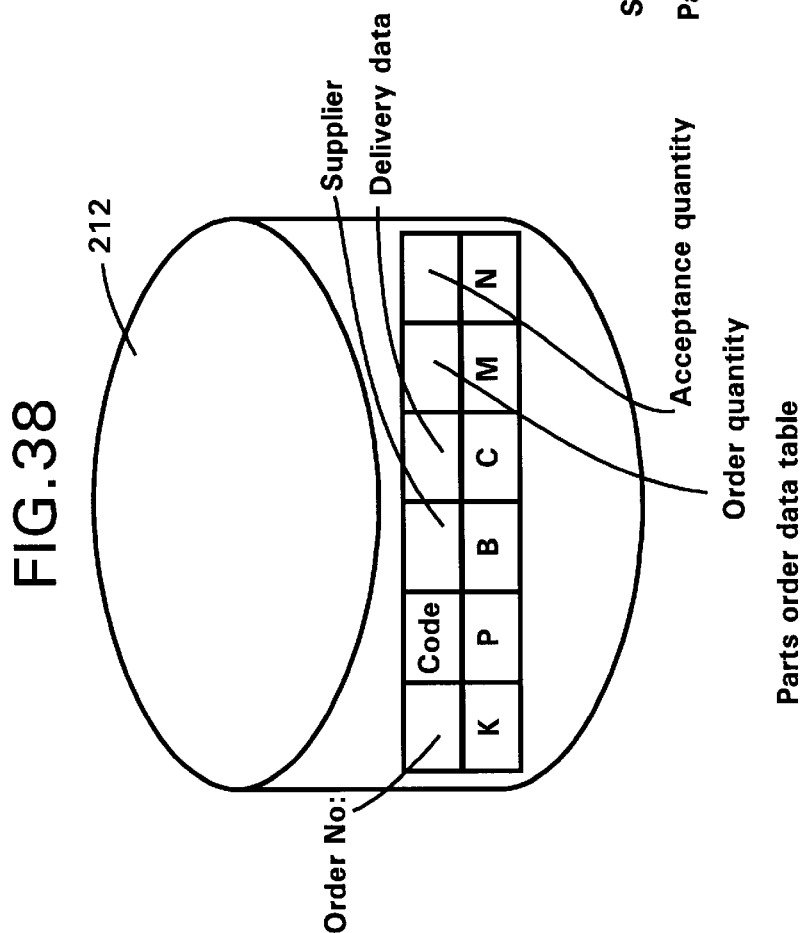

Stored in the parts order data table 212 are the order numbers and suppliers, delivery terms, order quantities and acceptance quantities of parts as shown in FIG. 38, while the parts release slip numbers, relevant manufacturers and release quantities of parts are stored in the parts release data table 213 as shown in FIG. 39.

Thus,

Step ①: Retrieving the current V inventory data P' for part code P from the parts inventory data table 208

Step ②: Determining the total release quantity $\Sigma h$ of part code P from the parts release data table 213

Step ③: Retrieving the mother part code of part code P from the parts constitution data table 210

Step ④: Searching through the parts order data table 212 to find the quantity $P_1$ (acceptance quantity) of part code P delivered under the mother part code assigned by conversion of the part code P to the mother part code Step ⑤: Retrieving the after-part code of part code P from the parts processing data table 211

Step ⑥: Searching through the parts order data table 212 to find the quantity $P_2$ (acceptance quantity) of part code P delivered under the after-part code assigned by conversion of the part code P to the after-part code.

Step ⑦: Calculating $P'+\Sigma h-P_1-P_2$ and setting the result as a new V inventory P' of part code P in the parts inventory data table 208

Figure 42:
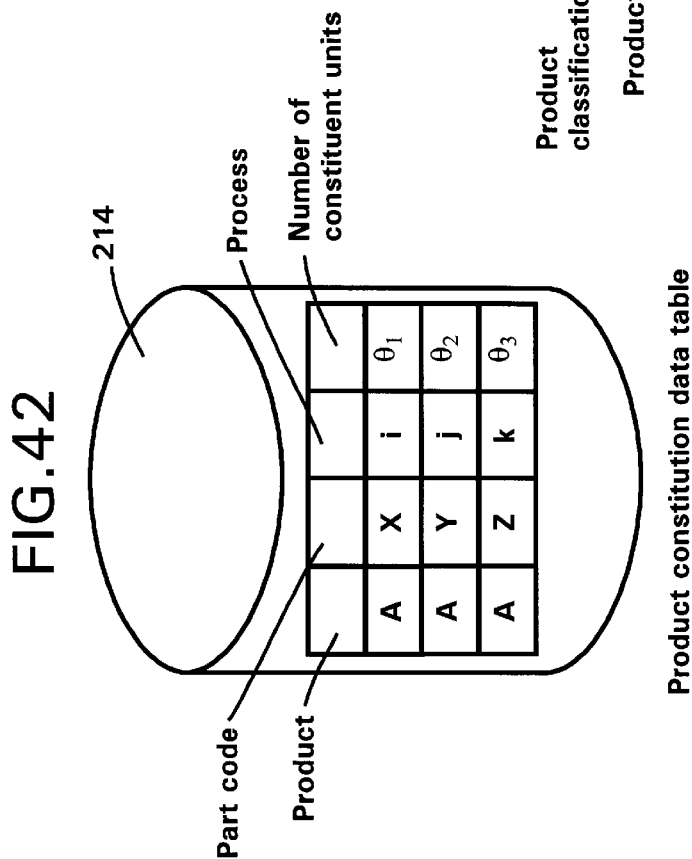

Thus, at the time-point of delivery of parts of part code P as mother parts or after-parts, the corresponding quantity is not treated as the inventory of parts of part code P but dealt with as the inventory of mother parts or after-parts so that only the data of parts which have been released as parts of part code P but not yet to be delivered as mother parts or after-parts is dealt with as the V inventory data of part code P. Thus, assuming that 100 units of part code P have been released for processing and 50 units of after-part code Q of part code P have already been received by an assembly line downstreams of the processing stage, the inventory quantity of part code P in the processing stage is registered as 50 units. In this manner, the quantity of parts currently remaining in the form of part code P as an inventory can be clearly grasped. And as said 100 units of part P released for processing are sequentially subjected to processing and assembling, they change form smoothly in the data along the line of flow, for example 50 units of part P and 50 units of after-part Q at the moment, so that an accurate and constant tab can be maintained on what forms (conditions) of inventory are existing in what quantities in respective stages of production. Connected to the parts inventory calculating routine II204 are said parts inventory data table 208, parts constitution data table 210, parts processing data table 211 and in-process inventory data table 209, as well as a product constitution data table 214, and the S inventory (cumulative inventory) of the parts is calculated in the steps shown in FIG. 41. Stored in said product constitution data table 214 are the part codes, process codes and constituent numbers of parts necessary for respective products as shown in FIG. 42.

Thus,

Step ①: Retrieving the R inventory P and V inventory P' of part code P from the parts inventory data table 208

Step ②: Searching through the parts inventory data table 208 and the parts constitution data table 210 or the parts processing data table 211 to count all the quantities of part code P and setting the total count as $P_1$ Step ③: Searching through the in-process inventory data table 209, the product constitution data table 214 and the parts constitution data table 210 or the parts processing data table 211 to count all the quantities of part code P and setting the total as $P_2$ Step ④: Calculating $P^*=P+P'+P_1+P_2$ and setting the result as the S inventory P* in the parts inventory data table 208.

Thus, the parts bearing the part code P and those bearing various derivative forms of the original part code P are all counted retrogradely to arrive at the cumulative inventory (S inventory) of part code P.

Then, in the parts inventory calculating routine I203, the released quantity registered in the parts release data table 213 is counted as V inventory, and in the parts release data table initializing routine 205, all the data in the parts release data table 213 are erased.

In the parts order data table initializing routine 206, the difference between order quantity and acceptance quantity in the parts order data table 212 is set as the new order quantity, while the acceptance quantity is set as zero. The data registration processing up to the current time is thus complete.

Then, in the data table register routines 207 and 207a through 207e, the registration and modification of the product attribute data table 215, product constitution data table 214, parts constitution data table 210, parts processing data table 211 and parts attribute data table 216 are carried out.

Figure 43:
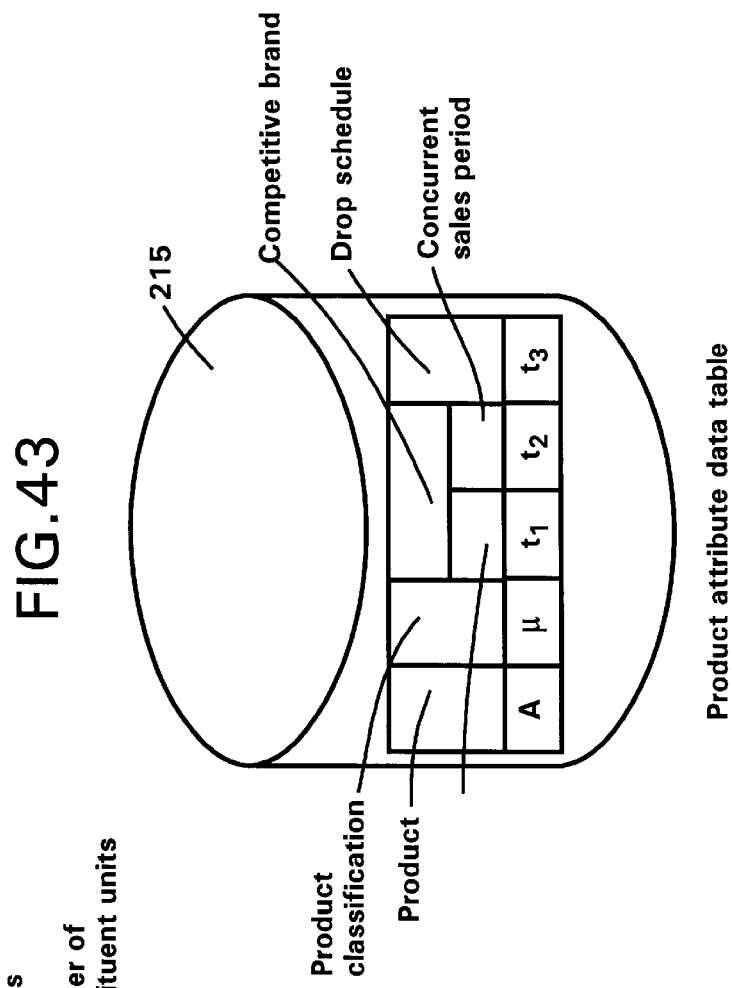
FIGS. 42 through 46 and 48 are views showing data tables in the same embodiment.

Stored in the product attribute data table 215 are the product classification, launching dates of competitive brands, periods of concurrent sale with the competitive brands and the scheduled drop (discontinuation) data of each product as shown in FIG. 43. Thus, the product name A is entered and the aforesaid attribute data are respectively registered or modified. The product classification is the distinction of whether the sales of a product is to continue for more than a predetermined time period after launching.

In the product constitution data table 214 shown in FIG. 42, too, the product name A is entered and the registration or modification of the part codes constituting this product A, relevant process codes and the numbers of constituent parts are effected.

In the product constitution data table 210 and parts processing data table 211 shown in FIGS. 36 and 37, respectively, the mother part code X or before-part code P/Q is entered and the registration or modification of the daughter part code constituting the mother part code X and the number of constituting daughter parts or the after-part code of the before-part code P/Q are carried out.

Figure 44:
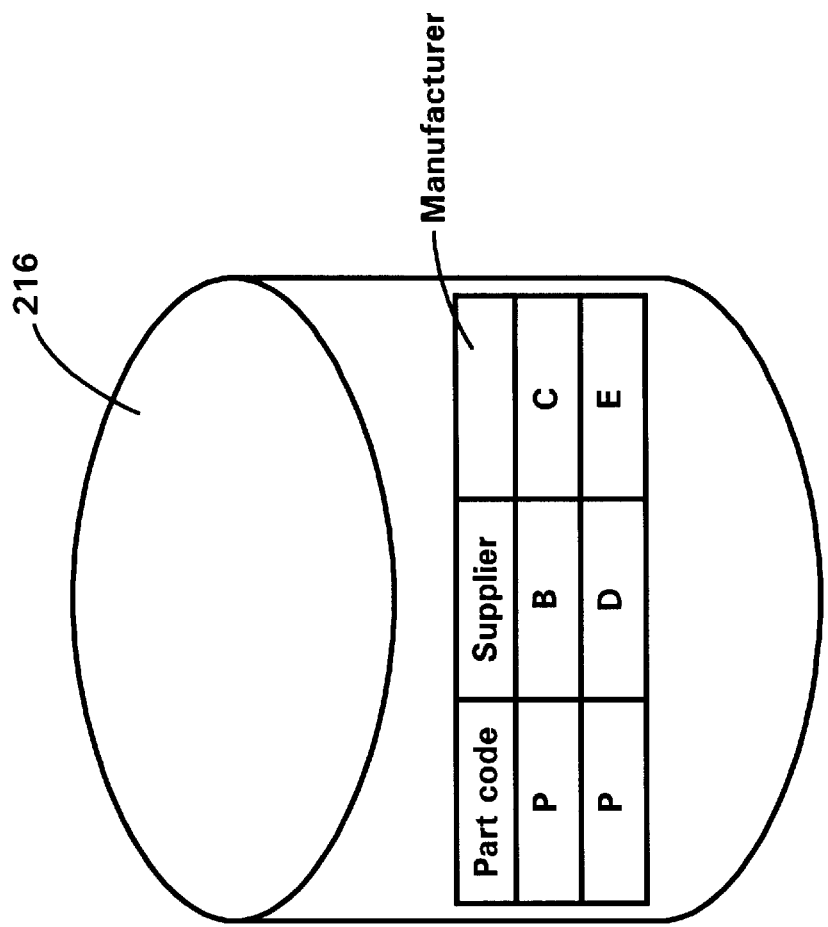

Furthermore, in the parts attribute data table 216 shown in FIG. 44, the part code P is entered and the name of the supplier-manufacturer and the name of the parts manufacturer are registered or altered.

In this manner, the registration processing of all the basic data is completed in the data register means XA. Then, parts demand quantity setting in the parts demand setting means XB is carried out.

This parts demand setting means XB comprises an assured sales quantity setting routine 217 and a parts demand calculating routine 218.

Figure 45:
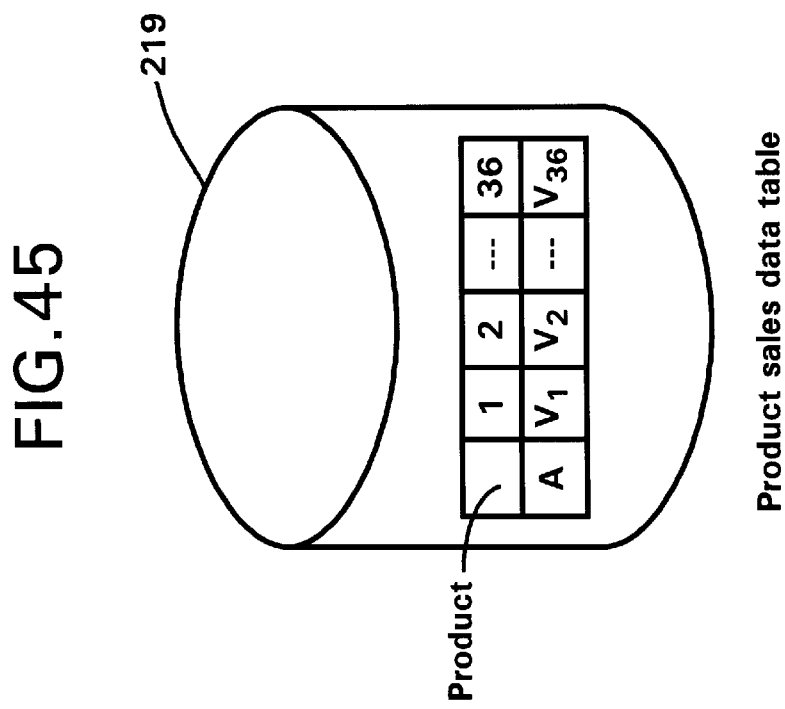
Figure 46:
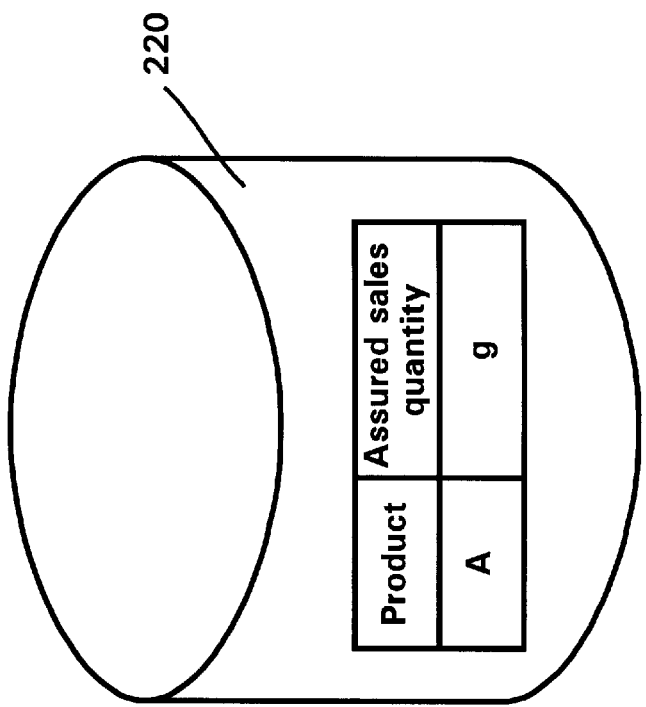

Connected to this assured sales quantity setting routine 217 are a product sales data table 219 shown in FIG. 45, said product attribute data table 215 and an assured sales quantity data table 220 shown in FIG. 46.

Figure 47:
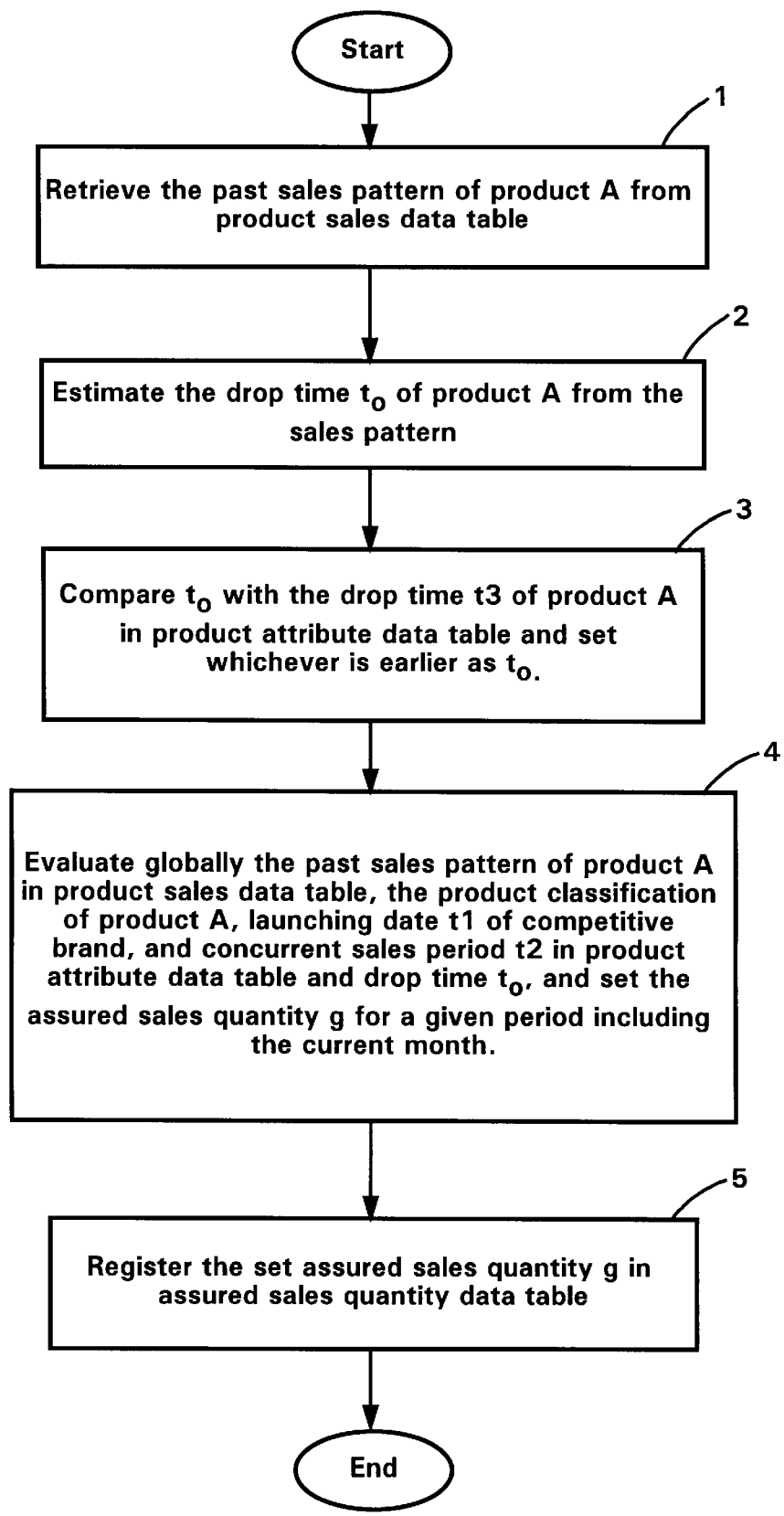

Stored in the product sales data table 219 are the sales data for each month (36 months in FIG. 45) for each product and the assured sales quantity of the particular product is set using the above data in the steps shown in the flow chart of FIG. 47.

Thus,

Step ①: Finding the past course of sales data of product A from the product sales data table 219

Step ②: Estimating the sales drop time $t_o$ of product A from the above course of sales data Step ③: Comparing the time to with the scheduled drop time $t_3$ of product A stored in the product attribute data table 215 to take whichever is earlier as $t_o$.

Step ④: Evaluating globally the past course of sales data of product A in the product sales data table 219 and the product classification u of product A, the launching time $t_1$ of a competitive product, the period of concurrent sale $t_2$ in the product attribute table 215, and said drop time $t_o$ and setting the assured sales quantity, e.g. the number of units g which can certainly be sold, for a predetermined time period including the current month Step ⑤: Registering the assured sales quantity g so set as the assured sales quantity data of product A in the assured sales quantity data table 220.

Thus, from the product attributes and the past sales performance of the product, the minimum assured sales quantity of the product is estimated and set and, then, the parts demand quantity is calculated in a parts demand size calculating routine 218.

Figure 48:
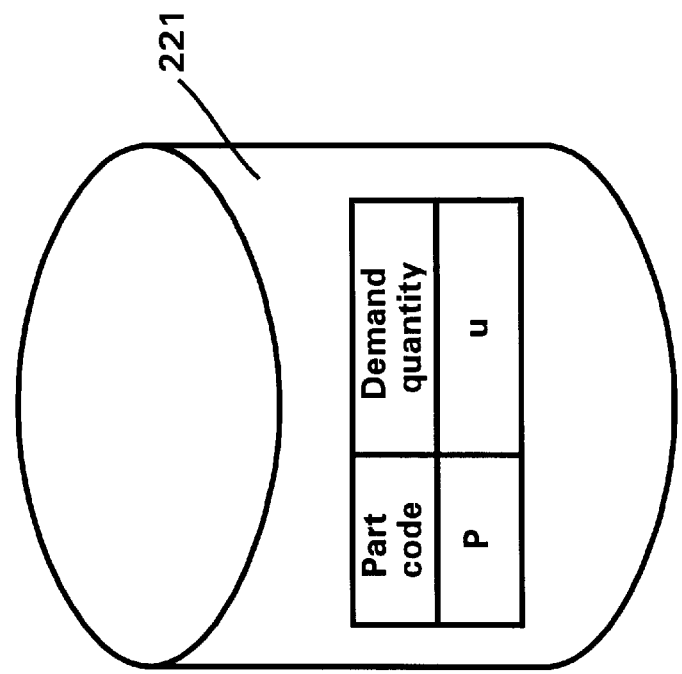

Connected to this parts demand size calculating routine 218 are said assured sales quantity data table 220, product constitution data table 214, parts constitution data table 210, and parts processing data table 211, as well as a parts demand data table 221 shown in FIG. 48. Therefore, the assured sales quantity data table 220 is first searched through to count the total quantities of parts bearing part code P in the assured sales quantities of all products and the above product constitution data table 214, parts constitution data table 210 and parts processing data table 211 are sequentially searched through to obtain the desired parts demand data.

FIG. 49 shows the above data tables substituted by factual values. With reference to the figure, the method of calculating the parts demand quantity is specifically explained below.

Step ①: The assured sales quantity data table 220 shown in FIG. 49(*a*) is searched to find that the assured sales quantity of product A is 10 units.

Step ②: The product constitution data table 214 shown in FIG. 49(*b*) indicates that product A consists of 2 units of part code $q_1$, 3 units of $q_2$ and 1 unit of $q_3$. It is, therefore, calculated that the production of 10 units of product A requires 20, 30 and 10 units of $q_1$, $q_2$ and $q_3$ parts, respectively.

Step ③-1: The parts constitution data table 210 shown in FIG. 49(*c*) indicates that part code $q_1$ consists of 1 unit of daughter part code $q_7$ and one unit of $q_8$ and that part code $q_2$ consists of 2 units of daughter part code $q_8$ and 1 unit of $q_{10}$. It is, therefore, calculated that the production of 20 units of part code $q_1$ requires 20 units of part code $q_7$ and 20 units of $q_8$ and that the production of 30 units of part code $q_2$ requires 60 units of part code $q_8$ and 30 units of $q_{10}$.

Step ③-2: It is also found that part code $q_{10}$ consists of 1 unit of daughter part code $q_{12}$ and 3 units of $q_{13}$. Therefore, it is calculated that the production of 30 units of part code $q_{10}$ requires 30 units of part code $q_{12}$ and 90 units of $q_{13}$.

Step ④-1: The parts processing data table 211 shown in FIG. 49(*d*) indicates that part code $q_7$ is processed from before-part $q_{11}$ and, therefore, that the production of 20 units of part code $q_7$ requires 20 units of part code $q_{11}$.

Step ④-2: It is also seen that part code $q_{12}$ is processed from before-part $q_{11}$ and, therefore, that the production of 30 units of part code $q_{12}$ requires 30 units of part code $q_{11}$.

FIG. 50 shows the results obtained by searching through the assured sales quantity data table 220, product constitution data table 214, parts constitution data table 210 and parts processing data table 211 in the steps ① through ④ in the above manner. The sum of the required numbers of units of each part code necessary for meeting the assured sales quantities of products A, B and C is the demand quantity shown in FIG. 51.

The processing for parts control in the parts control means XC is now described.

The parts control means XC comprises a parts order routine 222, a parts acceptance routine 223, a parts release routine 224 and a product planning routine 225.

Figure 52:
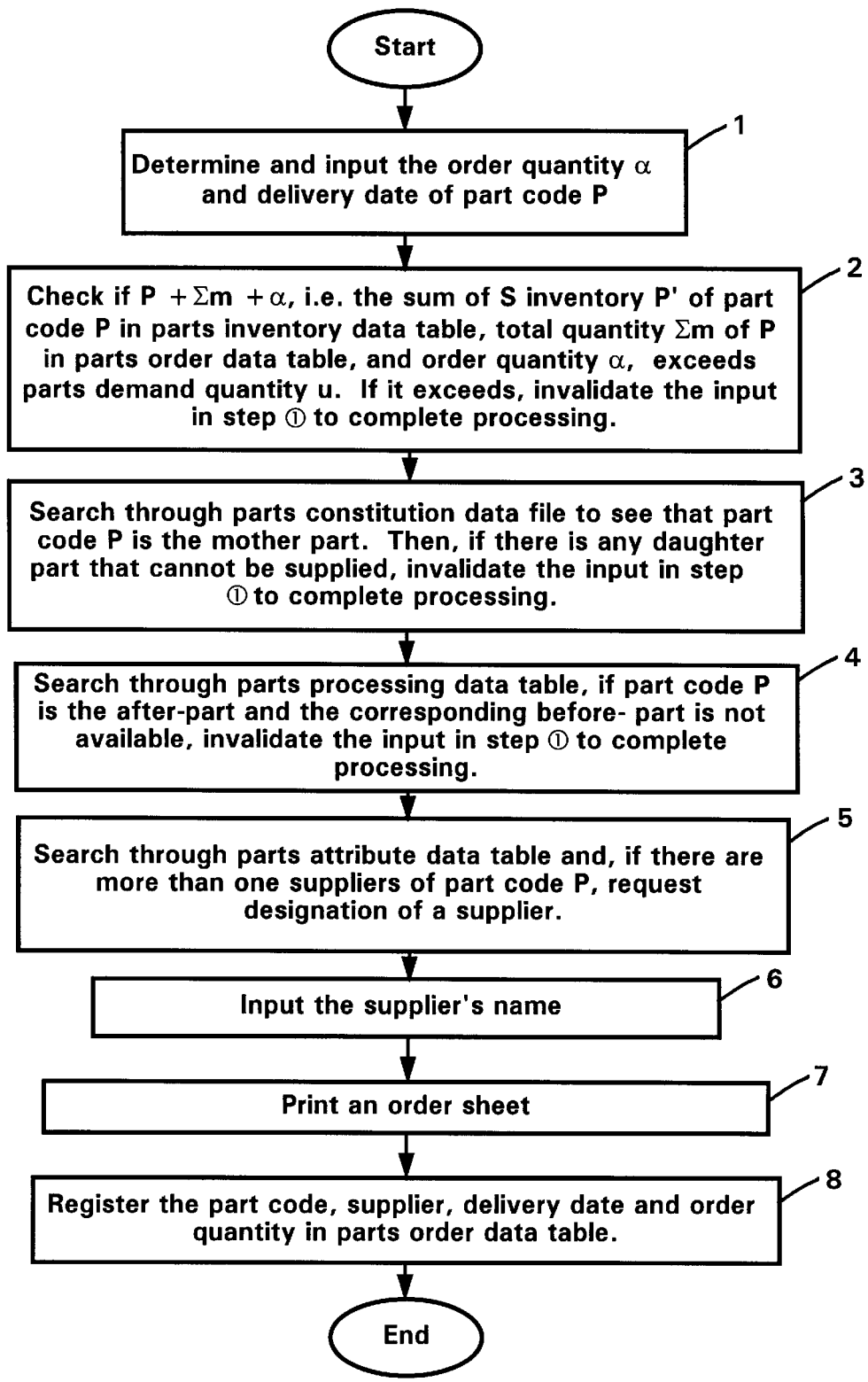
FIG. 52 is a flow chart showing steps in a parts ordering routine.

Connected to the parts order routine 222 are said parts inventory data table 208, parts order data table 212, parts demand data table 211, parts constitution data table 210, parts processing data table 211 and parts attribute data table 216, and the control of parts order is performed in the steps shown in the flow chart of FIG. 52.

Thus,

Step ①: Determining and inputting the order size $\alpha$ of part code P

Step ②: Confirming that $P^* + \Sigma m + \alpha$, i.e. the sum of the S inventory $P^*$ of part code P stored in the parts inventory data table 208, the total order quantity $\Sigma m$ of part code P stored in the parts order data table 212 and the order quantity a newly entered in step ①, does not exceed the parts demand quantity u of part code P in the product demand data table 221. If it exceeds, i.e. $P^* + \Sigma m + \alpha > u$, the input in step ① is invalidated and the processing is completed. Thus, in this case, there was an excessive order for part code P.

Step ③: Searching through the parts constitution date table 210 and, if it is found that part code P represents the mother part, confirming that all the daughter parts for them can be supplied. In the event of even one daughter part is not available for supply, the input in step ① is invalidated and the processing is completed. The above confirmation is performed as follows. The R inventory and V inventory of the corresponding daughter part are investigated in the parts inventory data table 208 and, then, the delivery term data and order data in the parts order data table 212 are investigated. Then, the delivery term data and order data for all the mother parts employing the corresponding daughter part are investigated in the parts order data table 212 the liquidation schedule of the corresponding daughter part is calculated.

Step ④: Searching through the parts processing data table 211. When the part code P represents after-parts, it is confirmed that the corresponding before-parts can be supplied. If the supply is infeasible, the input in step ① is invalidated to terminate the processing. The above confirmation is carried out by investigating the R inventory and V inventory in the parts inventory data table 208, the delivery term and order size data in the parts order data table 212 and the delivery term and order quantity data of all the after-parts employing the corresponding before-part in the parts order data table 212.

Step ⑤: Searching through the parts attribute data table 216 and, where there are more than one supplier-manufacturers of part code P, requesting designation of a supplier-manufacturer Step ⑥: Inputting that supplier-manufacturer Step ⑦: Printing an order sheet Step ⑧: Registering the part code, supplier-manufacturer, delivery term and order quantity in the parts order data table 212 to complete the processing.

Thus, in the parts order routine 222, an order is placed only after confirming that the set order quantity does not cause an excess order or an overstock and that daughter parts or before-parts can be supplied when they exist.

Figure 53:
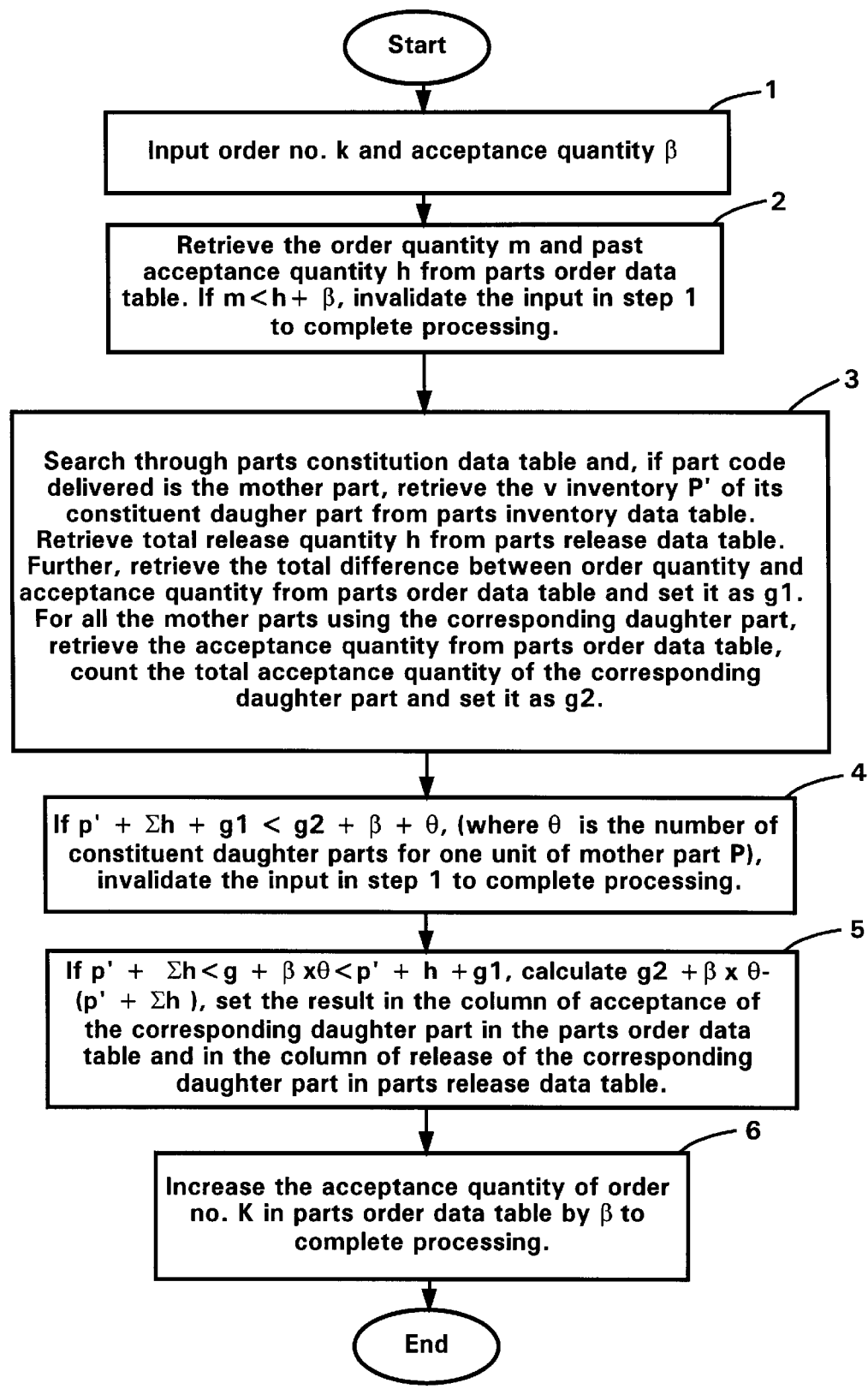
FIG. 53 is a flow chart showing steps in a parts acceptance routine.

Furthermore, the parts acceptance routine 223 is connected to said parts order data table 212, parts inventory data table 208, parts release data table 213, parts constitution data table 210 and parts processing data table 211 and the parts acceptance processing is performed in the steps shown in the flow chart of FIG. 53.

Thus,

Step ①: Inputting order no. K and acceptance quantity $\beta$

Step ②: Retrieving order quantity m and past acceptance quantity n of order no. K from the parts order data table 212. If $m<n+\beta$, it is judged that there was an error and the input in step ① is invalidated to terminate the processing.

Step ③: Searching through the parts constitution data table 210. If the part code P stored is the mother part, the V inventory P' of the constituent daughter part is retrieved from the parts inventory data table 208 and the total release data $\Sigma h$ is retrieved from the parts release data table 213. Then, the total difference between order quantity and acceptance quantity, that is to say the number of parts already ordered but not delivered as yet, is retrieved and set as $g_1$.

Furthermore, the acceptance quantity of all the mother parts employing the corresponding daughter part is retrieved from the parts order data table 212 and the total acceptance quantity of the corresponding daughter part is calculated and set as $g_2$. Thus, if the mother parts have been accepted, it is deemed that the daughter parts have of course been accepted.

Step ④: If $P'+\Sigma h+g_1<g_2+\beta\times\theta$ (where $\theta$ means the number of the corresponding daughter parts contained in one unit of the mother part), invalidating the input in step ① as an error and terminating the processing.

Step ⑤: If $P'+\Sigma h<g_2+\beta\times\theta<P'+\Sigma h+g_1$, calculating $g_2+\beta\times\theta-(P'+\Sigma h)$ and having the result reflected in the acceptance data of the corresponding daughter part in the parts order data table 212 and similarly in the release data of the corresponding daughter part in the parts release data table 213. In other words, it is so treated that the corresponding daughter part is accepted once and, then, released.

Step ⑥: Increasing the acceptance data of order no. K in the parts order data table 212 by $\beta$ to complete the processing.

Figure 54:
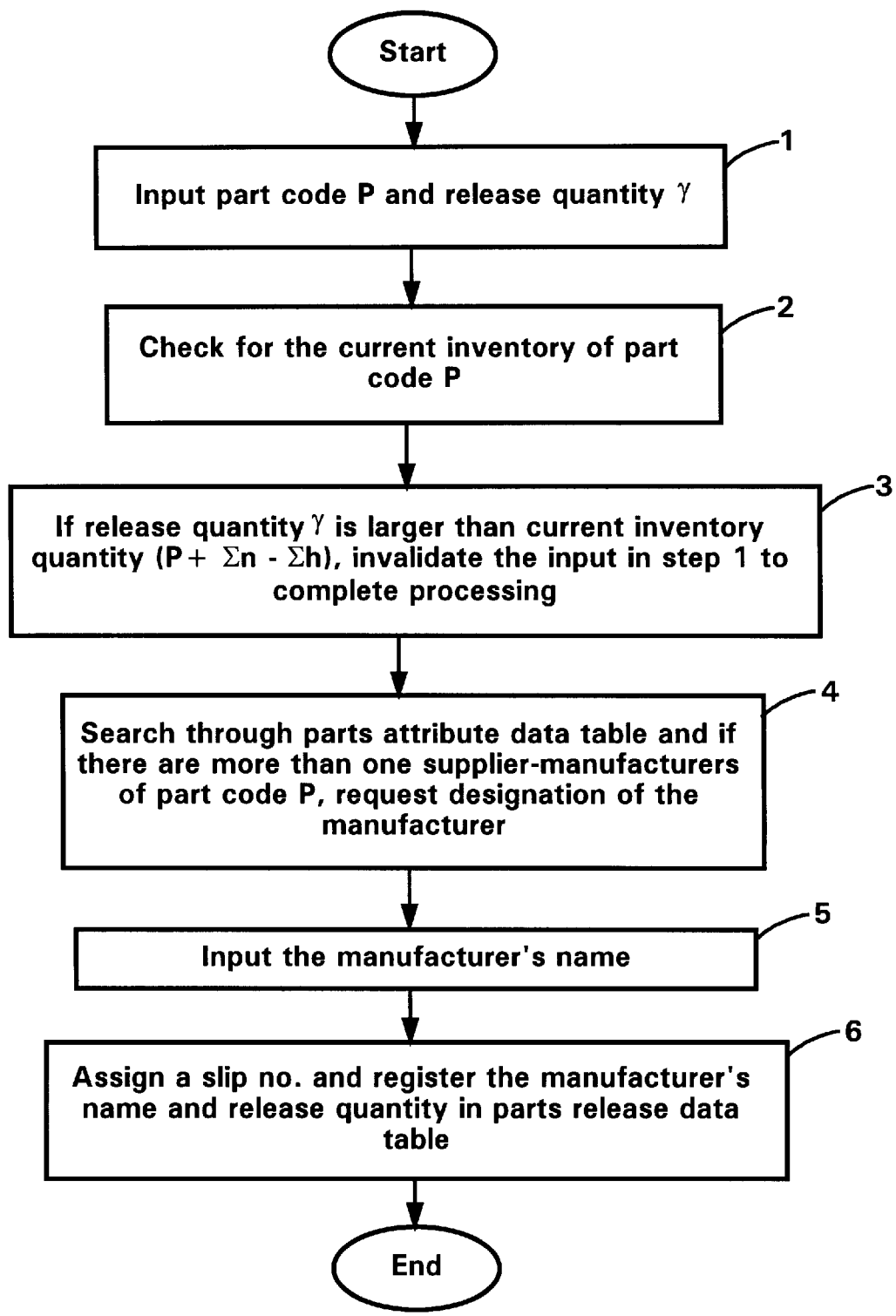
FIG. 54 is a flow chart showing steps in a parts releasing routine.

Connected to the parts release routine 224 are the parts order data table 212, parts inventory data table 208, parts release data table 213, parts constitution data table 210 and parts attribute data table 216, and parts release processing is performed in the steps shown in the flow chart of FIG. 54.

Thus,

Step ①: Entering part code P and its release quantity $\gamma$

Step ②: Finding the current inventory of part code P in the following steps (i) through (iii)

(i) Retrieving the R inventory of part code P from the parts inventory data table 208

(ii) Retrieving the total acceptance quantity $\Sigma n$ of part code P from the parts order data table 212

(iii) Retrieving the total release quantity $\Sigma h$ of part code P from the parts release data table 213

Step ③: If the release quantity $\gamma$ is larger than the current inventory $(P+\Sigma n-\Sigma h)$, the input in step ① is invalidated as an error to terminate the processing.

Step ④: Searching through the parts attribute data table 216 and, if there are more than one supplier-manufacturers of part code P, requesting designation of the relevant manufacturer Step ⑤: Entering the manufacturer's name Step ⑥: Assigning a slip number and registering the part code, manufacturer's name, and release quantity in the parts release data table 213 to terminate the processing.

Figure 55:
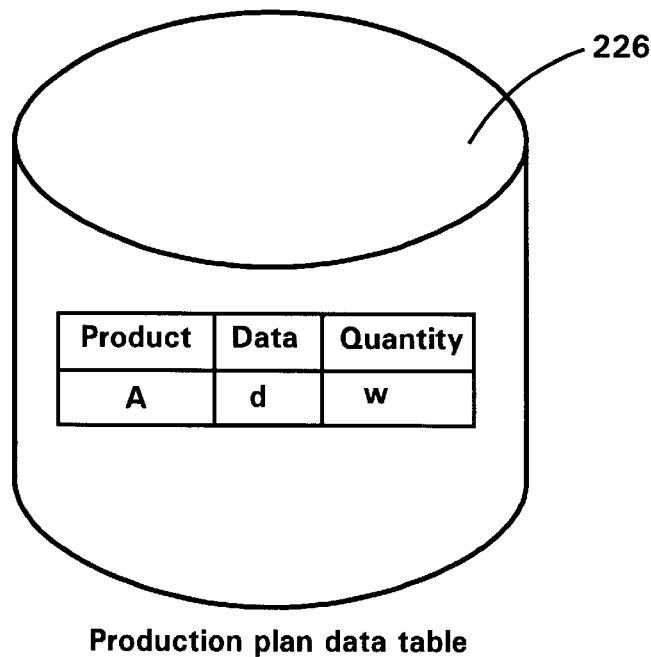
FIG. 55 is a view showing a production plan data table.
Figure 56:
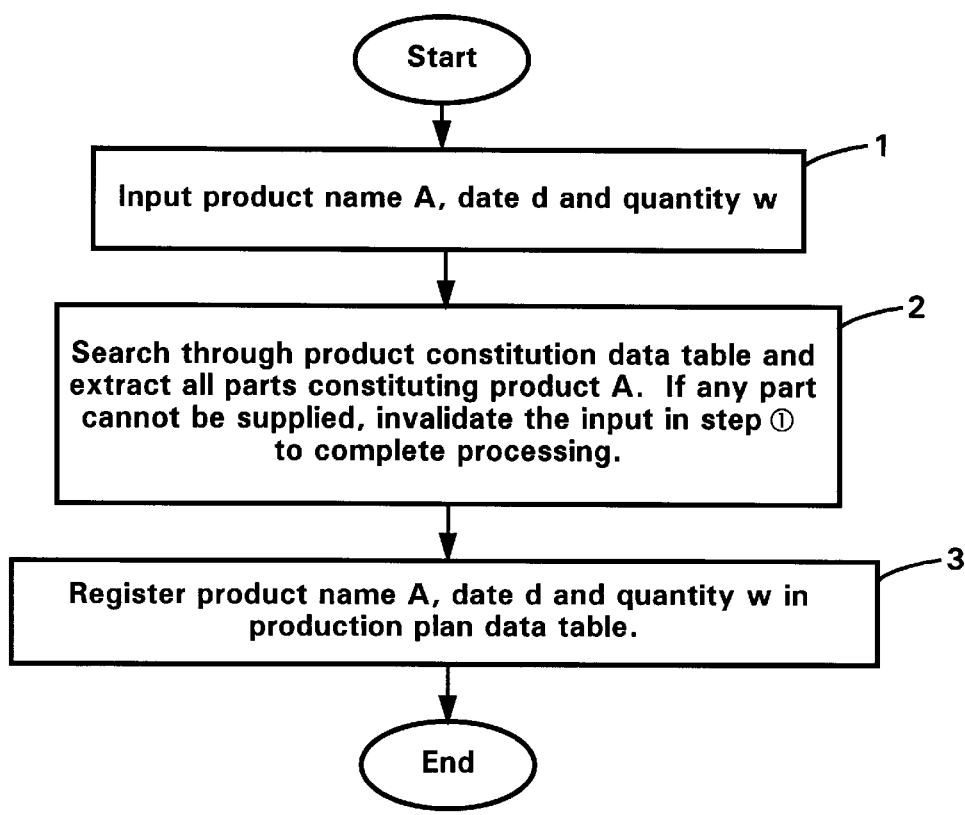
FIG. 56 is a flow chart showing steps in a production planning routine.

Connected to the production plan routine 225 are the product constitution data table 214, parts inventory data table 208 and parts order data table 212 as well as a production plan data table 226 shown in FIG. 55, and the registration of the production plan is performed in the steps shown in the flow chart of FIG. 56.

Stored in said production plan data table 226 are the production schedule and production quantity data for respective product items.

Thus,

Step ①: Entering the production schedule d and production quantity w for product A in the production plan data table 226

Step ②: Searching through the product constitution data table 214 to extract all the constituent parts of product A and checking to see whether these parts can be supplied. If any of the parts is unavailable, the input in step ① is invalidated to terminate the processing. The above checking is done as follows. The R inventory of the particular part is checked in the parts inventory data table 208 and the delivery term and order quantity data in the parts order data table 212 are also checked. Then, with regard to other product items which employ the corresponding constituent part, the production schedule and quantity are checked in the production plan data table 226 and the liquidation schedule for the corresponding part is calculated. Thus, it is checked here whether this constituent part will be available in a sufficient quantity for the production of product A.

Step ③: Registering product name A, production schedule d and production quantity w in the production plan data table 226 to complete the processing.

What is claimed is:

1. A raw materials ordering system comprising:
   a production quantity determining unit for determining a production quantity of goods to be manufactured;
   an order quantity determining unit operatively connected to the production quantity determining unit and receiving the production quantity from the production quantity determining unit, the order quantity determining unit determining, based on the production quantity of goods, required quantities of raw materials required for manufacturing the production quantity of goods and determining raw materials order quantities based on both (a) order backlog raw materials quantities comprising quantities of raw materials for which an order has been sent to a raw materials supplier and the raw materials supplier has acknowledged receipt of the order; and
   (b) in-process raw materials quantities comprising quantities of raw materials for which an order has been sent to a raw materials supplier and the raw materials supplier has not acknowledged receipt of the order or has not confirmed ability to send the raw materials requested.

2. A raw materials ordering system according to claim 1, wherein the order quantity determining unit determines raw materials order quantities based on raw materials attribute information, current raw materials inventory quantities and the required quantities of raw materials.

3. A raw materials ordering system according to claim 1, further comprising a data input processing unit operatively connected to the order quantity determining unit for modifying the required quantities of raw materials based on acceptance information confirming receipt of ordered quantities of raw materials received from a raw materials supplier and modifying said production quantity based on information concerning quantities of finished goods.

4. A raw materials ordering system according to claim 3, wherein the data input processing unit is adapted to modify order backlog raw materials quantities based on the acceptance information and order acknowledgment information received from raw materials suppliers indicating an acknowledgment by a raw materials supplier of an order for raw materials.

5. A raw materials ordering system according to claim 1, wherein the order quantity determining unit is adapted to modify the in-process raw materials quantities based on order acknowledgment information received from raw materials suppliers indicating an acknowledgment by a raw materials supplier of an order for raw materials.

6. A raw materials ordering system according to claim 1, further comprising a product-classified raw material constitution data table including information concerning quantities of raw materials required for each unit of each of the goods to be manufactured.

7. A raw materials ordering system according to claim 1, further comprising a raw materials required quantity data table including information concerning an amount of each of the raw materials to be used each day.

8. A raw materials ordering system according to claim 1, further comprising a raw materials inventory data table including information concerning inventory amounts for each of the raw materials.

9. A raw materials ordering system according to claim 1, further comprising a raw materials order acceptance schedule quantity data table including information concerning confirming receipt of ordered quantities of raw materials from a raw materials supplier.

10. A raw materials ordering system according to claim 1, wherein the order quantity determining unit comprises a software program executed on a computer and includes an initial setting routine, a production plan setting routine, a required quantity setting routine, a production plan modifying routine a required quantity modifying routine and an order size determining routine for flexibly storing changes in flow of raw materials in the raw materials ordering system.

11. A raw materials ordering system comprising:
a production quantity determining unit for determining a production quantity of goods to be manufactured; and
an order quantity determining unit operatively connected to the production quantity determining unit and receiving the production quantity from the production quantity determining unit, the order quantity determining unit determining, based on the production quantity of goods, required quantities of raw materials required for manufacturing the production quantity of goods and determining raw materials order quantities based on at least in-process order quantities comprising quantities of raw materials for which an order has been sent to a raw materials supplier and the raw materials supplier has not acknowledged receipt of the order or has not confirmed ability to send the raw materials requested.

12. A raw materials ordering system according to claim 11, wherein the order quantity determining unit determines raw materials order quantities based on raw materials attribute information, current raw materials inventory quantities and the required quantities of raw materials.

13. A raw materials ordering system according to claim 11, further comprising a data input processing unit operatively connected to the order quantity determining unit for modifying the required quantities of raw materials based on acceptance information confirming receipt of ordered quantities of raw materials received from a raw materials supplier and modifying said production quantity based on information concerning quantities of finished goods.

14. A raw materials ordering system according to claim 13, wherein the data input processing unit is adapted to modify order backlog raw materials quantities based on the acceptance information and order acknowledgment information received from a raw materials supplier indicating an acknowledgment by the raw materials supplier of an order for raw materials and the acceptance information.

15. A raw materials ordering system according to claim 11, wherein the order quantity determining unit is adapted to modify the in-process raw materials quantities based on order acknowledgment information received from a raw materials supplier indicating an acceptance by the raw materials supplier of an order for raw materials.

16. A raw materials ordering system according to claim 11, further comprising a product-classified raw material constitution data table including information concerning quantities of raw materials required for each unit of each of the goods to be manufactured.

17. A raw materials ordering system according to claim 11, further comprising a raw materials required quantity data table including information concerning an amount of each of the raw materials to be used each day.

18. A raw materials ordering system according to claim 11, further comprising a raw materials inventory data table including information concerning inventory amounts for each of the raw materials.

19. A raw materials ordering system according to claim 11, further comprising a raw materials order acceptance schedule quantity data table including information concerning confirming receipt of ordered quantities of raw materials from a raw materials supplier.

20. A raw materials ordering system according to claim 11, wherein the order quantity determining unit comprises a software program executed on a computer and includes an initial setting routine, a production plan setting routine, a required quantity setting routine, a production plan modifying routine a required quantity modifying routine and an order size determining routine for flexibly storing changes in flow of raw materials in the raw materials ordering system.

21. A method of ordering raw materials comprising the steps of:
determining a production quantity of goods to be manufactured;
determining required quantities of raw materials required for manufacturing the production quantity of goods determined in the step of determining the production quantity of goods; and
determining raw materials order quantities based on both (a) order backlog raw materials quantities comprising quantities of raw materials for which an order has been sent to a raw materials supplier and the raw materials supplier has acknowledged receipt of the order; and (b) in-process raw materials quantities comprising quantities of raw materials for which an order has been sent to a raw materials supplier and the raw materials supplier has not acknowledged receipt of the order or has not confirmed ability to send the raw materials requested.

22. A method according to claim 21, further comprising modifying order backlog raw materials quantities based on order acknowledgment information received from a raw materials supplier confirming receipt of ordered quantities of raw materials.

23. A method according to claim 21, further comprising modifying the required quantities of raw materials based on acceptance information confirming receipt of ordered quantities of raw materials from a raw materials supplier and modifying said production quantity based on quantities of finished goods.

24. A method of ordering raw materials comprising the steps of:

determining a production quantity of goods to be manufactured;

determining required quantities of raw materials required for manufacturing the production quantity of goods determined in the step of determining the production quantity of goods; and determining raw materials order quantities based on at least in-process order quantities comprising quantities of raw materials for which an order has been sent to a raw materials supplier and the raw materials supplier has not acknowledged receipt of the order or has not confirmed ability to send the raw materials requested.

25. A method according to claim 24, further comprising modifying the required quantities of raw materials based on acceptance information confirming receipt of ordered quantities of raw materials received from a raw materials supplier and modifying said production quantity based on information concerning quantities of finished goods.

26. A method according to claim 24, further comprising modifying the in-process raw materials quantities based on order acknowledgment information received from a raw materials supplier indicating an acceptance by the raw materials supplier of an order for raw materials.

* * * * *